United States Patent
Novosselov

(10) Patent No.: US 10,753,829 B2
(45) Date of Patent: Aug. 25, 2020

(54) AERODYNAMIC SAMPLING OF PARTICLES AND VAPORS FROM SURFACES FOR REAL-TIME ANALYSIS

(71) Applicant: SpecTree LLC, Seattle, WA (US)

(72) Inventor: Igor V Novosselov, Seattle, WA (US)

(73) Assignee: SpecTree, LLC, Seattle, WA (US)

( * ) Notice: Subject to any disclaimer, the term of this patent is extended or adjusted under 35 U.S.C. 154(b) by 0 days.

(21) Appl. No.: 16/355,798

(22) Filed: Mar. 17, 2019

(65) Prior Publication Data
US 2019/0212230 A1 Jul. 11, 2019

Related U.S. Application Data

(63) Continuation-in-part of application No. 15/434,044, filed on Feb. 15, 2017, now Pat. No. 10,274,404.

(60) Provisional application No. 62/295,225, filed on Feb. 15, 2016.

(51) Int. Cl.
*G01N 1/02* (2006.01)
*H01J 49/16* (2006.01)
*G01N 1/00* (2006.01)
*G01N 1/22* (2006.01)

(52) U.S. Cl.
CPC .............. *G01N 1/02* (2013.01); *H01J 49/167* (2013.01); *G01N 1/2202* (2013.01); *G01N 2001/007* (2013.01); *G01N 2001/028* (2013.01)

(58) Field of Classification Search
CPC .......... G01N 2001/028; G01N 1/2214; G01N 2001/022; G01N 1/14; G01N 1/24; G01N 1/405; G01N 1/2211; G01N 33/227
See application file for complete search history.

(56) References Cited

U.S. PATENT DOCUMENTS

| 3,748,905 A | * | 7/1973 | Fletcher | G01N 1/02 73/863.25 |
| 3,970,428 A | * | 7/1976 | Barringer | G01V 5/025 73/863.22 |
| 5,416,321 A | * | 5/1995 | Sebastian | G01N 21/88 250/288 |

(Continued)

*Primary Examiner* — David A Rogers
(74) *Attorney, Agent, or Firm* — K. Lambert; Lambert Patent Services

(57) ABSTRACT

A non-contact aerodynamic sampling tool for collecting particles and vapors from the surfaces. Opposing planar jets or planar jet arrays are used to liberate material from surfaces so that particulate matter and vapors can be collected for analysis in real time. High-speed valves may be triggered to create pressure waveforms for high velocity pressurized planar jet bursts, or continuously operated opposing wall jets may be angularly directed toward a target surface, permitting sampling from large standoff distances. The wall jets traverse the surface and exhibit significant drag forces to lift particles into a suction intake. Unlike axisymmetric jets, the wall jets sustain the flow momentum over the target surface for a greater distance, dislodging particles submerged in the boundary layer and significantly improving particle resuspension and vapor collection. Real-time analysis and detection of target analytes are achieved by efficient sample liberation from the surface in the sampling tool and the efficient sample delivery to an analytical module.

21 Claims, 36 Drawing Sheets

(56) References Cited

U.S. PATENT DOCUMENTS

| | | | | |
|---|---|---|---|---|
| 5,551,278 | A * | 9/1996 | Rounbehler | G01N 1/02 436/156 |
| 5,638,166 | A * | 6/1997 | Funsten | G01N 1/2208 250/554 |
| 5,751,897 | A * | 5/1998 | Van Alstyne | A62D 3/17 392/417 |
| 5,939,647 | A * | 8/1999 | Chinn | G01N 1/2202 73/864.33 |
| 5,970,803 | A * | 10/1999 | Staples | G01N 1/2214 73/23.41 |
| 6,269,703 | B1 * | 8/2001 | Bowers | G01N 1/22 73/863.12 |
| 6,354,160 | B1 * | 3/2002 | Staples | G01N 1/2214 73/863.12 |
| 6,378,385 | B1 * | 4/2002 | Bowers | G01N 1/22 73/863.12 |
| 6,449,035 | B1 * | 9/2002 | Batchelder | G01N 1/02 356/237.1 |
| 6,828,795 | B2 * | 12/2004 | Krasnobaev | G01N 27/622 324/464 |
| 6,861,646 | B2 * | 3/2005 | Motchkine | G01N 1/02 250/281 |
| 6,888,128 | B2 * | 5/2005 | Krasnobaev | G01N 1/02 250/281 |
| 6,895,804 | B2 * | 5/2005 | Lovell | G01N 1/2202 73/31.05 |
| 7,098,672 | B2 * | 8/2006 | Belyakov | G01N 1/22 324/451 |
| 7,100,461 | B2 * | 9/2006 | Bradley | G01N 1/02 73/864.33 |
| 7,997,119 | B2 * | 8/2011 | Wu | G01N 1/14 324/239 |
| 8,113,069 | B2 * | 2/2012 | Settles | G01N 1/2226 73/863 |
| 8,122,756 | B2 * | 2/2012 | Bunker | G01N 1/2202 239/7 |
| 8,307,723 | B2 * | 11/2012 | Novosselov | G01N 1/2202 73/864 |
| 8,353,223 | B2 * | 1/2013 | Bunker | B08B 7/0092 73/864.33 |
| 8,377,711 | B2 * | 2/2013 | Henry | G01N 21/658 356/36 |
| 8,469,295 | B2 * | 6/2013 | Bunker | G01N 1/02 239/551 |
| 8,561,486 | B2 * | 10/2013 | Novosselov | G01J 3/00 73/864.32 |
| 8,592,758 | B1 * | 11/2013 | Nilles | H01J 49/0431 250/288 |
| 8,626,467 | B2 * | 1/2014 | Fang | G01N 1/2273 702/100 |
| 8,646,340 | B2 * | 2/2014 | Zhang | G01N 1/22 73/863.11 |
| 8,665,433 | B2 * | 3/2014 | Da Re | G01N 21/65 356/301 |
| 8,756,975 | B2 * | 6/2014 | Wu | G01N 1/14 73/31.05 |
| 9,048,076 | B2 * | 6/2015 | Stott | H01J 49/00 |
| 9,067,219 | B2 * | 6/2015 | Bunker | G01N 1/02 |
| 9,134,205 | B2 * | 9/2015 | Hillis | G01N 1/2202 |
| 9,335,236 | B2 * | 5/2016 | Bry | G01N 1/2211 |
| 9,347,927 | B2 * | 5/2016 | Wood | G01N 33/0009 |
| 9,390,899 | B2 * | 7/2016 | Musselman | H01J 49/10 |
| 9,551,649 | B2 * | 1/2017 | Houghton | G01N 33/227 |
| 2006/0249671 | A1 * | 11/2006 | Karpetsky | G01N 27/624 250/288 |
| 2007/0158447 | A1 * | 7/2007 | Bunker | G01N 1/02 239/1 |
| 2012/0044478 | A1 * | 2/2012 | Da Re | G01J 3/0237 356/51 |
| 2012/0247230 | A1 * | 10/2012 | McGill | G01N 21/71 73/863.11 |

* cited by examiner

NON_CONTACTING PARTICLE SAMPLER (NCS)

NON_CONTACTING PARTICLE SAMPLER (NCS)

100

100

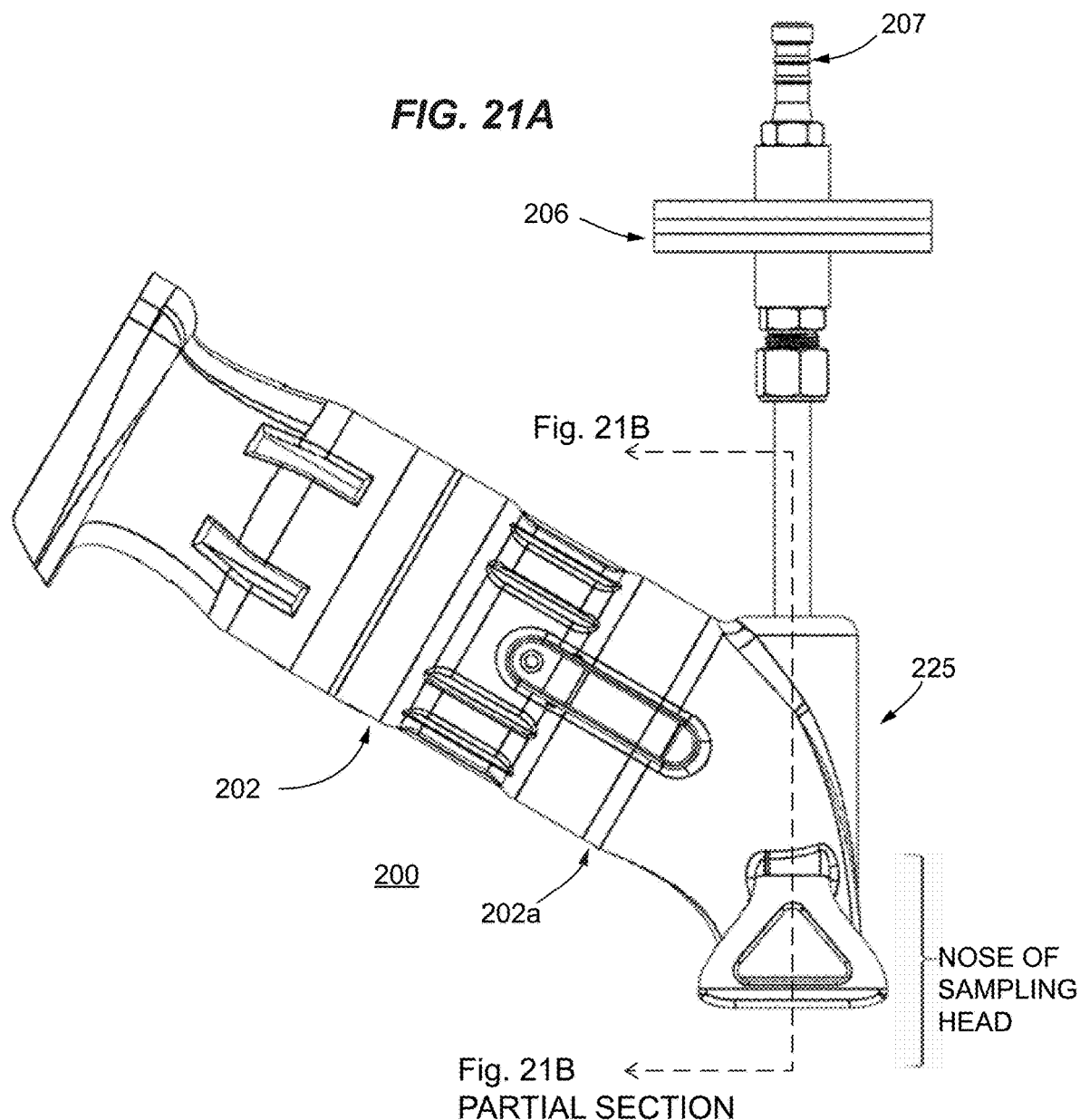

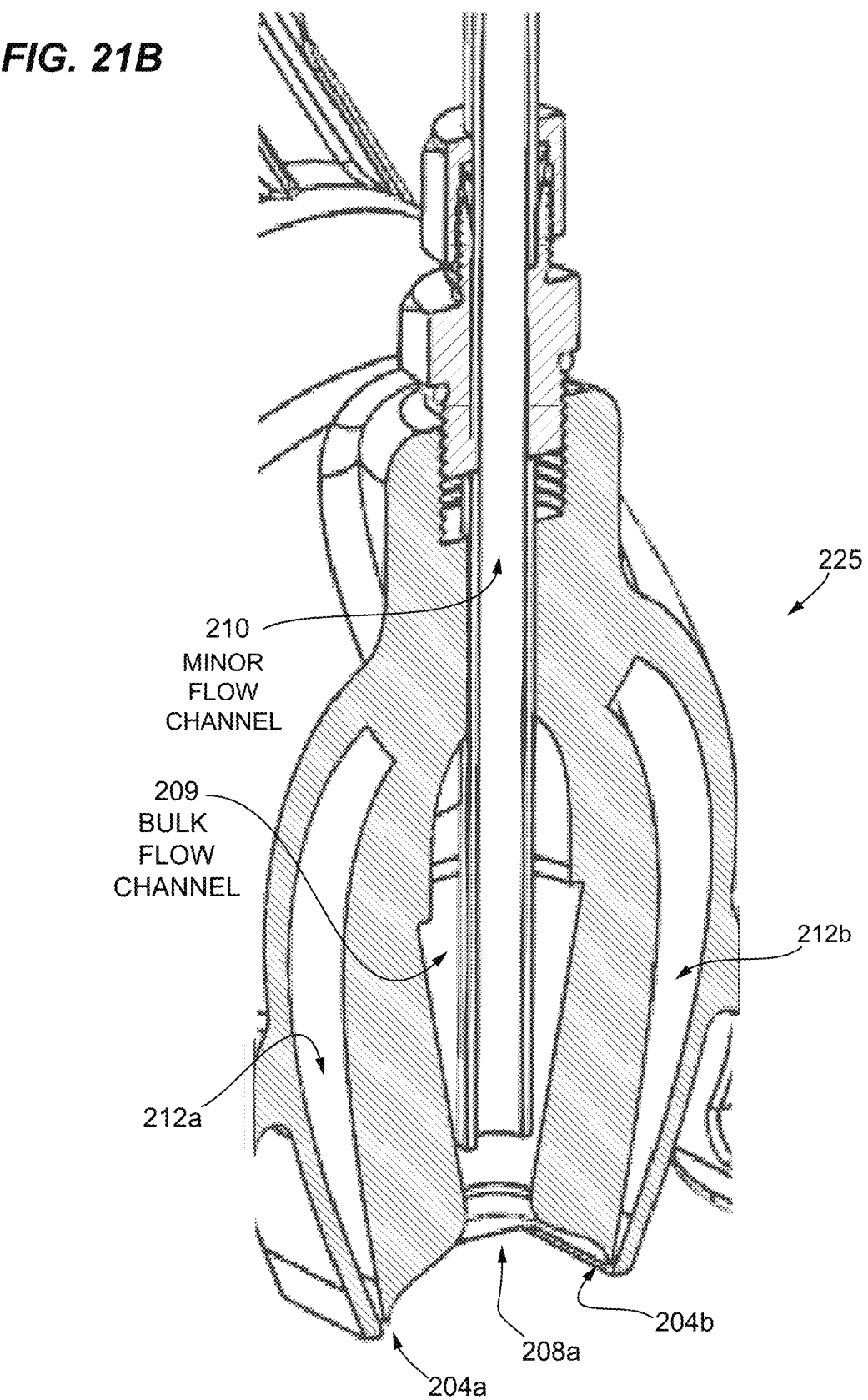

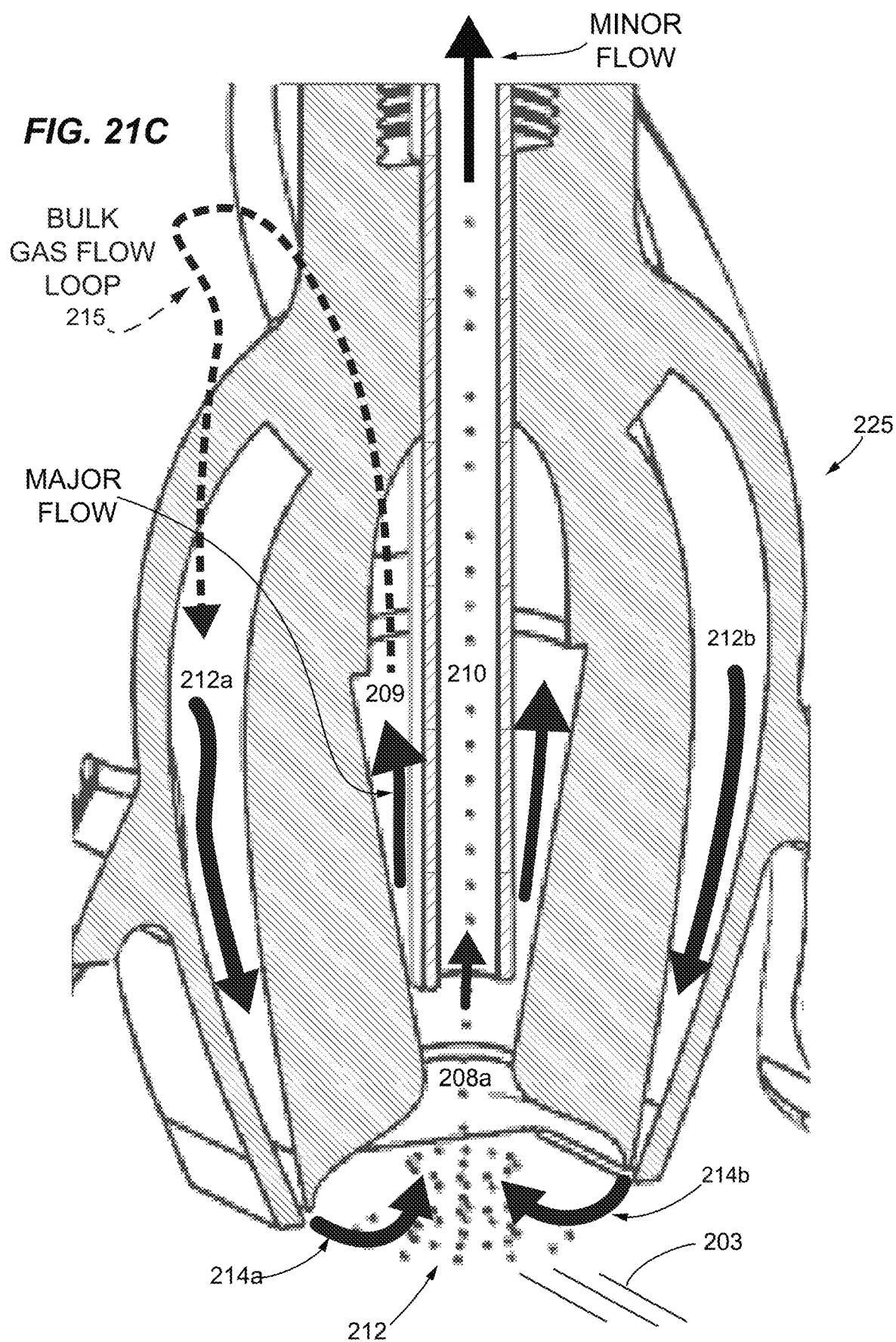

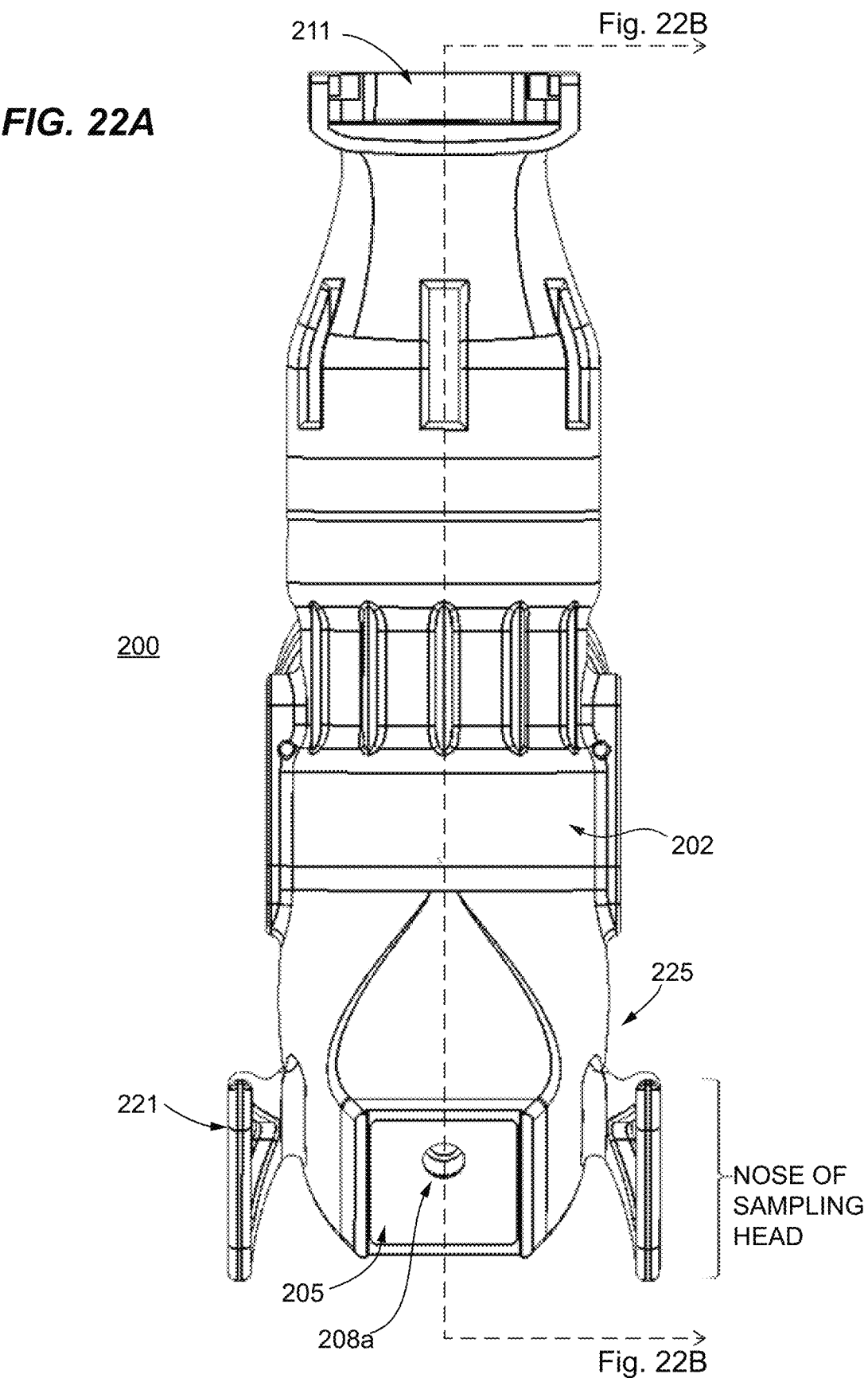

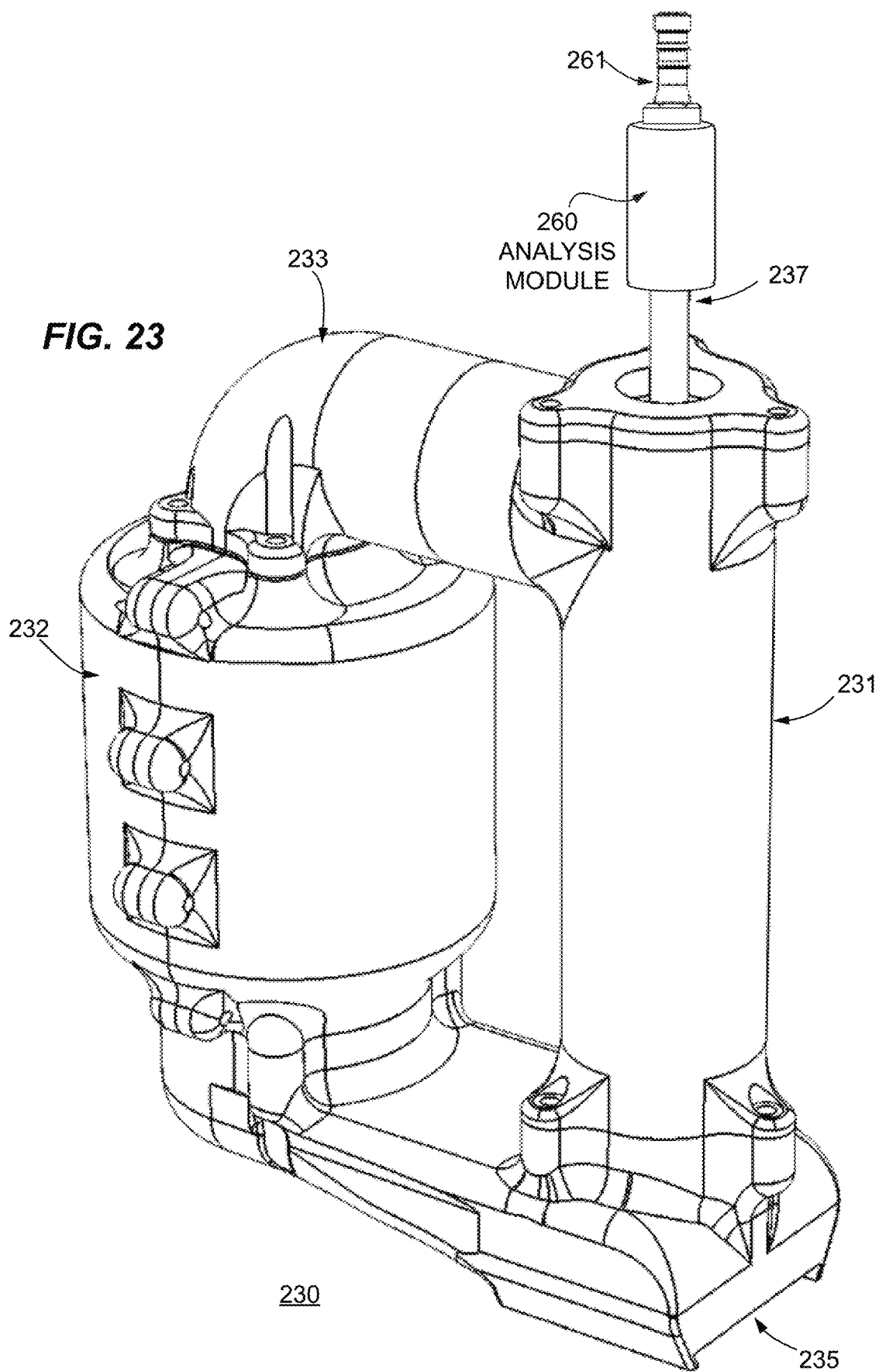

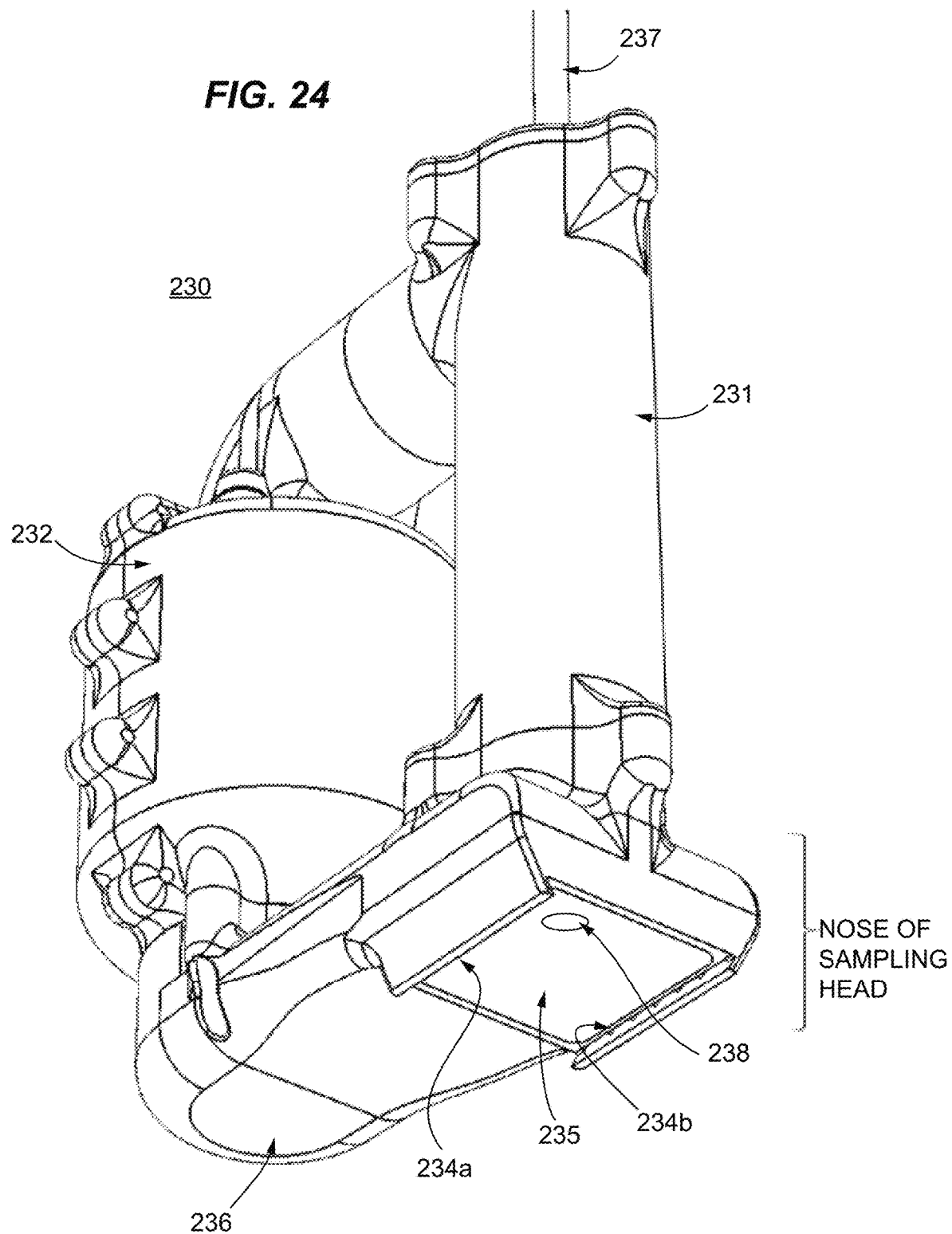

234a  234b

265
SAMPLER HEAD
INTAKE PORT

FIG. 29

METHOD

PROVIDING AN NCS APPARATUS OF ANY ONE OF THE EMBODIMENTS OF THE INVENTION;

MANUALLY ACTUATING SUCTION PRESSURE AND FLOW OF PRESSURIZED SAMPLING GAS THROUGH SLIT JETS IN PROXIMITY TO A SURFACE TO BE SAMPLED;

DIRECTING OR STEERING THE FLOW OF ANGLED PLANAR JETS ONTO A PROXIMATE SURFACE SO AS TO GENERATE OPPOSING WALL JETS;

COLLECTING MOBILIZED PARTICLES, VAPORS AND BOUNDARY LAYER WHERE THE OPPOSING JETS COLLIDE AND REDIRECTING THE SAMPLE INTO AN INTAKE PORT UNDER SUCTION;

PROCESSING ASPIRATED PARTICLES, VAPORS AND/OR BOUNDARY LAYER FOR ONE OR MORE ANALYTES; AND OPTIONALLY RECYCLING THE SAMPLING GAS.

DIRECTING AT LEAST A PART OF THE ASPIRATED SAMPLING RETURN FLOW BACK THROUGH A BLOWER AND TO THE JETS AS A JET FEED FLOW SO AS TO CYCLE THE GAS IN A LOOP.

CONTINUING FOR EFFECT

FIG. 30

METHOD

PROVIDING A SAMPLER OF ANY ONE OF THE EMBODIMENTS OF THE INVENTION;

UNDER AUTOMATED CONTROL, ACTUATING SUCTION PRESSURE AND FLOW OF PRESSURIZED GAS THROUGH SLIT JETS IN PROXIMITY TO A SURFACE TO BE SAMPLED:

DIRECTING OR STEERING FLOW OF ANGLED PLANAR JETS ONTO A SURFACE SO AS TO GENERATE OPPOSING WALL JETS IN CONTACT WITH THE SURFACE;

WHERE THE OPPOSING WALL JETS COLLIDE AND LIFT UP; COLLECTING MOBILIZED PARTICLES, VAPORS AND ANY BOUNDARY LAYER IN AN INTAKE PORT UNDER SUCTION;

ANALYZING THE FLOWS IN-LINE FOR REAL TIME MONITORING, OR OPTIONALLY SPLITTING THE SAMPLE INTO A MAJOR AND MINOR FLOW AND CYCLING THE MAJOR FLOW BACK TO THE SLIT JETS IN A FLUIDIC LOOP.

CONTINUING FOR EFFECT

AERODYNAMIC SAMPLING OF PARTICLES AND VAPORS FROM SURFACES FOR REAL-TIME ANALYSIS

CROSS REFERENCE TO RELATED APPLICATIONS

This application is related to and is a continuation-in-part of U.S. patent application Ser. No. 15/434,044, filed 15 Feb. 2017, now U.S. Pat. No. 10,274,404, which claims the benefit of priority under 35 U.S.C. § 119(e) from U.S. Provisional Patent Application Ser. No. 62/295,225 entitled "Jet Sampling of Particles and Vapors from Substrates" filed 15 Feb. 2016; said patent documents are herein incorporated in full by reference for all purposes.

GOVERNMENT SUPPORT

This invention was made with partial government support under a subcontract to Contract No. W909MY-14-C-0020 awarded by the U.S. Army, Ft. Belvoir Va. The Government may have certain rights in the invention.

FIELD OF THE INVENTION

The invention relates to sampling apparatus and methods for analysis of trace analytes from surfaces and substrates. More particularly, the embodiments of the present invention relate to slit jet nozzles or arrays of nozzles operated with a blower or pump in a continuous loop flow pattern for mobilizing particles and vapors at greater standoff distances.

BACKGROUND

Collection of "trace analytes" or "target analytes" may provide early warning of security risks or material information about environmental conditions generally. A preferred class of target analytes includes particulates and vapors, such as volatiles associated with explosives, where the volatiles are frequently found adsorbed on and associated with particles. Particles adherent to substrates may be dislodged and aerosolized by application of high-velocity jets to a substrate surface from a distance and are thus subject to analysis. The capacity to detect hazardous residues associated with particles on objects or vehicles, for example, and on persons with a history of having handled hazardous materials, is a rising security concern.

While it is known that an impinging directional jet may be used to dislodge and aerosolize particles and vapors from substrates, the jet action also scatters the particles, essentially diluting them in a larger sample volume and propelling them from the sampling area. While suction ports have been devised to collect larger sample volumes, the capacity to efficiently collect the dislodged material deteriorates rapidly with the distance of the suction port from the sample and the linear vector of the jet burst relative to the substrate or suction port. In short, some or all of the sample may be propelled away from the suction intake, leading to missed detection. While the behavior of the jet is reasonably predictable for a flat surface, when the surface is tilted away from the suction port or includes surface irregularities, significant sample loss occurs. This is particularly true for axisymmetric jets. Any increase in sample volume decreases sensitivity, and thus a satisfactory solution to this problem has not been demonstrated.

Related art is described for example in U.S. Pat. Nos. 5,491,337, 6,708,572 and 6,642,513. Various systems for hand search, gate security, walkthrough portals, and vehicle sampling have been advanced, and generally involve some kind of contacting sample collection such as a swab, or by the concentration of very, very large volumes of air, such as from a portal or enclosure with large fan-driven collection ductwork.

However, non-contact, open "sniffing" may be preferred, where air and particles associated with a suspect package or person are drawn into a nose-like detection system termed here a "NCS". Early systems include those described in U.S. Pat. Nos. 5,491,337, 4,909,090, 7,275,453, 6,073,499, 6,887,710, 7,942,033, 6,345,545, 7,299,711, 6,978,657, 6,604,406, 6,085,601, 5,854,431, RE38,797, U.S. Pat. Nos. 5,465,607, 4,987,767, 7,299,710, 8,307,723, 8,475,577 and in U.S. Pat. Publ. Nos. 2011/0186436 and 2012/0105839. Also relevant are U.S. Pat. No. 5,416,321 to Sebastian and US. Pat. Publ. 2006/0249671 to Karpetsky.

In preliminary work described in U.S. Pat. Publ. No. 2011/0186436 to Novosselov, continuous, non-contact sampling of trace materials from level surfaces was demonstrated for up to 6 inches distance using a circular jet array in which the jets define a "curtain wall" of moving air around a suction port, which is in turn surrounded by a secondary jet wall. For a given particle size, the drag force acting on the particle is related to the velocity of the wall jet at the location of the particle in relation to the jet impingement point. The higher the velocity of the wall jet at the particle location, the greater the lateral force for particle mobilization. But, performance limitations were reached. There are factors that limit the performance of the circular jet array sampler that cannot readily be overcome:

A) Limits on wall jet properties: The force applied to a particle on a surface greatly diminishes with an increase in the standoff distance H. With spaced axisymmetric jets, the jet spreads in all directions. Furthermore, after impingement on a solid surface, the wall jet velocity from the axisymmetric nozzle is rapidly diminished at shorter distances (due to momentum expansion) from the impingement point according to the $r^2$ law. The removal area (maximum wall shear stress location) for the axisymmetric jet is relatively small and limits the interrogation zone of the circular array sampler. The force applied to the particle on a surface diminishes by a negative exponent of the standoff distance.

B) Geometric limits: Jets converge on a single point in the best designs, making a collection of the mobilized sample impossible once the convergence distance is reached. Coherent jet momentum capable of imparting sufficient wall jet velocity has not proved possible at standoff distances greater than six inches for round nozzles because of parasitic losses in the free jet momentum. Circular jet geometry is more susceptible to the surface inclination and imperfections, as the individual jet timing and any sampling head misalignment will cause particle dispersion.

C) Limitations on independent jet function: Circular jet orifices were not readily controlled so as to vary timing and angulation. Pulse delay resulted in openings in the curtain wall through which particles were lost. Complex manifold geometry associated with circular jet arrays and uneven pressure distribution upstream of the nozzles results in the difficulties with controlling timing and dynamic pressure of each independent jet in the array to adjust for variations in stand-off distances, surface inclination and surface morphology.

In short, detection at a non-contact standoff of nine or twelve inches has not been possible using conventional technologies. The jet geometries developed to date are not robust and have not offered a solution to the problem of sampling from moving and complex surface geometries. Roadway detection of improvised explosive devices is needed, for example. The sampling problem is exacerbated where the substrate is an uneven surface, such as under a vehicle and the vehicle, with sampling apparatus attached, is in motion. Similarly, inspecting vehicles for concealed explosives is made difficult by the complex surfaces inside and on the underside of the vehicle.

A solution to these interrelated problems has not been achieved by trial and error or by computational fluid dynamics. Among other issues, special treatment for turbulence is required to obtain solutions. Even so, turbulence modeling techniques are not always consistent with the experimental data. Methods include Reynolds-averaged Navier-Stokes (RANS) models, Large Eddy Simulation (LES) and Detached Eddy Simulation (DES) are challenging due to prohibitively large grid requirement near the wall, especially for complex, real-world sampling scenarios. However, new computational approaches have been needed to speed directions useful in guiding experimental confirmation. To date, no fully operational trace analyte sampling and detection system for high throughput operation at larger standoff distances has been achieved. Any detection system is only as sensitive as the front-end sampling system. Thus, there is a need in the art, for a trace analyte surface sampling apparatus or system that overcomes the problems and limitations in the art, of which the above-described literature is generally representative.

SUMMARY

The invention relates to aerodynamic sampling apparatus and methods for sampling of trace analytes from surfaces and substrates. To understand the invention, it has to be first understood that the air (or "gas") in a representative inventive apparatus is not a "workpiece," it is a working fluid and a part of the tool. The apparatus is configured to shape the flow of the gas from jet outlets to a suction inlet so that when impacted on a hand, artifact, or other solid surfaces, a wall jet (as will be defined below) is imparted with sufficient pressure and velocity so as to overcome drag forces on particles captive in a viscous "boundary layer" of stagnant air on the surface.

Generally, the apparatus includes a sampler body having a sampling head section and a blower body section, where the head section and body section are rigidly joined at a fluidic interface, and the pneumatic interface contains manifolds configured to supply a pressurized jet feed to the head from the blower and a sampling return flow from the head to the blower. The jet feed and at least a part of the sampling return flow are connected in a fluidic loop. In some instances, the sampling return flow is split in an aerodynamic particle concentrator as described below. The sampler body also includes an array of jet nozzles (also termed "jet orifices") on a first surface of the head; a suction intake port operable under suction, where the jet array is disposed around the intake port, and the sampling return flow is received from the intake port under suction. In operation, the jet orifices are configured to discharge each a jet toward a target surface and the jets are angulated to generate opposing wall jets that collide on a target surface at a standoff distance. The wall jets have a momentum sufficient to mobilize and lift particles and vapors from a target surface and any mobilized material from a target surface is redirected up and into the suction intake port during sampling. In a preferred embodiment, the suction intake port and the jets are operated in a continuous mode during sampling.

The jets may be round nozzles or more preferably a pair of slit jet orifices capable of delivering opposing planar jets. As currently practiced, the slit jet orifices include a first slit jet orifice configured to discharge a first planar jet and a second slit jet orifice configured to discharge a second planar jet toward a target surface and the two jets of the pair are angulated to generate jets that collide as opposing wall jets on a target surface. At a range of standoff distances, the wall jets and any mobilized particles or vapors from a target surface are redirected toward the suction intake port during sampling.

On striking a solid target surface at a standoff distance less that the convergence distance, two planar jets are deflected as opposing wall jets that collide on a solid target surface and lift off any mobilized particles or vapors into a sample intake port under suction. In a preferred instance, the jets have momentum to induce sufficient drag force acting on the particle that overcomes adhesion force between the particles and the surface. Continuous jets that are angulated so as to collide at high velocities under a suction intake are found to be effective at removing the trace explosives particle and other illicit microparticles and the vapors from the surfaces.

Surprisingly, the jets mobilize particles and vapors from a surface at "standoff" distances of more than 1 cm to 30 cm or more. At closer distances (up to 10 cm), with low jet pressures that are readily achievable with lightweight, portable equipment, a level of wall shear can be achieved that is sufficient to mobilize particles as small as 5 micrometers. These jet nozzles are generally slit jets or have an aspect ratio ($A_L$) of length to width of the resultant jet flow such that $A_L$ is greater than 5, more preferably greater than 10, such that as a planar sheet of jet-velocity air impacts a surface at an angle, deflection of the jet results in a translation of the jet that becomes essentially parallel to the surface (i.e., a "wall jet"), even when the flow of gas originates from 30 cm away (or more), depending on the scale of the sampling head. As demonstrated in the parent application, U.S. patent application Ser. No. 15/434,044, jet arrays having a cylindrical profile may also be practical, particularly with increased miniaturization.

Pulsatile jets are also effective. In another exemplary embodiment, convergent planar jet bursts or arrays of jets are used to mobilize material from surfaces at standoff distances less than the convergence point. Computerized or user-controlled systems for controlling jet bursts may include sensor mapping for determining the proximity, angulation and fine structure of the substrate surface in three-dimensions. Individual jet bursts may be coordinated so as to direct samples to a suction port from an irregular surface.

The increase in working distance of sampling heads of the invention is dependent on the shaping and control of jet geometry, velocity, and coherence. By opposing parallel wall jets having sufficient wall shear velocity and pressure under a suction intake, efficient collection of microparticles and boundary layer vapors for analysis is achieved, an advance in the art.

The apparatus finds use in active surveillance, such as for detecting explosives in aerosols, chemical residues or "trace analytes," including those on persons, vehicles, buildings or luggage. Continuous, semi-continuous, or batch mode operation is enabled according to the requirements of the downstream analytical unit and the needed threshold for detection. "Trace analytes" may take the form of a particulate composed of a target constituent or constituents, a free vapor composed of a target constituent or constituents, or a particulate combined with a vapor. The invention relates particularly to such apparatus and methods as are useful in non-contacting sampling and detection of trace analyte residues on irregular, angular, and complex surfaces.

The apparatus may be a portable or a handheld unit (such as a wand). Alternatively, larger sampling heads may be mounted on fixed surfaces, robotic arms as part of a point-of-entry detector system or as a wand attached to the real-time detector, e.g., MS, TOF-MS, optical detectors, etc.

In a preferred embodiment, the suction intake port may be fluidly connected to a suction pressure source so that particles and vapors are drawn through the suction intake port, or the device may rely on the uplift of the jets alone to drive particles and vapors into the sampling inlet port.

In some embodiments, an array of two or more slit jet orifices is operable in sampling particles and vapors over a standoff distance from less than 1 cm to 30 cm or more. In other embodiments, the array is operable in sampling particles and vapors over a standoff distance from 3 cm to 1 meter or more. For portable units, standoff distances of less than 1 cm to 10 cm are readily realized, but the effect of scaleup to larger heads results in the capacity for greater standoff distances.

Slit jet orifices may be operable in sampling particles and vapors at jet pressures of less than 100 psig, more preferably pressures of less than 60 psig, and most preferably at pressures less than 5 psig. Lower pressure is particularly preferred for portable applications in which the sampling apparatus is operated without external connections. Typically, a blower is supplied and set to higher flow velocities at a moderate or lower feed pressure. At sufficient wall jet velocity, particle and vapor resuspension is successful even at surprisingly low blower pressures, an advance in the art. The jet velocities are typically in a range of 50-330 m/s, and velocities approaching Mach 1 (speed of sound ~330 m/s) can be achieved with larger blowers (or by addition of compressed air to the jet feed). Sufficient but lower velocities are readily attainable using smaller lightweight blowers. Jet flow and re-uptake conditions meeting mass balance criteria can also be readily achieved with smaller blowers. With care, pumps can also be adjusted to achieve suitable pressures, momentum, and velocity at useful standoff distances. However, compressor units are characteristically larger and heavier, and hence find application only in machine-supported and robotic applications.

The invention also includes methods of operation of jet assemblies, methods of surveillance, methods for use on moving vehicles, robotic systems, and methods for portable use which include miniaturization of components for the screening of persons and interior of vehicles or luggage, for example. In combination with sample concentration and analytical modules, fully operational portable and/or stationary jet-assisted non-contacting sampling head assemblies are operative having extended standoff sampling distances.

The elements, features, steps, and advantages of the invention will be more readily understood upon consideration of the following detailed description of the invention, taken in conjunction with the accompanying drawings, in which presently preferred embodiments of the invention are illustrated by way of example.

It is to be expressly understood, however, that the drawings are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE DRAWINGS

The teachings of the present invention are more readily understood by considering the drawings, in which:

In FIG. 12B, the cut plane goes through the valve tree (details not shown), the ductwork to the jet manifolds, and cuts the pair of jet apertures at the base of the structure so as to illustrate the aspect ratio of the jet length versus width, referencing FIG. 10B.

FIGS. 21A and 21B show an elevation view and section plane along the aerodynamic concentrator axis of the sampler of FIG. 20. FIG. 21C is a close-up section view of the aerodynamic particle concentrator and its operation in particle sampling from a surface.

FIGS. 22A and 22B show a bottom plan view and section plane along the blower axis.

FIG. 23 and FIG. 24 are perspective views of another non-contacting particle sampler apparatus.

FIG. 29 is a representative chart of a first process for operating a slit jet array of the invention.

FIG. 30 is a representative chart of a first process for operating a slit jet array of the invention.

Figure 1A:
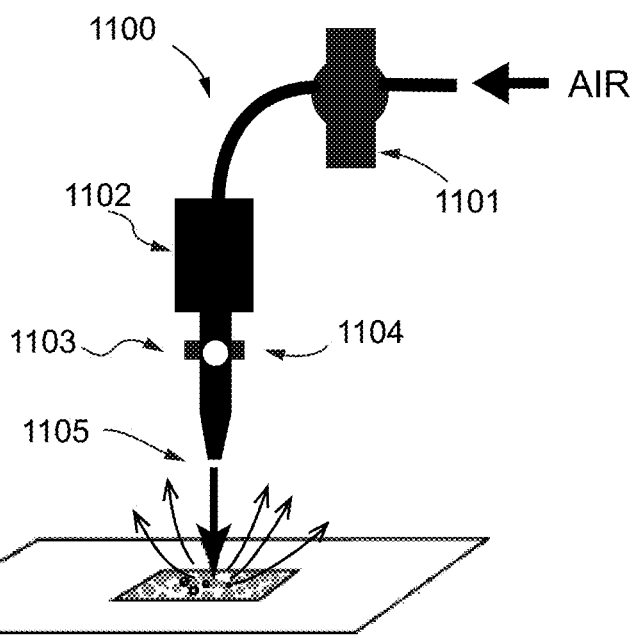
FIG. 1A is a view of a conventional axisymmetric jet for particle sampling from surfaces.

The drawing figures are not necessarily to scale. Certain features or components herein may be shown in somewhat schematic form, and some details of conventional elements may not be shown in the interest of clarity, explanation, and conciseness. The drawing figures are hereby made part of the specification, written description and teachings disclosed herein.

Glossary

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

Unless otherwise defined, all technical and scientific terms used herein have the same meaning as commonly understood by one of ordinary skill in the art to which this invention belongs. In case of conflict, the present specification, including definitions, will control.

NCS: refers to a non-contacting particle and vapor sampling apparatus for aerodynamic mobilization and capture of surface-bound particles and boundary layer vapors at a standoff distance from a target surface. The system includes a) a sampler body having a sampling head end and a blower section end, the blower section with blower and the sampling head with i) at least two jet nozzles operable with a jet feed flow having pressure and momentum, wherein the jet nozzles are disposed on a first surface of the sampling head and are angulated to emit jets that collide on a target surface as opposing wall jets; ii) a suction intake port between the jet nozzles, wherein the intake port is operable under suction, further wherein the sampling head and blower section are fluidly connected by a first manifold configured to supply a gas feed from the blower to the jet nozzles in the sampling head and a second manifold configured to convey sampling return gas flow from the intake port of the sampling head to the blower, further wherein the jet feed flow and at least a part of the sampling return gas flow are pneumatically connected in a gas flow loop through the blower; b) further wherein the wall jets have a velocity and momentum configured to mobilize and lift particles and vapors from a target surface and the jet feed flow and sample return flow are balanced so that any vapor or particulate material mobilized from a target surface is redirected up and into the suction intake port during sampling.

In a preferred embodiment, NCS denotes an apparatus with more specificity having two conjoined body parts, a sampling head section and a blower body section, for the purpose of enabling exchange of different sampling heads for different applications. In more detail, the apparatus comprises a) a sampler body having a sampling head section and a blower body section, the blower body section with blower and the sampling head with: i) a pair of slit jet orifices operable with a jet feed flow having pressure and momentum, where the slit jet orifices are disposed contralaterally on a nose of the sampling head; ii) a suction intake port disposed between the slit jet orifices, where the intake port is operable under suction;

b) where the sampling head section and blower body section are configured to be mechanically joined at a fixed or a detachable fluidic interface, the sampling head section and blower body section each enclose a segment of two manifolds: a first and second manifold, such that when joined: i) the segments of the first manifold are fluidly joined at the fixed or detachable fluidic interface and the first manifold is configured to supply a jet feed flow from the blower to the slit jet orifices in the sampling head; ii) the segments of the second manifold are fluidly joined at the fixed or detachable fluidic interface and the second manifold is configured to convey at least a part of a sampling return gas flow from the intake port of the sampling head to the blower;

c) importantly, there is a gas flow loop such that the first manifold with jet feed flow and the second manifold with at least a part of the sampling return gas flow define the gas flow loop, and the gas flow loop is characterized in that gas discharged from the blower (the jet feed flow) is directed to the slit jet orifices; gas discharged from the slit jet orifices (the jet discharge flow) is redirected into the suction intake port (the sampling return flow); and the sampling return flow at least in part is cycled back to the blower;

d) also, the slit jet orifices are configured to emit each an essentially planar jet and the jets are angulated to collide as opposing wall jets on a target surface; and, e) the opposing wall jets have a momentum configured to mobilize and lift particles and vapors from a target surface, the jet feed flow and sample return flow are balanced to collect the jet discharge flow and any vapors or particulate material mobilized from a target surface into the sampling return flow during sampling, without contact of the sampling head against the target surface.

In use, a mode of operation is selected from a configuration in which a) the suction intake port is operated continuously during sampling (generally the suction pressure is turned on first) and the jet nozzles are operated with continuous flow; or b) the suction intake port is started first and operated continuously during sampling and the jet nozzles are operated with pulsatile flow for the duration of sampling. As currently practiced, the jet nozzles are contralateral opposing slit jet nozzles disposed on either side of the suction intake port, but may also be round nozzles arrayed around the suction intake port.

The NCS may also include an analytical workstation with one or more detectors for analyzing and identifying one or more chemical constituents of a particle or a vapor, and in some instances may also include a detector to supply particle counts. The sampling head may be provided with a pneumatic interface that rigidly mates with and attaches to a blower body section of the body that contains a fan and motor, with connections between jet feed and a return gas flow manifolds in each body section so as to form a patent fluidic loop for discharging jet feed gas from the blower to the jet orifices and for returning at least in part a sampling return flow to the blower. By providing a fluidic junction between body sections, sampling heads having different gas flow configurations may be interchangeably attached to the blower body. However, one skilled in the art will immediately recognize that a single body construction may contain any manifolds and components needed. The body sections may be made by 3D printing or other means known in the art. Optionally the body may be split along an axis into two halves, for example, as is often seen with molded parts. Therefore, the definition of an NCS is to be viewed as inclusive of all sampler apparatus species having looped pneumatics and jet orifices configured to enable the practice of the invention. The invention is not in the parts individually and their manner of construction, but in its whole.

"Wall shear stress": is defined as $$\tau = \mu \frac{dv_x}{dy}$$

where $\tau$ is the shear stress, $\mu$ is density, and $dv_x/dy$ is the "X" velocity gradient in the "Y" direction (also sometimes written $\delta u/\delta y$). "Tau" ($\tau$) has units of Pascals, mu ($\mu$) is the fluid molecular viscosity.

For a free supersonic jet, three distinct regions can be observed: (1) the under-expanded region where the flow is supersonic, $Ma \geq 1$; (2) the compressible flow region, $0.3 > Ma > 1.0$; and (3) a subsonic jet, $Ma < 0.3$.

With reference to jets impinging on surfaces, an impinging jet typically is analyzed as having three regions of flow: a free jet that may contain shock structures, a stagnation region where the moving fluid impinges on a solid surface, and a "wall jet" that is diverted to run along the surface of the plate.

Supersonic flow regime: gaseous flows having velocities of 1.0 Mach or greater in at least a part of the flow profile. The supersonic jet is associated with rapid changes in fluid density (shock and expansion waves). With reference to jets impinging on surfaces, an impinging supersonic jet typically is analyzed as having three regions of flow, a free jet that may contain shock structures, a stagnation region where the moving fluid impacts a solid plate, and a wall jet that is redirected along the surface of the plate.

Compressible flow regime: a gaseous fluid having regions of velocities in the range of Mach 0.3 to <1.0. Compressible flow of a gas stream is characterized by changes in density with respect to pressure along a streamline.

Incompressible flow regime: a gaseous fluid is having a velocity where the Mach number does not exceed about 0.3, although the transition from incompressible to compressible is not a precise demarcation, and mixed flow regimes may occur.

Critical Dimension—the dimension $L_c$ in a channel or tube that is determinate in establishing flow velocity and flow regime conditions of a gas stream through a channel or tube, and used here to indicate the width of a slit jet for calculation of H/D. The critical dimension also determines the local Reynold's number Re and is used in the calculation of the Stokes Number Stk and the choke pressure.

"Aerodynamic particle concentrator" (also termed "air-to-air particle concentrator" with "virtual impactor"): is a term of art described for example in U.S. Pat. No. 8,561,486 to Novosselov. See for example FIGS. 18, 24 and 39 of the '486 patent and related discussion in U.S. Pat. No. 7,875,095 to Ariessohn and Novosselov, both of which are incorporated in full by reference. Scientific descriptions and theoretical underpinnings of virtual impactors and aerodynamic focusing of particle streams are described in Peng et al. (1995) Generating particle beams of controlled dimensions and divergence: II. Experimental evaluation of particle motion in aerodynamic concentrators and nozzle expansions. Aerosol Sci Technol 22:293-313; Loo B W et al. Dichotomous virtual impactors for large scale monitoring of airborne particulate matter, In (BYH Liu, ed) Fine Particles: Aerosol generation, measurement, sampling and analysis (1976) pp. 312-349; Chen, B T and H C Yeh (1985) A Novel Virtual Impactor: Calibration and Use, J Aerosol Sci 16: 343-354; Novick V S and J L Alvarex (1987) Design of a multi-stage virtual impactor, Aerosol Sci Tech 6:63-70; Loo B W and C P Cork (1988) Development of high efficiency virtual impactors, Aeros Sci Techn 9:167-176; Marple V A et al (1980) Virtual Impactors: a theoretical study, Environ Sci Tech 14:976; and Goo, J (2002); Atmospheric pressure aerodynamic lens design, (Novosselov and Ariessohn 2014), Aerosol collectors that include aerodynamic particle focusing can also be found in (He and Novosselov 2017) and (He, Beck et al. 2018. Numerical simulation of aerosol concentration at atmospheric pressure by a cascade of aerodynamic slit lenses, J Aerosol Sci 33:1493-1507)—all of which are incorporated in full by reference.

"Concentration and analysis modules" are known in the art for concentration, detection, and identification of particles or vapors and may be selected for physical, chemical or biological analysis as a combination with the front-end sampling heads described here. A pre-concentrator, an impactor, an impactor bypass, a virtual impactor, a trapped vortex concentrator, a sampling cartridge, a filter, an affinity capture column, or another analytical module may be adapted for use. Those devices capable of real time analysis are preferred as currently practiced.

Detection methods include visual detection, machine detection, manual detection or automated detection. Means for detecting include laser particle scattering, liquid chromatography (LC), high pressure liquid chromatography (HPLC), high pressure liquid chromatography with mass spectroscopy (HPLC/MS), gas chromatographic mass spectroscopy (GC/MS), gas chromatography coupled to electron capture detection (GC-ECD), atmospheric pressure ionization time-of-flight mass spectrometry (TOFMS), ICP-mass spectrometry, ion mobility spectroscopy (IMS), differential ion mobility spectroscopy, secondary electrospray ionization—ion mobility spectrometry, electrochemistry, polarography, electrochemical impedance spectroscopy (EIS), surface plasmon resonance (SPR), fast atom bombardment spectroscopy (FABS), matrix-assisted laser desorption ionization mass spectrometry (MALDI/MS), inductively coupled plasma mass spectroscopy (ICP/MS), Raman spectroscopy (RS), FTIR, SAW spectroscopy, surface-enhanced Raman spectroscopy (SERS), laser-induced breakdown spectroscopy (LIBS), spark-induced breakdown spectroscopy (SIBS), lateral flow chromatography, NMR, QR (quadrupole resonance), and so forth. Detection systems are optionally qualitative, quantitative or semi-quantitative. Of particular interest for detection of explosives are electron capture (often combined with gas chromatography), ion mobility spectroscopy, mass spectroscopy, and chemiluminescence (often combined with gas chromatography).

One common analytical instrument for detection of nitrate-type explosives relies on pyrolysis followed by redox (electron capture) detection of NO2 groups (Scientrex EVD 3000), but is prone to false alarms. So too is chemiluminescence. Also of interest is differential mobility spectroscopy as described in U.S. Pat. No. 7,605,367 to Miller. Ion mobility spectroscopic (IMS) detectors are in widespread use and typically have microgram or picogram sensitivity. IMS requires ionization of the sample, which is typically accomplished by a radioactive source such as Nickel-63 or Americium-241. This technology is found in most commercially available explosive detectors like the GE VaporTracer (GE Security, Bradenton, Fla.), Sabre 4000 (Smiths Detection, Herts, UK), Barringer IonScan™ 400, and Russian built models.

The luminescence of certain compounds undergoing reaction with electron-rich explosive vapors has been improved with the introduction of amplifying fluorescent polymers as described in U.S. Pat. No. 7,208,122 to Swager (ICx Technologies, Arlington Va.). Typically, vapors are introduced into a tubular sensor lined with a conductive quenchable fluorescent polymer by suction. These sensors lack a pre-concentrator and work only for analytes with electron-donating properties. More recent advances have extended work with fluorescent polymers to include boronic peroxide-induced fluorescence, as is useful for detecting certain classes of explosives.

FIDO® detects TNT and other explosives (J. S. Yang, and T. M. Swager, 1998. "Porous Shape Persistent Fluorescent Polymer Films: An Approach to TNT Sensory Materials." Journal of the American Chemical Society, 120, 5321-5322). It is approximately 1000 times more sensitive than most explosive detection systems currently used for passenger screening in airports. This sensitivity is achieved by using cooperatively fluorescent polymeric materials. In the absence of TNT, the polymers fluoresce (emit visible light) when exposed to light of the correct wavelength. When molecules of TNT are present, the intensity (brightness) of the fluorescence is quenched by a self-amplifying effect, and a sensitive photo detector then detects the drop in fluorescence intensity. At this time, the sensor detects TNT, 2- and 4-DNT, and other nitro aromatic compounds derived from TNT. In laboratory tests, the sensor has demonstrated lower limits of detection of one femtogram ($1\times10^{-15}$ grams) of TNT vapor. Fluorophore polymers for detecting other hazardous or illicit materials may also be used. Publications related to coordinately quenched fluorophores for trace analyte detection are incorporated in full by reference.

A MEMs-based pre-concentrator (an adsorbent bed) has recently been integrated into the FIDO explosives vapor detector to increase the volumetric sampling rate of the system. This adsorbent matrix increased the volumetric sampling rate of fluorescence detection systems from 30 mL/min to in excess of 2 L/min by a modified batch process with thermal cycling of the adsorbent matrix. Adsorbent matrices are well known in the art, having been pioneered by Almirall. Recent work includes U.S. Pat. Nos. 6,171,378 and 7,118,712 to Manginell and U.S. Pat. No. 7,713,421 to Galbraith, WIPO Doc. No. 2010/095123 to Langford and in US Pat. Appl. Doc. 2009/008421 to Almirall, for example. Literature on selection and use of sorbent materials for SPME and related pre-concentration arts is widely available. A more detailed reading list includes E. J. Houser et al, 1999, Sorbent coatings for detection of explosives vapors: applications with chemical sensors, Proceedings of the SPIE, Orlando, Fla., 3710:394-401; Houser, E J et al., 1994, Linear and Hyperbranched Hydrogen Bond Acidic Poly(silylene methylene)s for Chemical Sensor Applications, PMSE Preprints 203, 88, 548, in R. A. McGill, M. H. Abraham, J. W. Grate, Choosing polymer coatings for chemical sensors," CHEMTECH 24, pp. 27-37; Houser E J et al. 2001. Rational materials design of sorbent coatings for explosives: applications with chemical sensors, Talanta 54:469-84; Pai R S et al., 2008, Sorbent Coatings and Processing Techniques for Trace Analysis of Hazardous Materials in Micro/Nano Sensors, IEEE University/Government/Industry Micro/Nano Symposium, 2008. UGIM 17th Biennial Volume, Issue 13-16:153-156; Voiculescu, I et al., 2006, Micropreconcentrator for Enhanced Trace Detection of Explosives and Chemical Agents, Sensors Journal, IEEE, Volume 6:1094-1104; US Pat. No. 6660230; US Pat. Appl. Nos. 2005/0276726 and 2009/0084201, all of which are incorporated herein in full by reference.

Other analytical modalities are known in the art, and include the MDS Sciex CONDOR, Thermedics EGIS, Ion Track Instruments Model 97, the Sandia Microhound, Smith's Detection Cyranose, FIDO® (FLIR Systems, Arlington Va., formerly ICx Technologies), Gelperin's e-nose (U.S. Pat. No. 5,675,070), Implant Sciences' Quantum Sniffer', and others. However, these technologies are associated with aspiration and analysis of free vapors without concentration, which are typically in vanishingly small concentrations, either because a) the vapor pressure of the material is inherently small, or b) if vapor pressure is larger, then significant quantities of a more volatile analyte will have been lost due to ageing of the material prior to sampling. Also a detriment, some of these detectors have had maintenance issues related to fouling or poisoning of the adsorbent or detector due to aspiration of particles. Thus the system of the invention offers a clearcut advance in the art, permitting the separation of vapors from a moving gas stream without filtration or adsorption onto a solid phase bed and thus permitting continuous analysis when coupled to a suitable detection platform. Semi-continuous and batch type processes are also flexibly accommodated by hot trapped vortex vapor concentrators. Publications related to these processes are incorporated in full by reference.

Conventional systems are described in U.S. Pat. Nos. 7,256,396, 7,260,483, and 6,972,408 and more recently in US Pat. 2010/0252731, where high vacuum is used (0.1 to 30 mTorr). Also of interest is the Aerodyne Aerosol Mass Spectrometer [Takegawa et al, 2005, "Characterization of an Aerodyne Aerosol Mass Spectrometer" Aerosol Sci Tech 39:760-770; Bae et al., 2007, "Interference of organic signals in highly time-resolved nitrate measurements by low mass resolution aerosol mass spectrometry. J Geophys Res 112:1-16]. In this system, analyte vapors are released by laser ablation from a very well collimated particle beam (typically <0.25 mm diameter) and ionized in flight. The resulting vapors are conveyed in a buffer gas at high vacuum, typically with Einzel lensing, into a mass spectrometer. However, the detector can be badly damaged by the entry of intact particles that escape the laser. Moreover, the particle-by-particle approach and requirement for high vacuum substantially limits application for high throughput analysis.

Publications related to these analytic processes are incorporated in full by reference. Preferred analytical approaches are those performed in real-time (RT) with continuous particle intake. However, batch or semi-batch analysis is also practiced.

With suitable detectors, particulate material can be analyzed directly on an impactor (or other particle trap) by spectrometric or pyrometric means. Or constituents that are stripped from the particle trap are conveyed to an analytic module for analysis. In a preferred system, the particles can instead be sampled by injecting a small volume of solvent for liquid extraction. A liquid sample results. Liquid elution of particular analytes or classes of analytes may be accomplished using one or more chemically selective solvents. Selective elution can be advantageous in that insoluble interferences are left in the trap for Subsequent incineration or purging, thus achieving not only pre-concentration but also pre-purification. Ultrasound may be used to enhance elution and may also be used to clean fouled surfaces of the particle trap. Such liquid samples are compatible with liquid chromatography, including reverse phase and ion chromatography, and with electrospray mass spectroscopy, for example. The repertoire of liquid-based detection methods available are vast and are not reviewed here. Alternatively, a liquid sample may be vaporized for gas phase analysis or may be subjected to solid phase extraction in a focusing trap prior to analysis. Advantageously, solvents may be selected exclude insoluble materials Such as minerals, ash, and hair but readily and selectively solubilize constituents of interest associated with the skin particles, hairs, dust, explosives crystals, and so forth. In our hands, acetonitrile has proved a useful solvent for elution of explosives, successfully eluting both RDX and TATP, for example. Dimethylformamide, tetra-hydrofuran, butyrolactone, dimethylsulfoxide, n-methyl-pyrrolidinone, propylene carbonate, acetone, ethylacetate, methanol, water, and chloroform are also useful and may also be used to selectively remove interferences in some instances. Also useful are solvent mixtures and gradients thereof, as have been described by D L Williams and others.

In related methods and devices, a coating of carbon in the particle trap may be used to enhance capture of volatiles and vapors associated with a particle-enriched stream. Because carbon has a very high affinity for many vapors, hot solvents are generally more effective in releasing adsorbed vapors from activated carbon than heat alone. Hot Solvent also increases the specific heat capacity of a hot carrier gas stream and can improve convective heating of sorbent beds, aiding in desorption of constituents of interest and in cleardown.

In some instances, an absorbent will be supplied in a removable cartridge, and cartridges requiring more detailed analysis may be removed from the sampling head(s) for analysis at a remote workstation.

In another system for continuous operation, a system will be supplied with two or more particle capture "traps" or impactors. The system is thus capable of essentially continuous operation by alternating collection and analysis modes between the particle traps and diverting the particle stream to the trap in collection mode until it is sufficiently loaded with particles and its contents can be analyzed.

Related systems are described in PCT Publication WO/2008/049038 to Prather, U.S. Pat. No. 6,906,322 to Berggren, and U.S. Pat. No. 6,664,550 to Rader. However, these devices are readily overloaded when confronted with large amounts of complex mixtures, interferents, and dust, such as are likely to be encountered in routine use and hence have had limited applicability. Publications related to these processes are incorporated in full by reference. Like FIDO, mass spectroscopy also offers the potential for miniaturized continuous flow detection and likely will continue to have an inherent capacity to simultaneously detect a broader range of possible target analytes. Conventionally, the inlet flow rate into an MS instrument is small (less than 1 mL/min). A common practice employed with detectors that can process limited sample volumes is to use a split flow into the detector that essentially purges most of the sample; this approach is undesirable since most of the sample volume is not analyzed.

Alternatively, an adsorbent matrix like that described above may be used to pre-concentrate a trace vapor stream, with intermittent thermal cycling to release the adsorbed vapors. The adsorbent bed can be heated to desorption in approximately 100 ms, and because it has low thermal mass the chip cools back to ambient temperature in less than 5 s when a flow of air is drawn through the chip. Hence, the sampling duty cycle of the chip would be on the order of 8-10 s/cycle, which is compatible with a batch-sampling approach.

Very recently, exceptionally compact mass spectrometers utilizing cylindrical ion trap (CIT) technology have been developed at Purdue University and are being commercialized by ICx Technologies. This is a significant advancement in MS capability because it allows for continuous flow under conditions where ions are collected in an electrical field and may be released into the detector according to their mass/charge ratio without the need for a chromatographic step. Complex target analyte fingerprints can be accumulated and matched with libraries of known substances. Like traditional quadrupole ion traps with hyperbolic electrode geometries, the CIT utilizes a three-electrode structure comprising a ring and two end-cap electrodes to perform mass analysis. Ions generated in the manner described above are trapped between the electrodes by an oscillating electric field. Ions of a particular mass-to-charge ratio can be trapped within this field for an indefinite amount of time and may be released for analysis according to programmed instructions. Publications related to CIT are incorporated in full by reference. Once ions are trapped in the CIT, they can be further manipulated for MS/MS. All ions of a particular mass-to-charge ratio oscillate at a very specific frequency given a set of experimental conditions. These ions can be further manipulated by applying a frequency in resonance with their oscillation frequency. This is typically done at an amplitude great enough to cause unwanted ions to be ejected or an amplitude just high enough to cause fragmentation of the ions. By ejecting ions that are either unwanted or may be interfering with the ions of interest, or by generating specific fragment ions, an analyte's identity can be confirmed with higher specificity. By incorporating CIT technology into Griffin spectrophotometers, the vacuum requirements are also reduced and the power requirements minimized, thus achieving analytical performance and resolution equivalent to floor-sized quadrupole mass spectrometers. The above description is not limiting with respect to devices and systems for chemical analysis but is representative of the relative scope of technologies available. Advantageously, the sampling heads of the invention may include one or more analytical devices and thus can be termed "sampling and detection systems".

A number of methods may be used to augment the capacity of the sampler head to mobilize and lift off particles from substrates. One such technique is a jet gas feed ionized by contact with a source of ions, such sources including but not limited to a "corona wire a source of ionizing radiation, a glow discharge ionization source, or a radio-frequency discharge. The ionized gas stream is used to neutralize electrostatic associations of particles with surfaces and improve lift off of particles.

Collisions of higher molecular weight gas atoms or molecules result in improved desorption of residues. The carrier is typically air, argon or nitrogen and the gas or solvent is a high molecular weight molecule Sufficient to aid in dissociation of particles and volatile residues from the object or environmental surface of interest. Pressurized gas tanks eliminate the need for an onboard compressor or blower, thus reducing power requirements for portable applications. The presence of organic vapors also can aid in volatilizing chemical residues. Such as explosives and will compete with organic molecules for binding to solid substrates. Heated jet pulses or infrared lamps directed from the sampling head have been proposed by others for improving sampling efficiency for vapors, however, it should be recognized that premature heating can reduce particle collection efficiency. Near-sonic or supersonic jet pulses are preferable to hot air for aerosolizing particles from substrates.

General connection terms including, but not limited to "connected," "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge (either data or power) are conveyed therethrough. A "pneumatic loop" indicates one or more manifolds or ducts that are fluidly connected so as to cycle gas in a loop flow.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to."

It should be noted that the terms "may," "can" and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

The foregoing and other objectives, features, and advantages of the invention will be more readily understood upon consideration of the following detailed description of the invention, taken in conjunction with the accompanying drawings, in which preferred embodiments of the invention are illustrated by way of example. It is to be expressly understood, however, that the drawings are for illustration and description only and are not intended as a definition of the limits of the invention.

FIG. 1A is a view of a conventional axisymmetric jet for particle sampling from surfaces. The figure is adapted from a published work [Keedy et al., Removal rates of explosive particles from a surface by impingement of a gas jet. Aerosol Sci Tech. DOI 10.1080/02786826.2011.616920.] Gas is ejected under pressure from a round nozzle. The apparatus includes an air inlet, a reservoir 1102 for storing pressurized gas, a pressure regulator 1101, a pressure transducer 1103 and solenoid valve 1104 that controls release of air into the jet nozzle 1105.

Figure 1B:
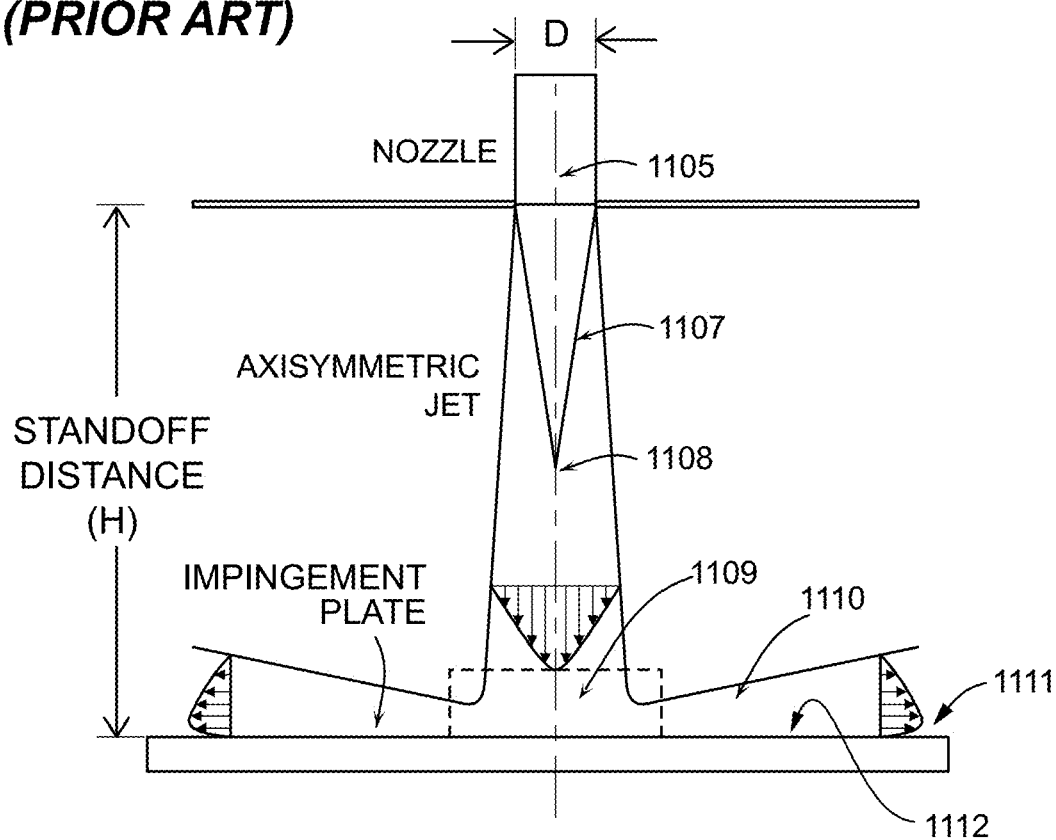
FIG. 1B is a cross-section through a representative conventional axisymmetric jet nozzle, with jet shape and structure illustrated schematically.

FIG. 1B is a cross-section through a representative conventional axisymmetric jet nozzle, with jet shape and structure illustrated schematically. The inside structure of the jet has been analyzed and includes a "core flow" region 1007 that expands into a "free jet" 1108 after exiting the jet nozzle 1105. On impact with a solid surface 1112, the jet is re-radiated all around the axis of flow. At the impingement point, a stagnation zone 1109 is observed and a lateral flow, termed here a "wall jet zone" (1110), develops on the surface. Velocities and shear are lower in the boundary layer 1111, as illustrated in FIG. 2.

Figure 2:
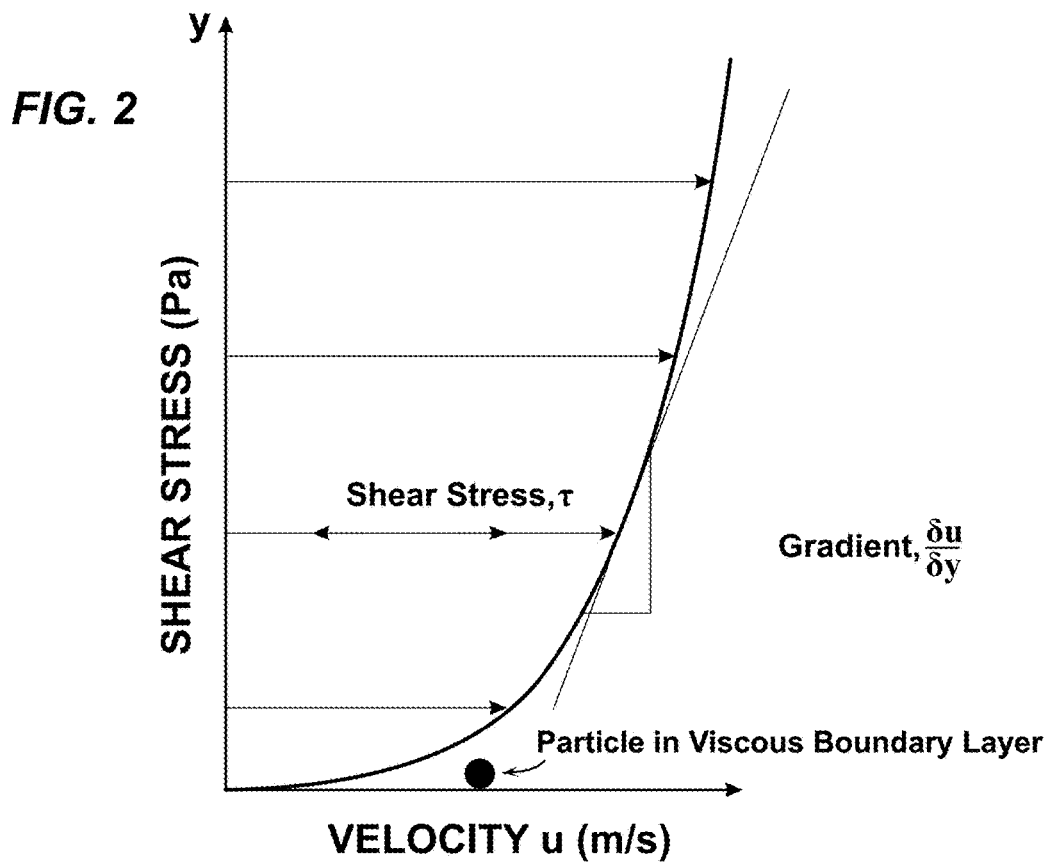
FIG. 2 summarizes key parameters that characterize the tool (i.e., gas flow) as used to improve particle mobilization and capture from a surface. Particle mobilization is in part a function of wall jet velocity and shear stress in the viscous boundary layer.

FIG. 2 summarizes key parameters that characterize the tool (i.e., gas flow) as used to improve particle mobilization and capture from a surface. Particle mobilization is in part a function of wall jet velocity and shear stress in the viscous boundary layer. Velocities are not plug flow, but may be characterized as bullet flow with drag when contacting the boundary layer. The effect of the flow on a particle is dependent on the particle's aerodynamic height and the depth of the boundary layer.

Figure 3A:
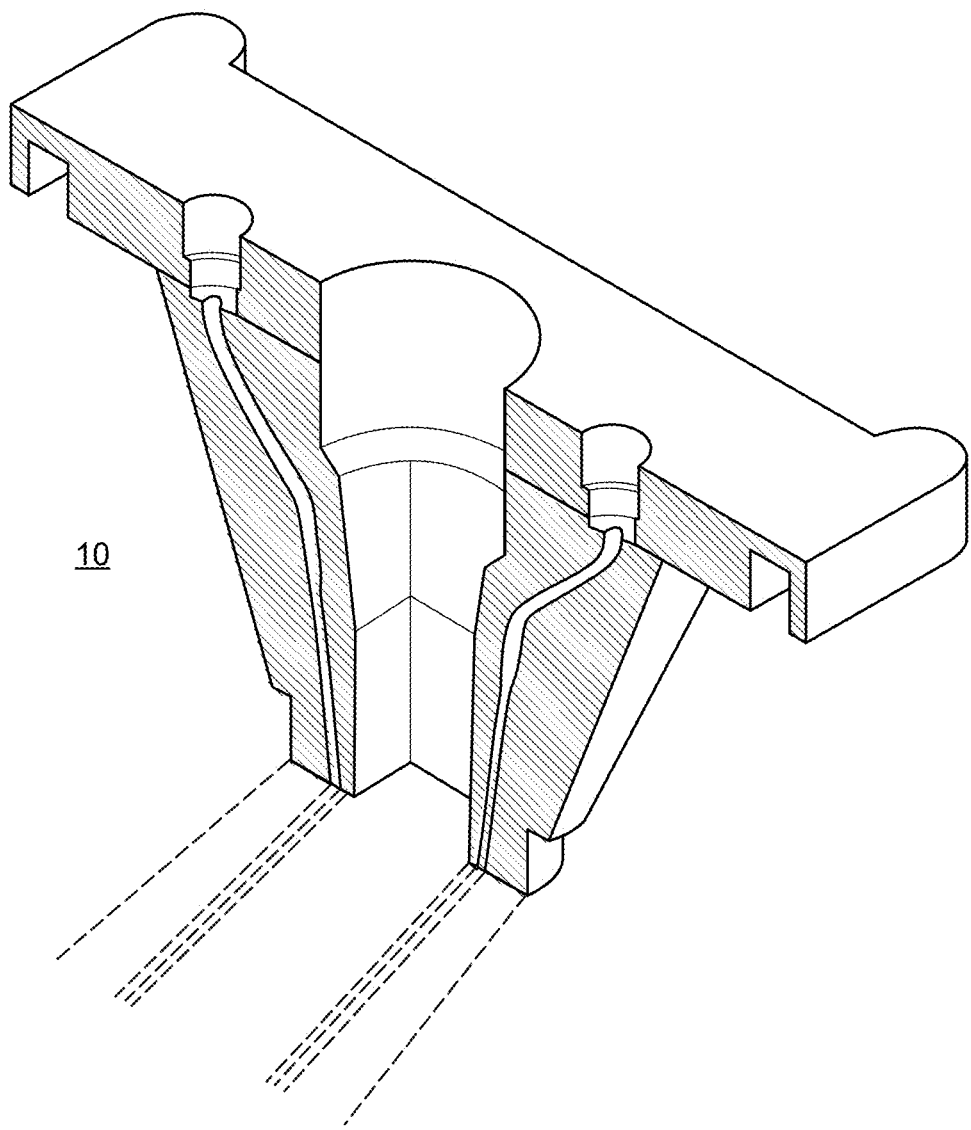
FIG. 3A is a CAD view in open section of a "non-contacting sampling head assembly" having a pair of slit apertures, one on each of the sides of a central suction intake. The phantom lines indicate that the slit geometry may be extended laterally to increase the aspect ratio of each jet slit nozzle.

FIG. 3A is a CAD drawing of a first "non-contacting particle sampler" 10 (NCS). Exposed on the open face is a cutaway view of a pair of slit jet apertures, one on each side of a central suction intake extending on a center axis from top to bottom. The phantom lines indicate that the slit geometry may be extended laterally to increase the aspect ratio of each slit jet orifice.

Aspirated gas moves from the suction port through the chimney or manifold and is exhausted through a suction pump such as a centrifugal blower or diaphragm pump (not shown). The two lateral ducts are slit jet apertures and extend from the upper surface of the sampling head to a slit on the lower surface. Gas is forced under pressure into the jet intake and is expelled as a planar jet burst or burst at a higher velocity from the distal slit orifices. Pressure is equalized along the slit.

Figure 3B:
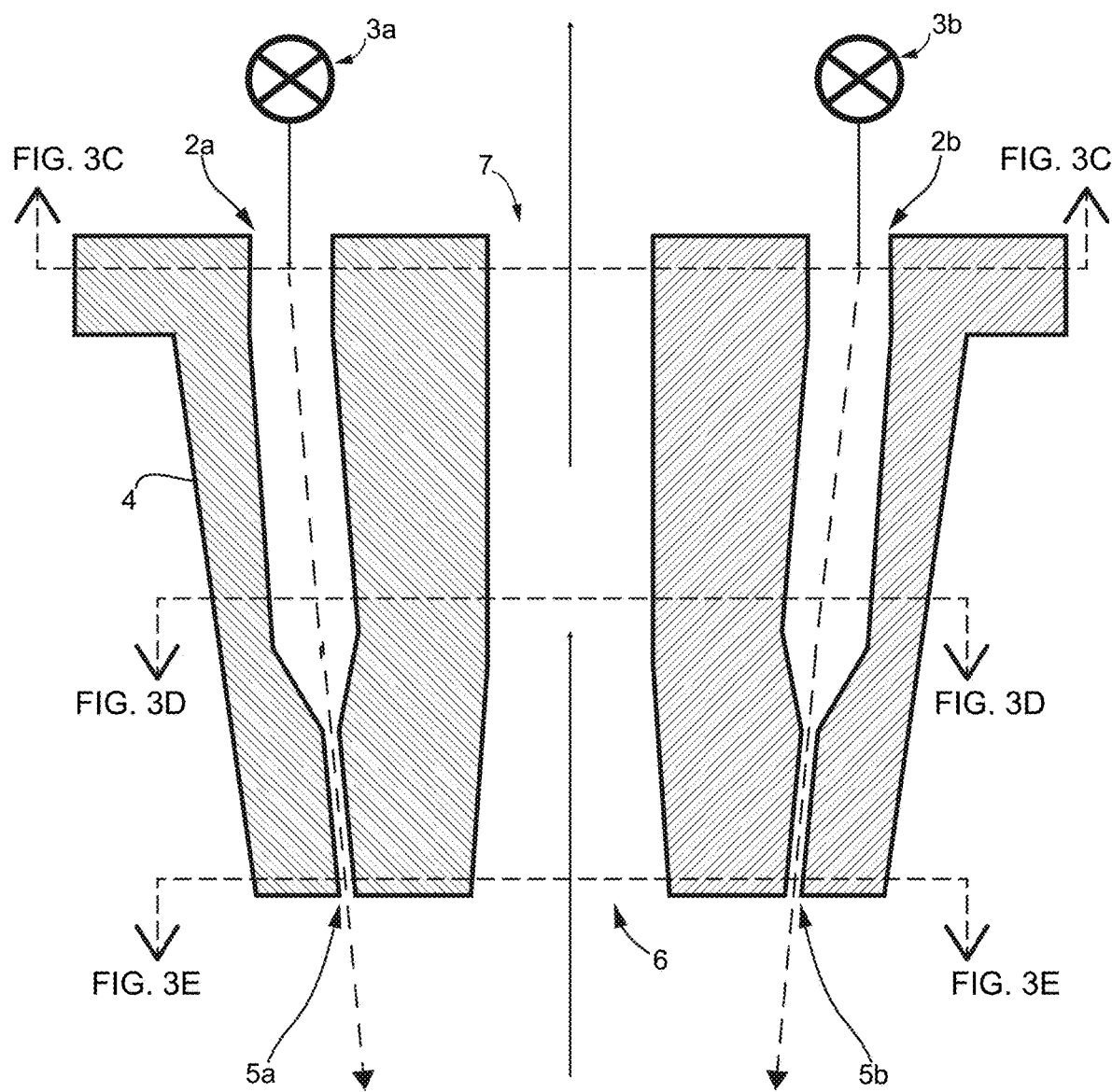
FIG. 3B is a schematic showing the operation of a NCS nose with valves for delivering pulsatile jet bursts

FIG. 3B is a schematic showing the structure and operation of a representative NCS nose with valves for delivering pulsatile planar jet bursts from slit jets 5a,5b. FIG. 3B shows a stack of cross-sections through a representative sampling head 10, with jet feed, valving, and suction port. Gas is forced through ducts 2a,2b under control of high-speed valves 3a,3b. The ducts are formed in an NCS housing body 4. Gas flow may be generally pulsatile (21, FIG. 4), and jet bursts exit the body at slit orifices 5a,5b. Gas and any suspended target analyte is collected at suction port intake 6 and is delivered to a downstream analytical module (not shown) through suction manifold 7. Three sectional views are marked in FIG. 3B and are discussed below.

Figure 3C:
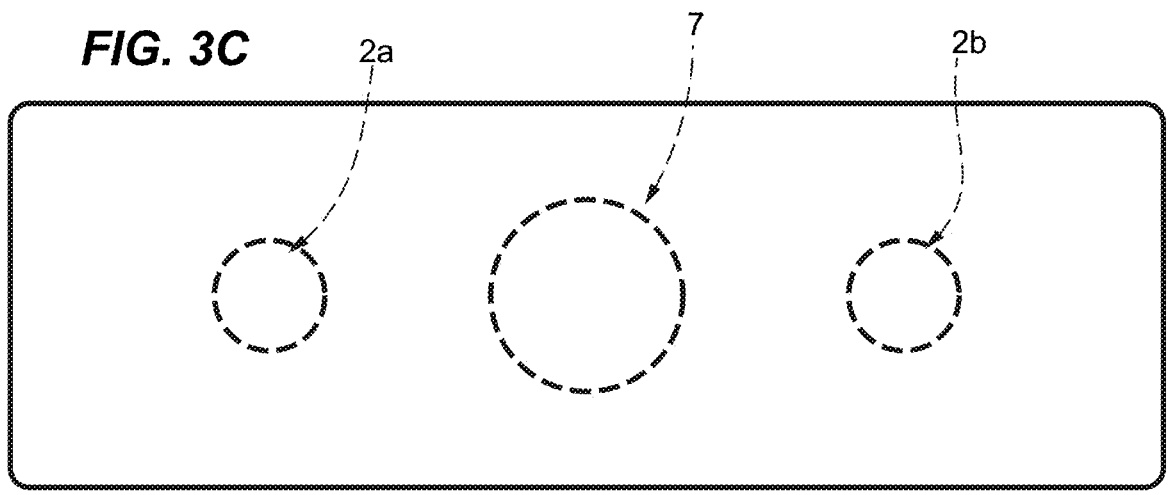
FIGS. 3C, 3D and 3E are representative sections of a non-contacting sampling head assembly with jet outlets and sampling intake. Sections are taken from top to bottom as shown in FIG. 3B.
Figure 3D:
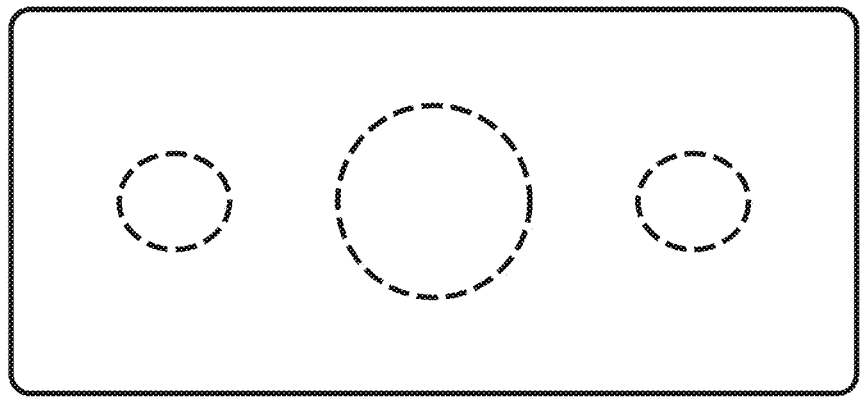
Figure 3E:
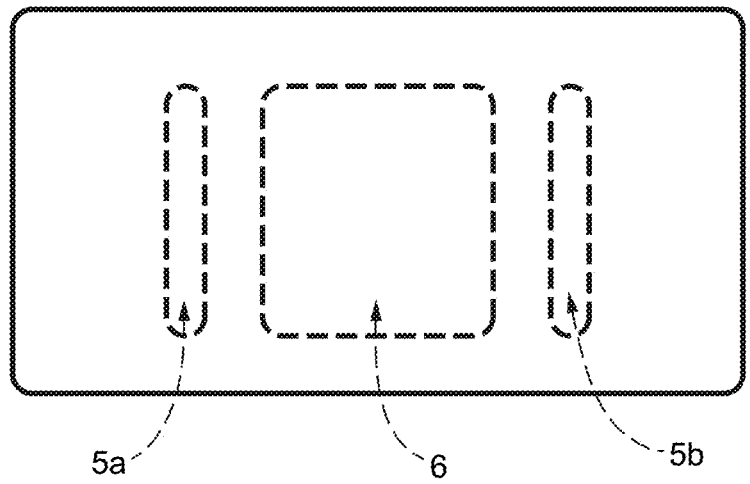

FIGS. 3C, 3D and 3E are representative sections through a non-contacting sampling head assembly with jet outlets and suction intake. Sections are taken from top to bottom as shown in FIG. 3B. Next, FIGS. 3C, 3D and 3E are views at three planes along the primary long axis of the NCS head. The jet intake ducts 2a,2b are marked as before on the top face of the head in FIG. 3B. The central suction manifold 7 is also shown in plan view. FIG. 3D is a view midway through the length of the nozzle and shows each of the ducts to be generally circular in shape. At the jet orifice exit, as shown in FIG. 3E, the jet ports (5a,5b) are distinctly slit-like and are designed to emit a jet burst having the characteristic shape of an air knife in this instance. To streamline the gas suction return, the suction port on the lower face of the nozzle is rectangular or square in plan view but may be tapered or conical.

Figure 4:
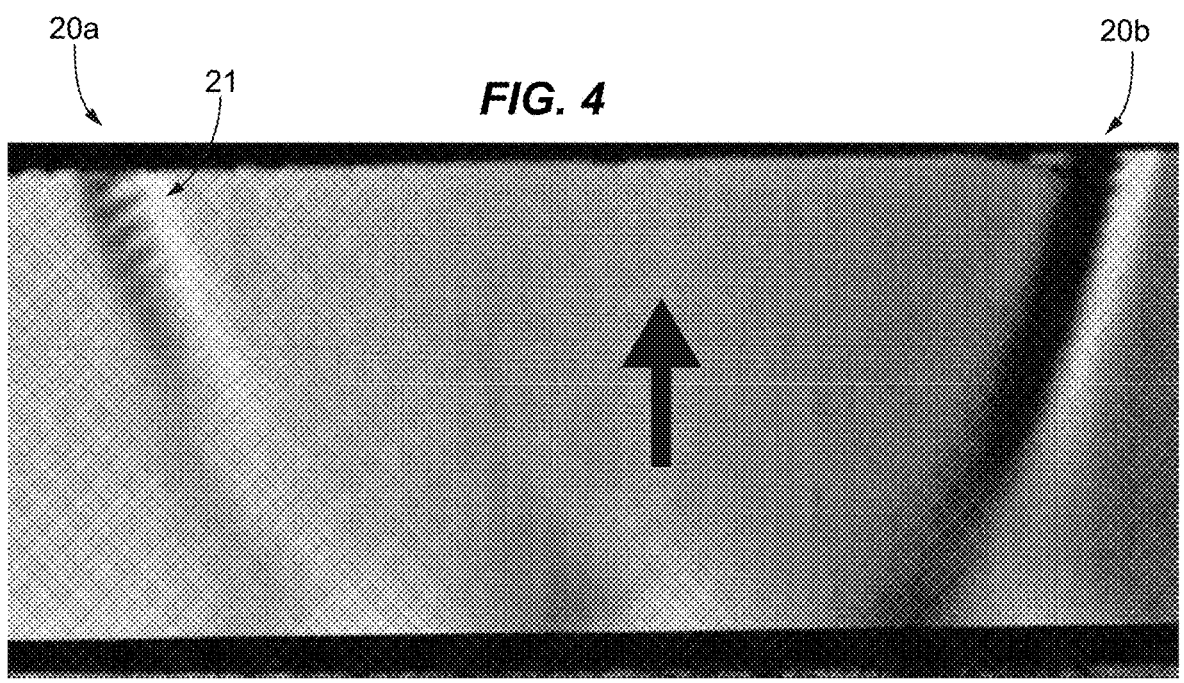
FIG. 4 is a Schlieren image of two convergent jets emitted from representative slit jet apertures of the invention and impinging on a solid surface. Visible between the impinging jet cores are lateral wall jets colliding and lifting up as a turbulent air mass directed into a suction intake in the center between the j et cores.

FIG. 4 is a Schlieren image of two convergent planar jets (21a,21b) emitted from representative slit jet apertures of the invention and impinging on a solid surface. Visible between the impinging jet cores are lateral wall jets colliding and lifting up (bold arrow) as a turbulent air mass directed into a suction intake in the center between the jet cores.

Figure 5A:
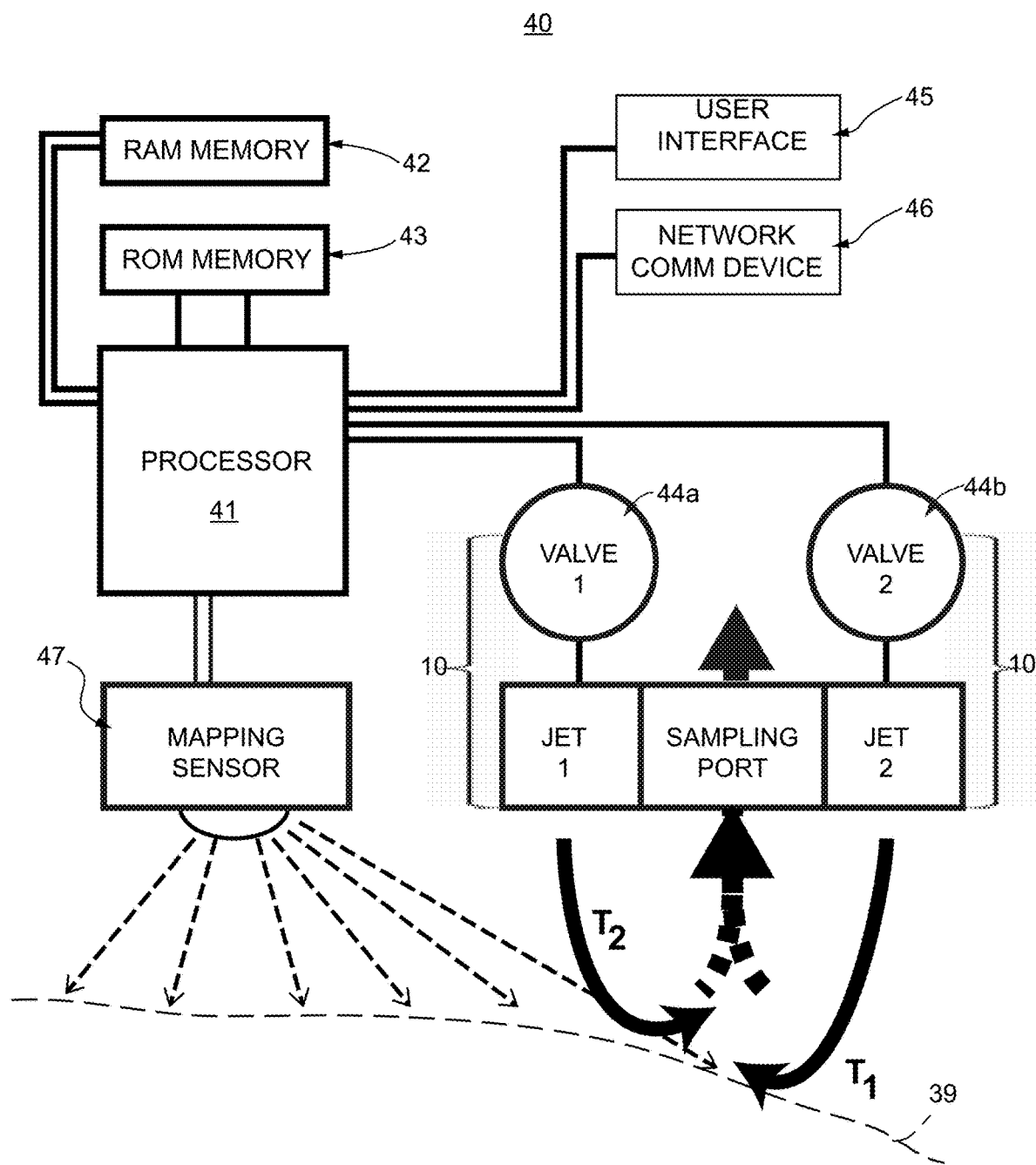
FIG. 5A is a block diagram of a "smart jet" apparatus configured to use sensor data to map a substrate surface and to coordinate activation of opposing slit jets so as to optimize sample entrainment in a suction port.

FIG. 5A is a block diagram of a "smart jet" apparatus 40 configured to use sensor data to map a substrate surface and coordinate activation of opposing jet nozzles so as to optimize sample entrainment in a suction port. In addition to a non-contacting sampling head assembly (10, brackets), a mapping sensor module 47 is also shown. The mapping sensor is essentially a range finder that operates to map any contours in the surface being sampled (39, dashed line). Typically, this may be done with a scanning laser system, for example. Data from the sensor module 47 is fed to a processor 41 which operates with memory elements 42,43 and is provided with an instruction set to calculate jet burst timing from the contour of the target surface and to convey targeting and timing commands to each of two high speed valves 44a,44b that control the jet bursts. The suction port operates as described above. In this representative apparatus, a user interface 45 and network communications port 46 are also provided.

In operation, high-speed valves are triggered to create waveforms of high-velocity pressurized jet bursts. Individual jet bursts may be synchronous, asynchronous and coordinated so as to direct samples to a suction port from an irregular surface. Computerized systems for controlling the jet bursts may include sensor mapping for determining the proximity, angulation and fine structure of the substrate surface in three-dimensions.

The apparatus can be fully automated or can be operated with a trigger such as in a sampling gun. Fully automated versions may be suspended for example from a boom, and may be advanced in front of a vehicle or steered robotically when inspecting enclosed spaces. While not shown, a camera or other sensor may also be included and smart imaging technology deployed to recognize suspicious forms such as evidence of recent digging or packages that seem out of place.

The jet bursts may be synchronous, but more advantageously may be timed in series to optimize uplift of sample particulates and vapors dislodged from the target surface 39. If for example a tilted surface is encountered, firing a first pulse jet burst above the target center at an angle causes a diversion of the jet downhill and toward the target center. A second, stronger pulse jet burst is then sent a few microseconds later and intersects and goes under the first jet burst, causing the initial more concentrated sample material to rise up and roll like a horizontal cyclone, while entering the zone where it is sucked into the intake 6 of the suction port. The concentrate is then carried to an analytical module or sampling station for further processing.

The jet burst timing would be re-calculated and reversed if the tilt of the substrate surface 39 were reversed, and dropped to the left instead of the right. Thus the timing of jet $T_1$ and jet $T_2$ is under the control of processor 41, which performs a complex calculation based on the underlying geometry in order to optimize the smart jet sequence. When more than two jets are utilized, yet more complex calculations are driven by the sensor data and map of the contours of the surface.

Significant parameters in optimizing a sampling system using smart jets include jet reservoir gauge pressure and the slit "diameter" $L_c$, jet nozzle inlet pressure and pressure drop, jet angulation and standoff distance, jet aspect ratio, jet geometry, and jet flow velocity. Representative wall shear stress and wall jet velocity profiles will be shown below.

Figure 5B:
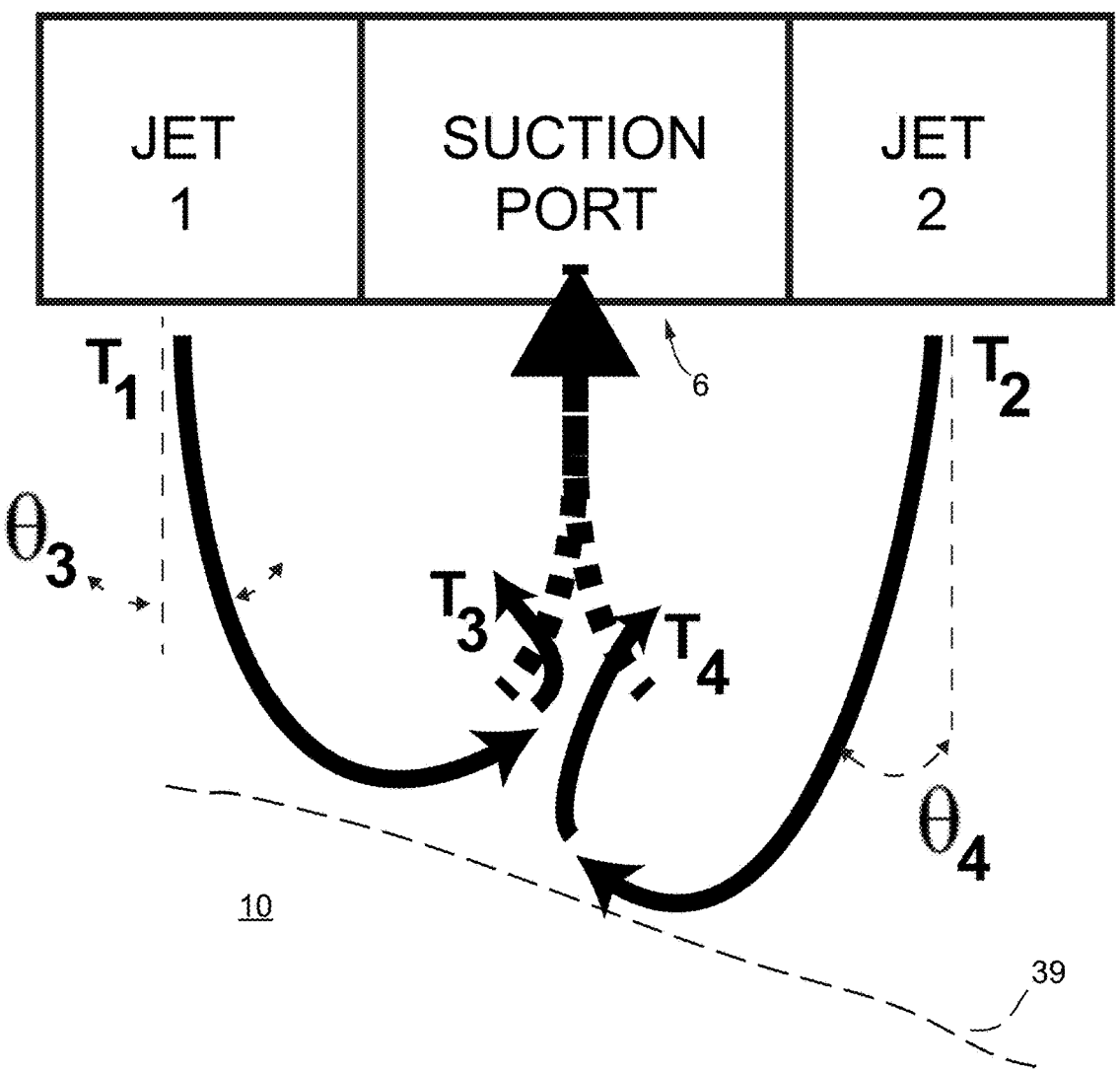
FIG. 5B is a schematic view in close-up, showing asynchronous jet burst activation and control of angulation on a sloped surface.

FIG. 5B is a schematic view in close-up, showing asynchronous jet burst activation and control of angulation on a sloped surface 39. The basic NCS configuration 10 includes two slit jets (JET 1, JET 2) separated by a central sampling intake. The slit jets are angled to converge at a distance below the surface to be sampled, and uplifted air is forced into the sampling intake.

Angles θ3 and θ4 are varied by adjusting the jet burst timing and amplitude. With more advanced robotics, jet angulation may be mechanically changed on the fly in response to a sensor map of the surface being sampled. Alternatively the entire non-contacting sampling head 10 can be tilted to follow a sloping surface. Jets $T_1$ and $T_2$ both strike the surface and are deflected, continuing as jets $T_3$ and $T_4$.

Figure 6:
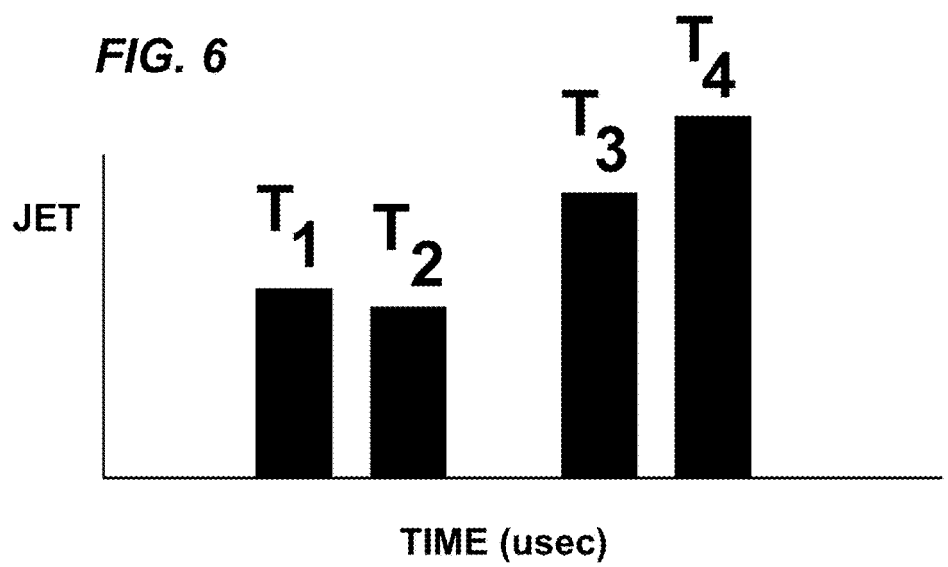
FIG. 6 is a plot showing actuation of two pairs of jet bursts from opposing slit jets. The timing, duration, angulation, and amplitude of jet bursts may be calculated to optimize asynchronous valve actuation for collecting a sample. Feedback sensor loops may also be employed.

FIG. 6 is a plot showing the timing of jet bursts $T_1$, $T_2$, $T_3$ and $T_4$. Time spacing and duration may be synchronous or asynchronous and is calculated to optimize valve actuation for collecting a sample. Timing, duration, angulation, and amplitude may be controlled by computerized solenoids or using robotic arms. Feedback sensor loops may also be employed to ensure that jets $T_3$ and $T_4$ are captured in the intake port.

Figure 7:
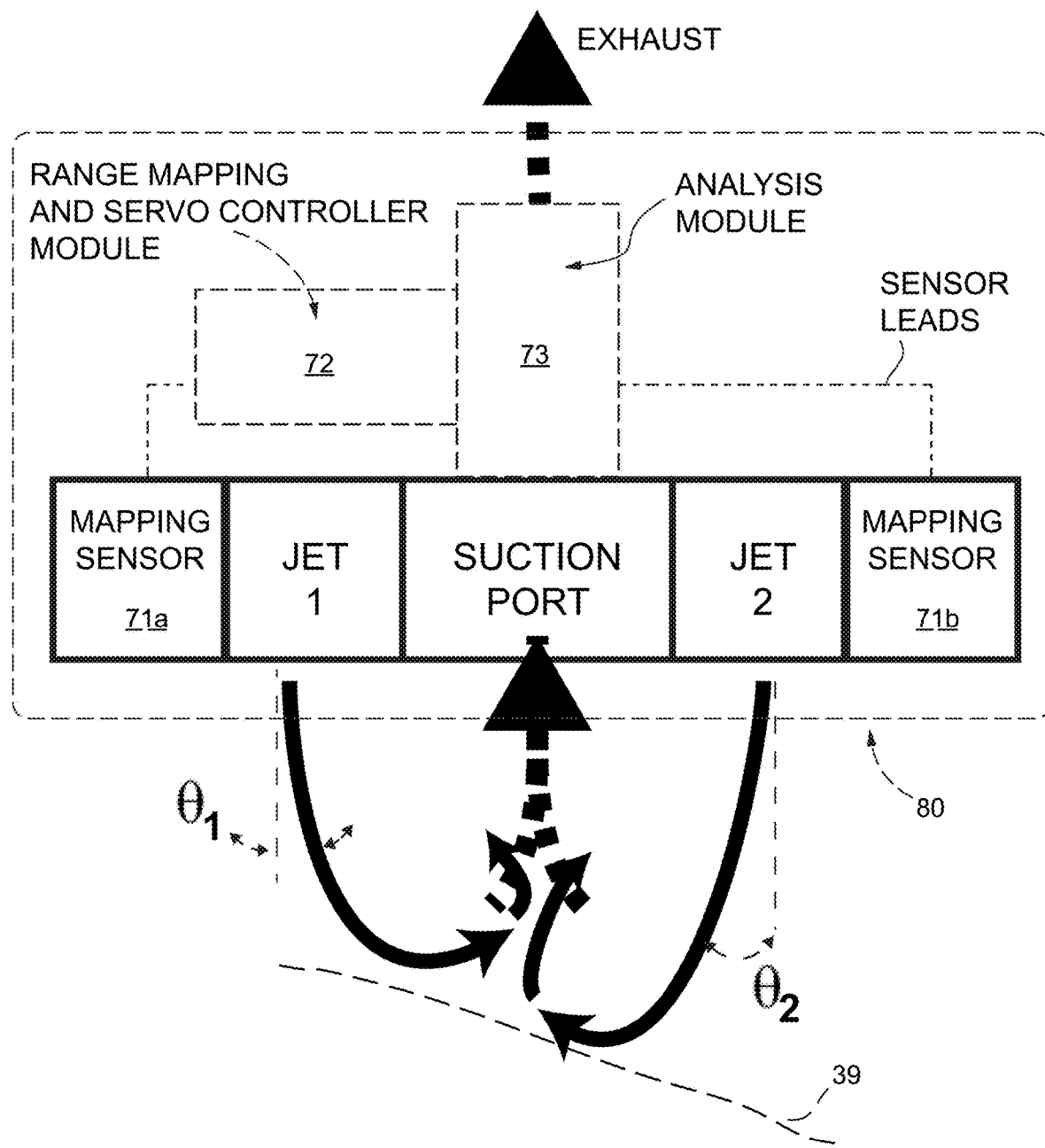
FIG. 7 is a schematic view of a more complex slit jet apparatus with contralaterally disposed mapping sensors, a range mapping module, and analysis module in a single package.

FIG. 7 is a schematic view of a more complex slit jet apparatus 80 with contralaterally disposed mapping sensors (71a,71b), a range mapping module 72, and analysis module 73 in a single package. Angles θ1 and θ2 are controlled by changing the angulation of the jet, the timing or amplitude of the jets, or by tilting a non-contacting sampling head on an arm. In this view, sensor data is supplied to the range mapping module 72 that controls servos responsible for jet burst timing (and optionally angulation). Sensor data is also supplied to the analysis module 73, where suspicious aspirates may be concentrated and isolated for further analysis, such as by methods known in the art.

More than two jets may be controlled using this system, but for simplicity of explanation, the illustration is limited to two jets, JET 1 and JET 2. Also shown are a pair of mapping sensors (71a,71b), one on either side of the sampling head. Mapping data is fed from the right and left sensor clusters into a range mapping and servo controller module, which plots a three-dimensional contour of the surface to be sampled and enters a set of jet timing parameters into the servo controller. The servo controller executes the sampling strategy by opening high-speed valves to release jet bursts at controlled times. Jet action is as described before. Exhausted air drawn through the suction intake has transited an analysis module and downstream processing, concentrating, and analysis is completed by methods known in the art.

Figure 8:
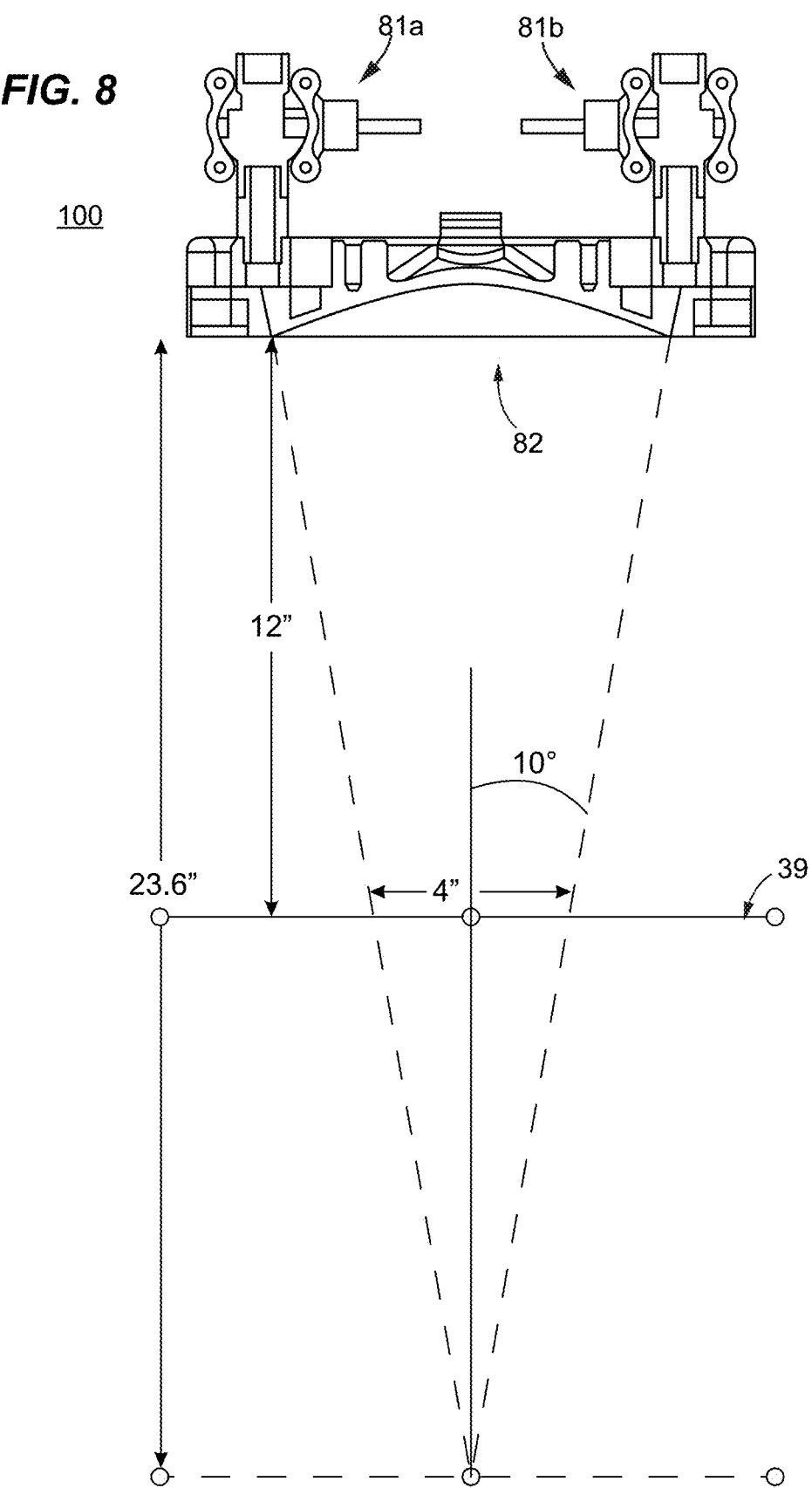
FIG. 8 is a representation of dual jets, their angulation, and the standoff distance to sample versus convergence distance. A spread of 4 inches in the breadth of sampling area is achieved in this example, in in detail view FIG. 10B (circled and magnified). Each jet extends along the contralateral edges of the central suction intake.

FIG. 8 is a representation of a sampling head 100 with high-speed valves (81a,81b) and dual jets having an opposing angulation of 10° from plumb, and shows a standoff distance to sample of twelve inches versus a convergence distance of about twenty-four inches. A "reach" of four inches in breadth of sampling area is achieved in this example. These measurements are derived from an early prototype and the invention is not limited to these dimensions or configuration.

By angling the slit jets 101, a "standoff distance" is established such that the two jets intersect at a defined distance from the lower end of the sampling head. The intersection point is a virtual point below the substrate surface 39. Generally, the intersection distance for a slit jet array is at least or greater than nine inches, more preferably greater than twelve inches and preferably equal to or greater than eighteen inches. The "reach" defines the distance between the jets at impact and is typically much larger than obtained with other jet types. While a reach of four inches is shown here, much larger areas or much smaller areas may be sampled.

Figure 9A:
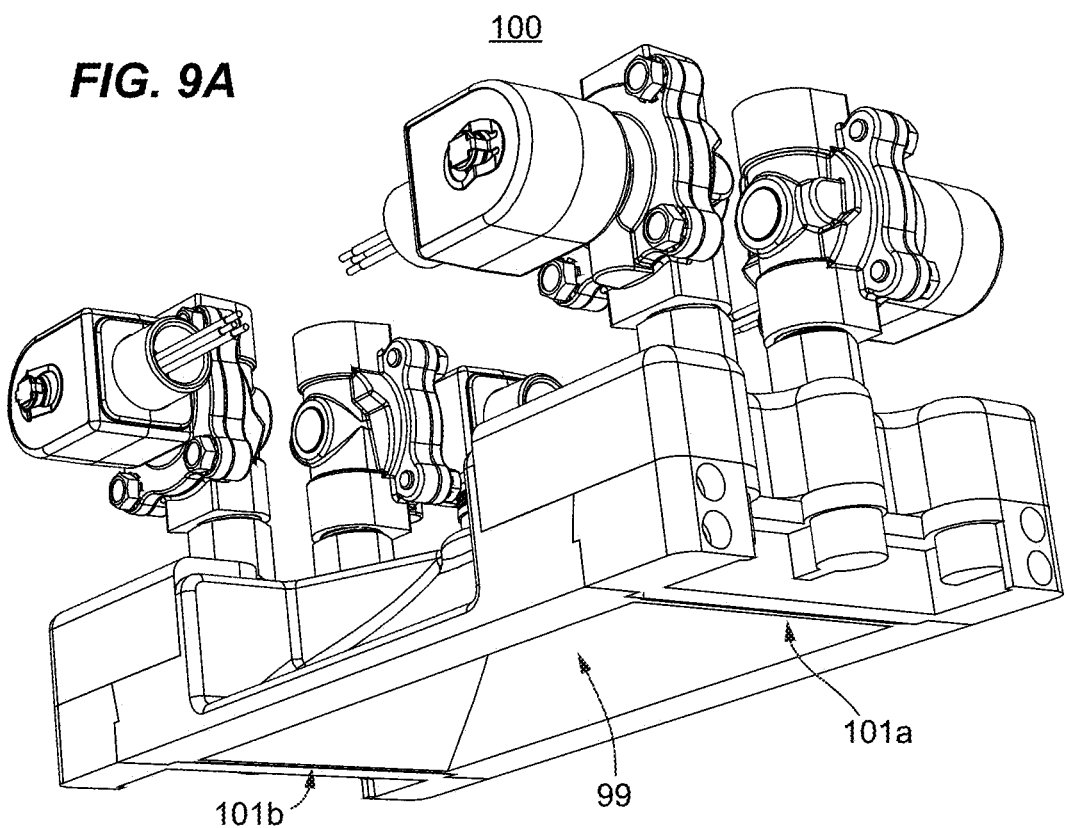
Figure 9B:
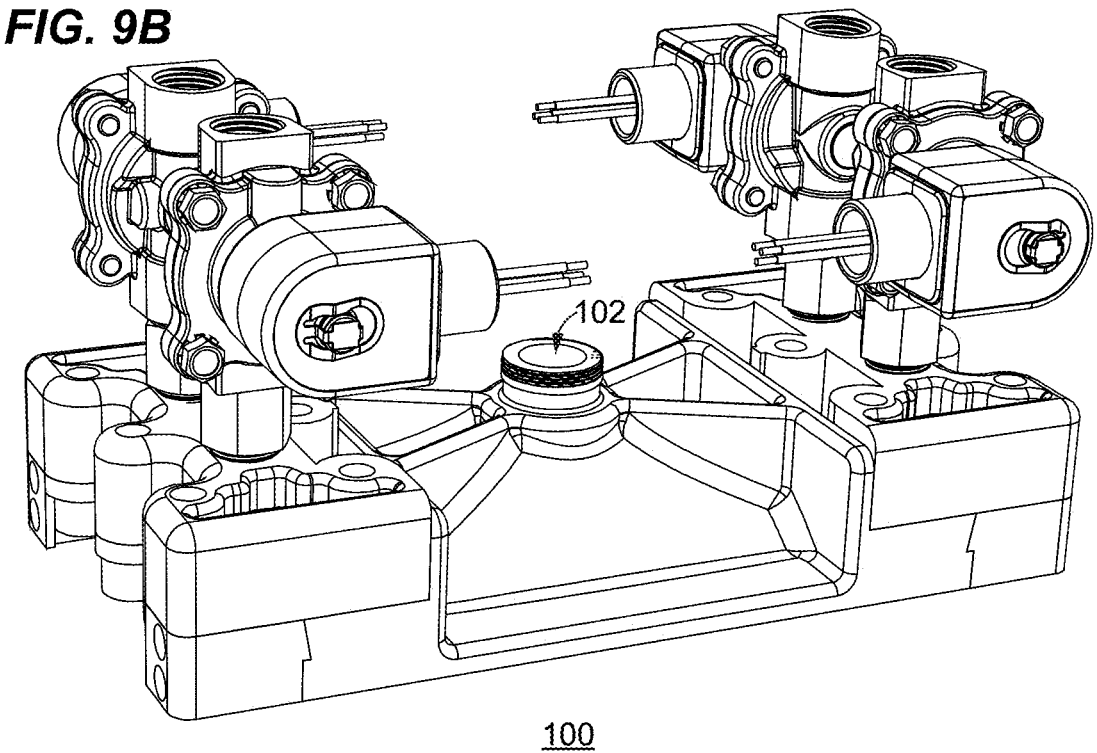

FIGS. 9A and 9B are perspective views a non-contacting sampling head 100 with a quadruplex jet array having two pairs of slit jets (101a,101b) around a central suction intake. In the first view, the large suction intake bell 99 of a non-contacting sampling head assembly is visible as sloping planes. In the second view, the common center port 102 of the suction inlet is visible (without connection) and four high-speed valves are mounted, one above each of the jet apertures. The four slit jets are arrayed on either side of the intake port. Bundles of wires 104 to a controller are also represented without connections (but are connected to a computer or controller for controlling the valves and the head pressure in the jet manifold).

Figure 10B:
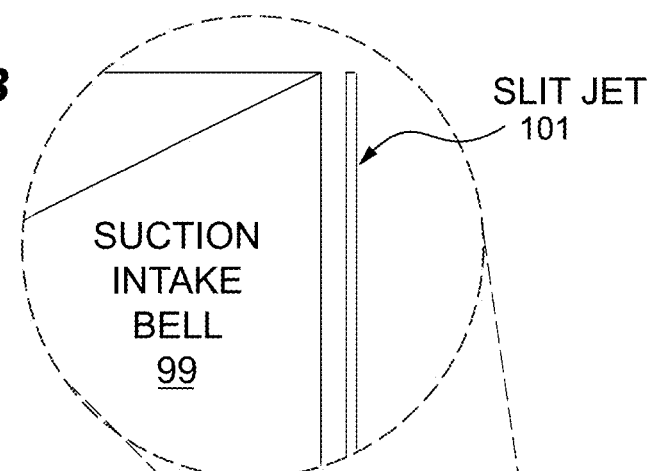
Figure 10A:
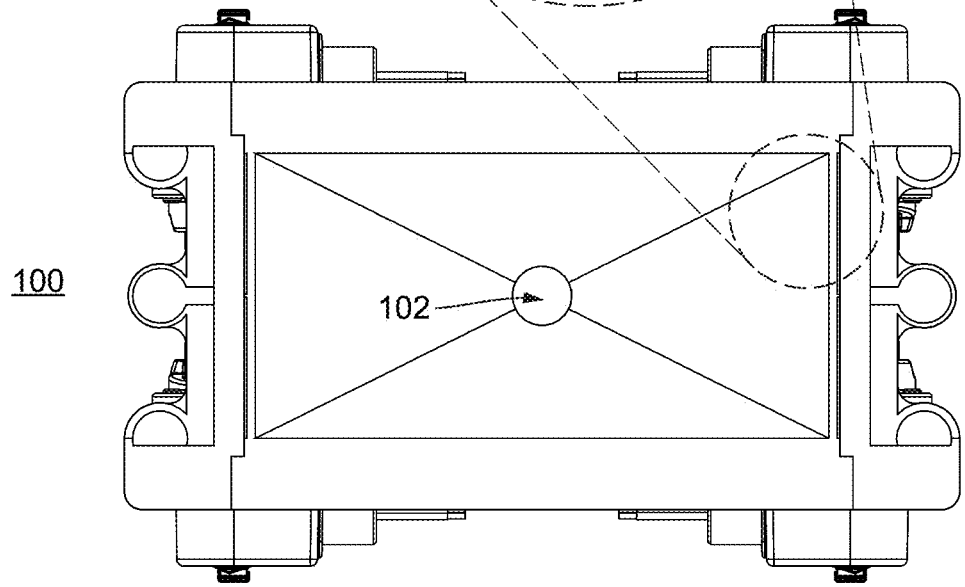
Figure 10C:
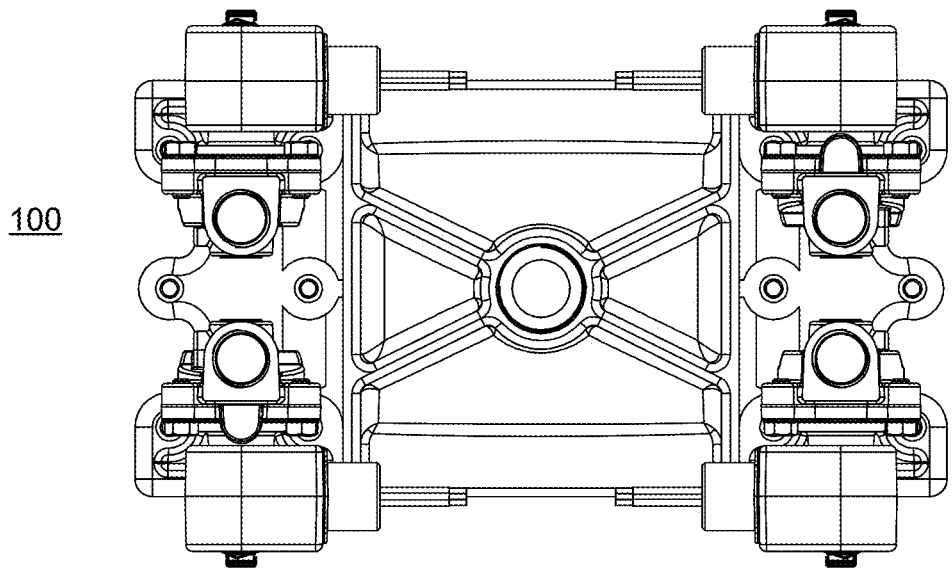

FIGS. 10A and 10C are isometric views of the underside and the top of the quadruplex jet array and non-contacting sampling head assembly 100 of the preceding figure. The aspect ratio of each jet 101 is very high at the aperture as demonstrated in detail view FIG. 10B (circled and magnified). Each jet extends along the contralateral edges of the central suction intake 102.

Figure 11A:
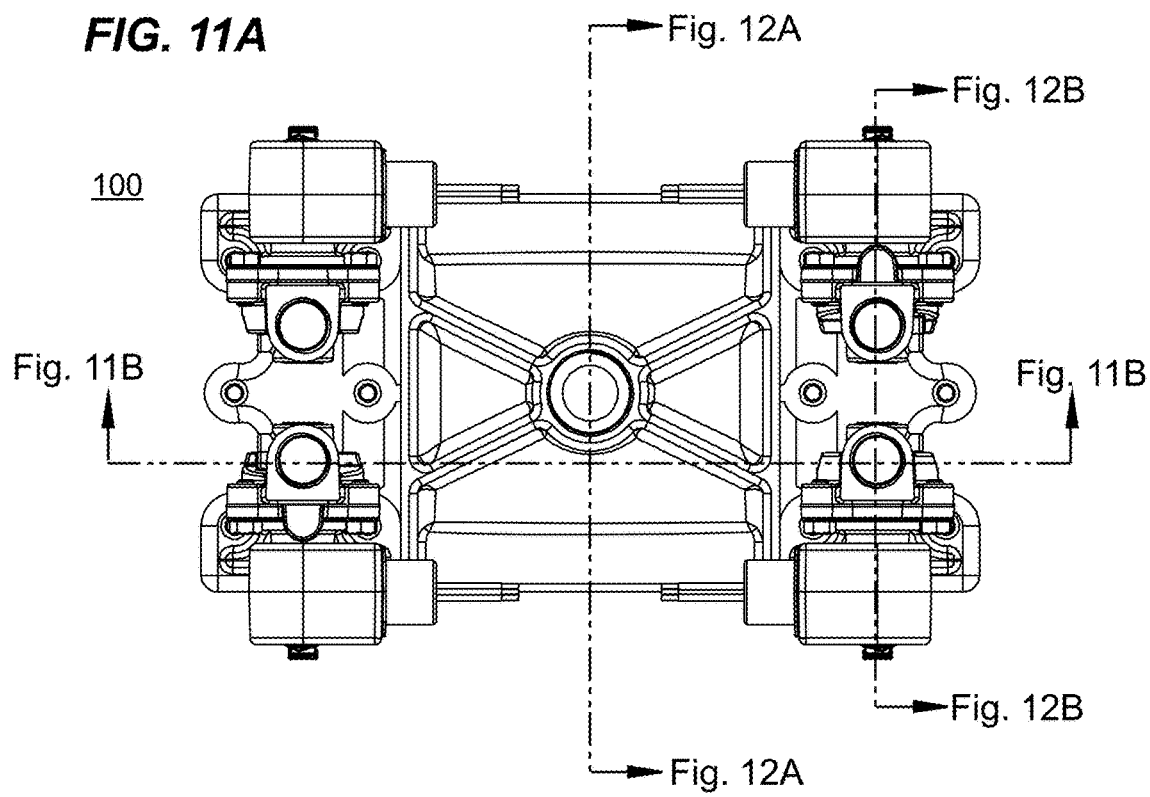
FIGS. 11A and 11B set up a series of section planes, beginning with the long axis center sectional view of FIG. 11B. Here the jet aperture size is exaggerated for clarity but the convergent angulation and proximity to the center suction intake are depicted.
Figure 11B:
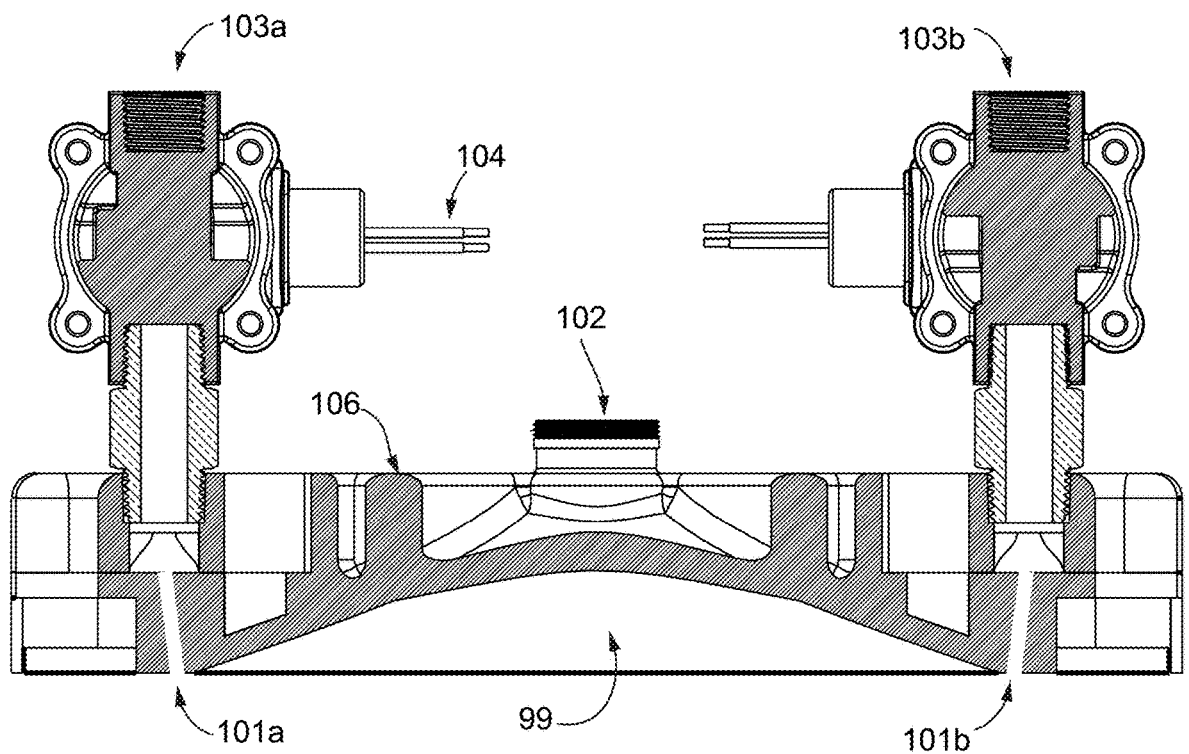

FIG. 11A sets up a series of section planes, beginning with the long axis offset sectional view of FIG. 11B. Here the jet aperture size (101a,101b) is exaggerated for clarity, but the convergent angulation and proximity to the center suction intake are represented as a working model. Also shown are valve trees (103a,103b). suction intake bell 99, suction intake port 102, wire harnesses 104, and NCS housing body 106.

Figure 12A:
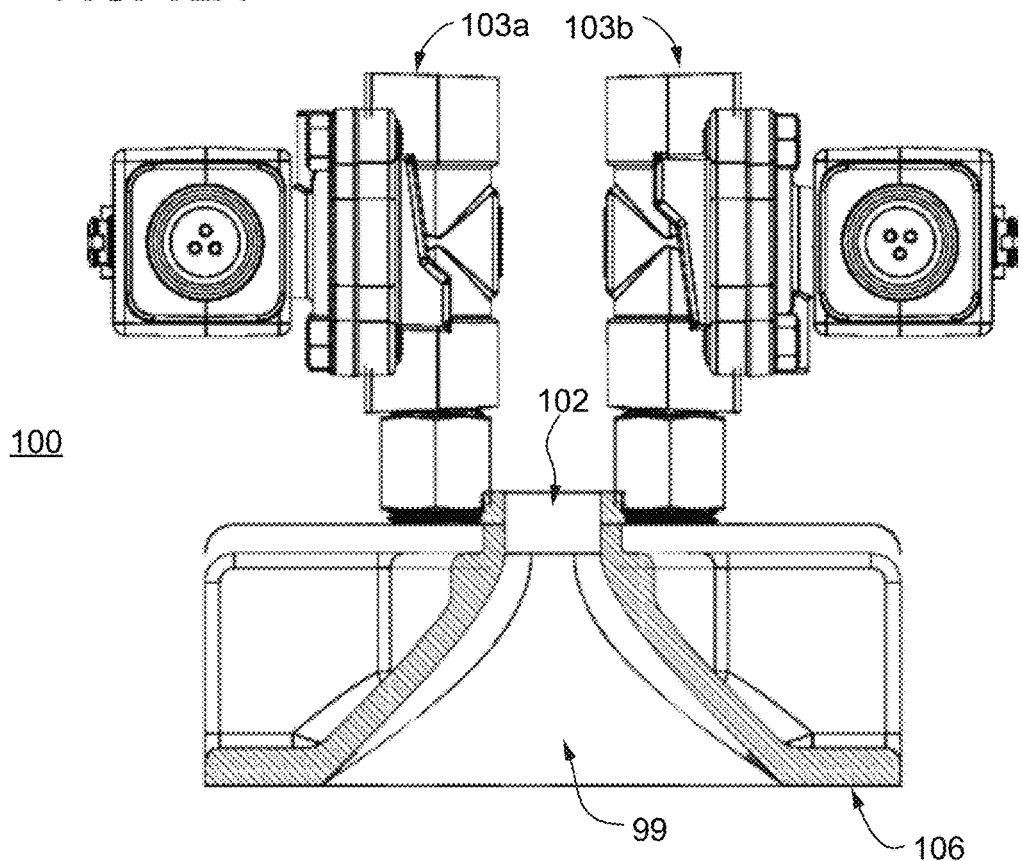
FIGS. 12A and 12B are sections taken through a non-contacting sampling head assembly of FIGS. 9A through 11B. In the first view, the cut plane is perpendicular to the long axis section depicted in FIG. 11B.
Figure 12B:
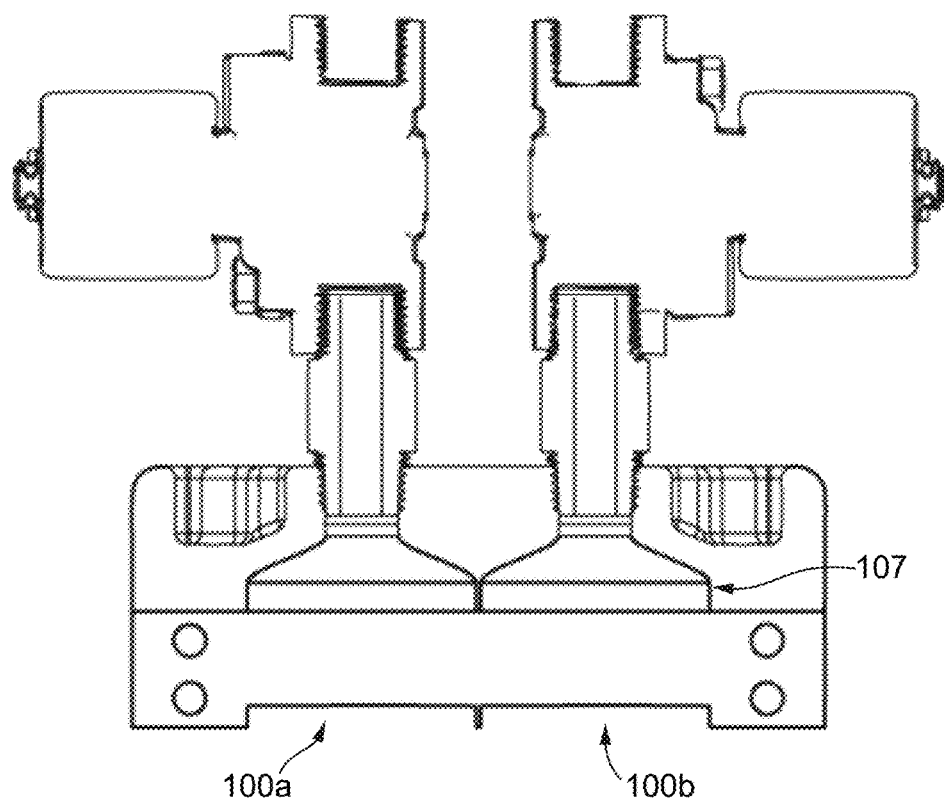

FIGS. 12A and 12B are sections taken through a non-contacting sampling head assembly. In the first view, the cut plane is perpendicular to the long axis section depicted in FIG. 11B and intersects the suction intake port 102 and suction intake bell 99. In FIG. 12B, the cut plane goes through the valve trees (internal detail not shown). Threaded fittings are represented, but those skilled in the art are able to devise other tubular unions. The section continues through the jet feed ductwork to the jet manifolds (107, for pressure equalization), and cuts through the pair of j et apertures (101a,101b) at the base of the structure so as to illustrate the aspect ratio of the jet length versus width; also referencing FIG. 10B.

Figure 13A:
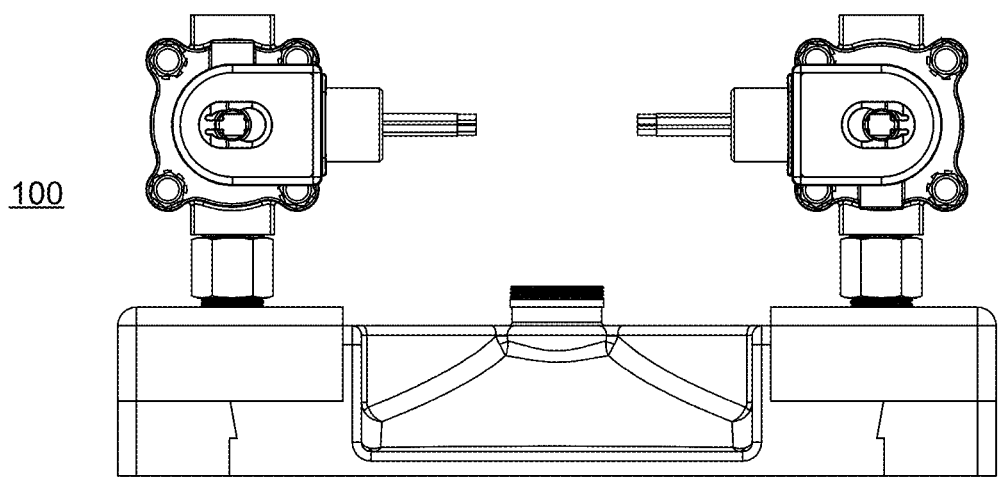
FIGS. 13A and 13B are side and end views of a non-contacting sampling head assembly represented in FIGS. 9A through 13B.
Figure 13B:
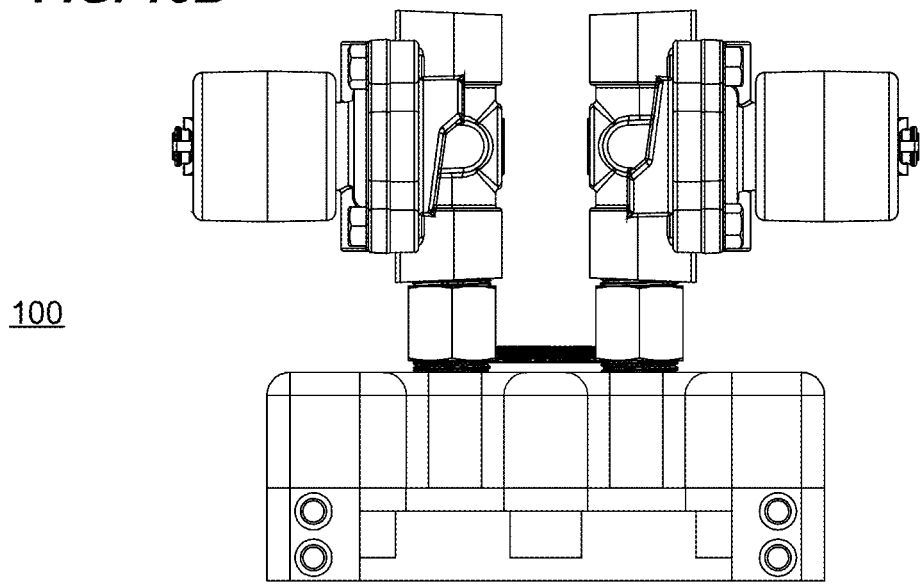

FIGS. 13A and 13B are side and end views of a non-contacting sampling head assembly 100. These views are of the working prototype represented in FIGS. 9A through 13B.

Figure 14A:
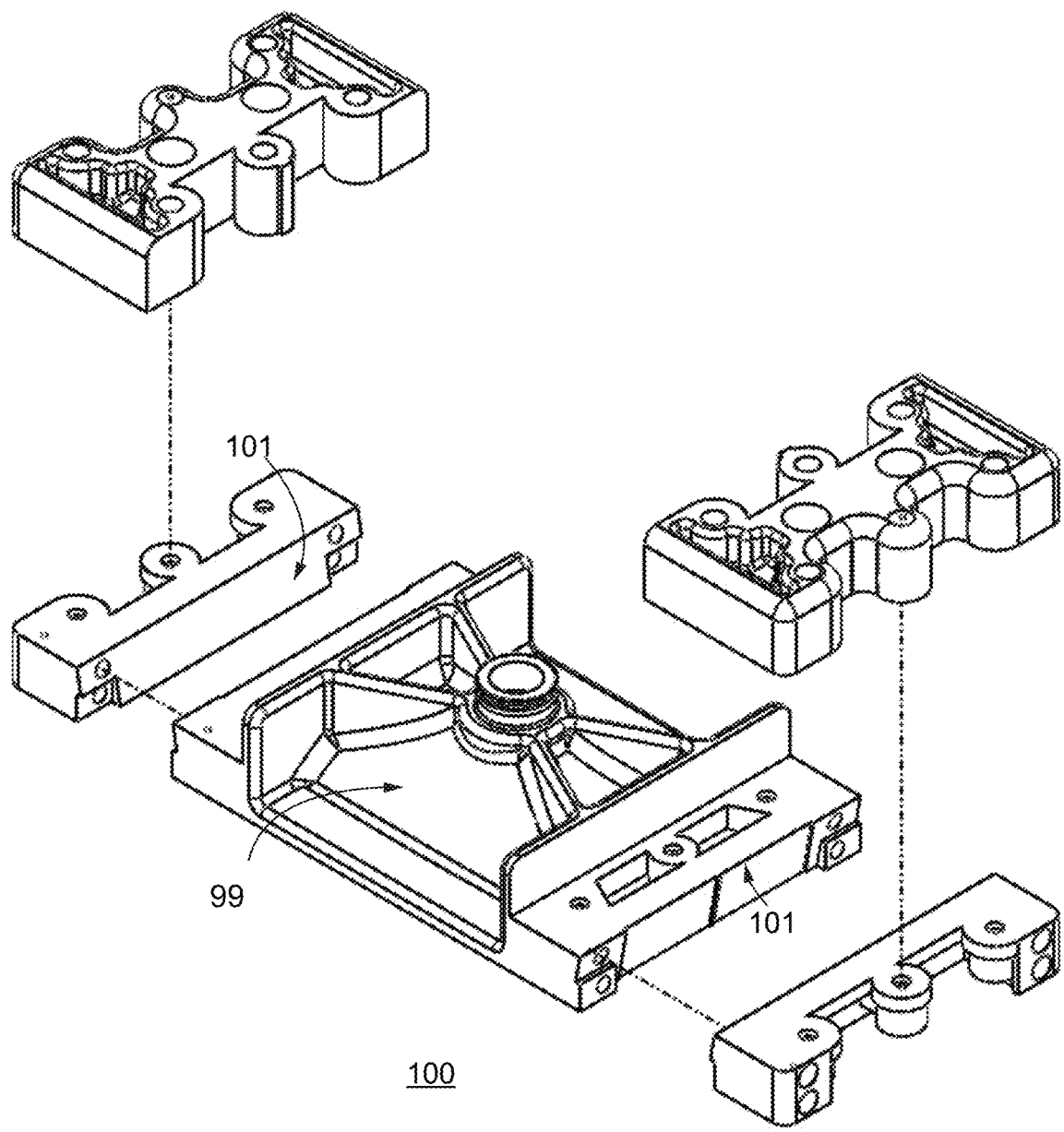
FIGS. 14A and 14B are exploded views of a sampler of FIGS. 9A-13B, showing how a non-contacting sampling head with high aspect ratio jet aperture is assembled. The valve trees are not shown for clarity.
Figure 14B:
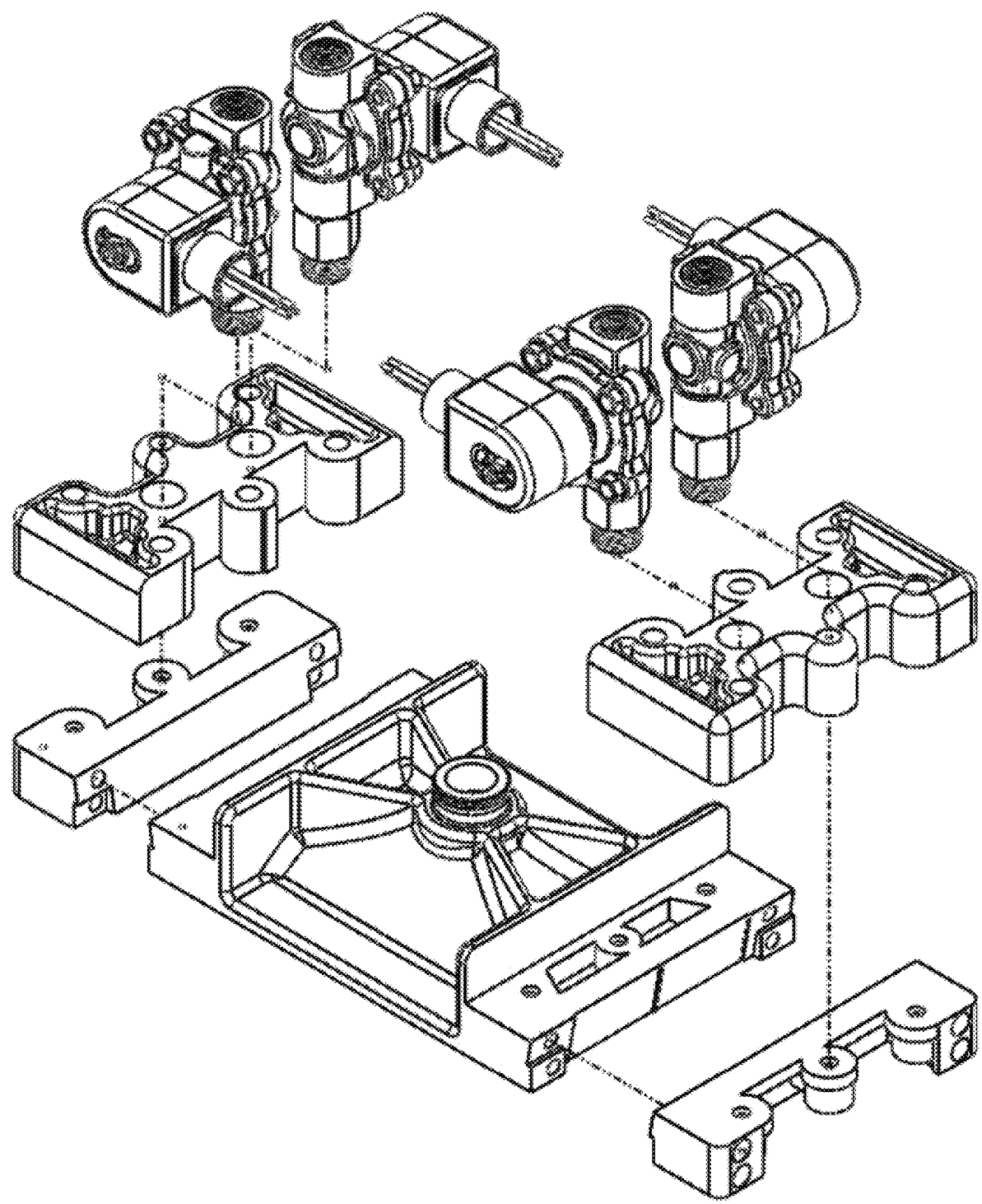

FIG. 14 is an exploded view showing assembly of a non-contacting sampling head with high aspect ratio jet apertures 101. The valve trees are not shown for clarity. The sampling bell 99 is shown in relief on the backside of the NCS housing body.

Figure 15A:
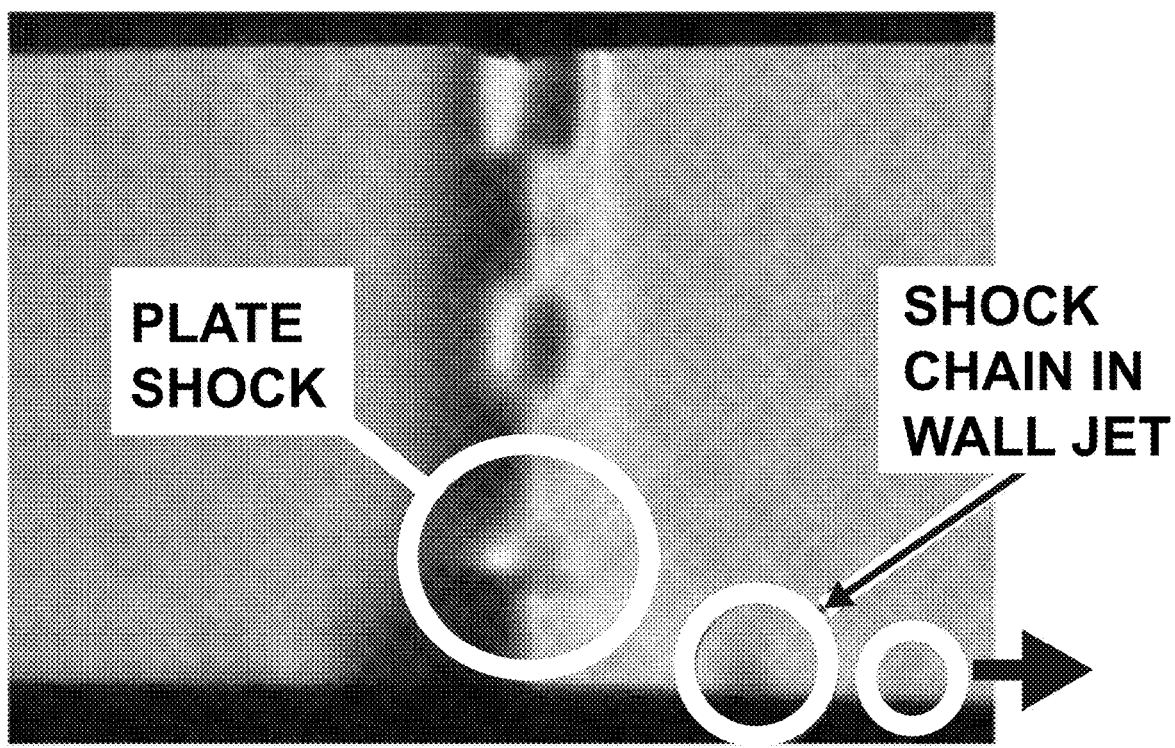
FIGS. 15A and 15B are Schlieren images of jet substructure. A comparison is shown between a slit jet of the inventive non-contacting sampling head and a conventional nozzle jet. Plate shock occurs with both jets, but the slit jet is characterized by a shock train in the wall jet. This behavior is amplified when the slit jet is angled from vertical.
Figure 15B:
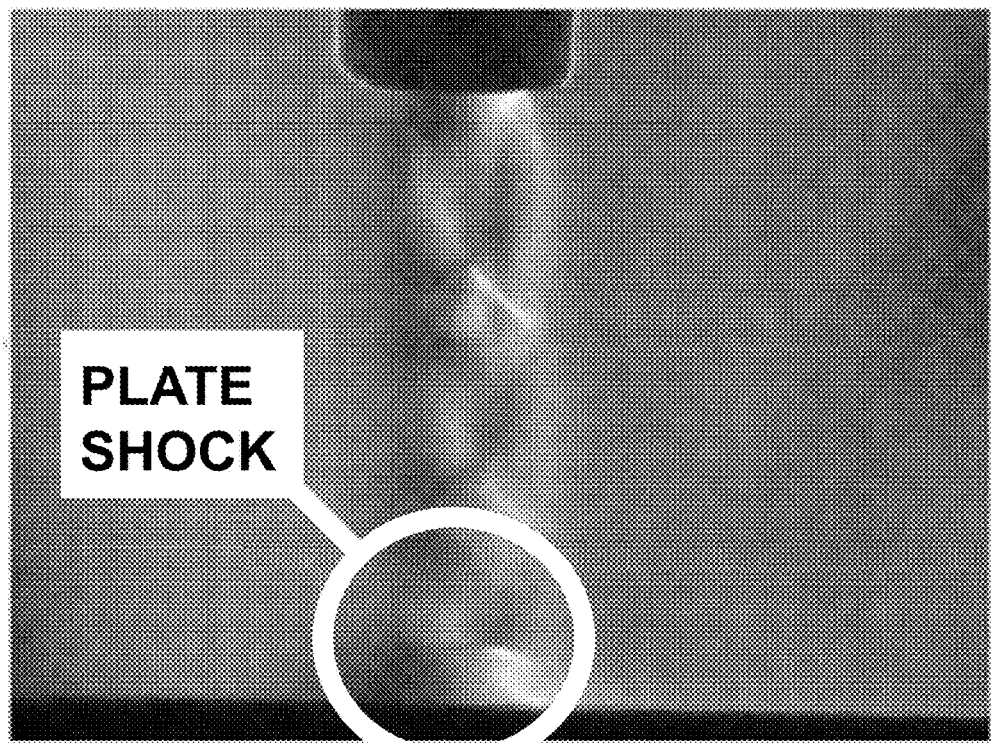
Figure 16A:
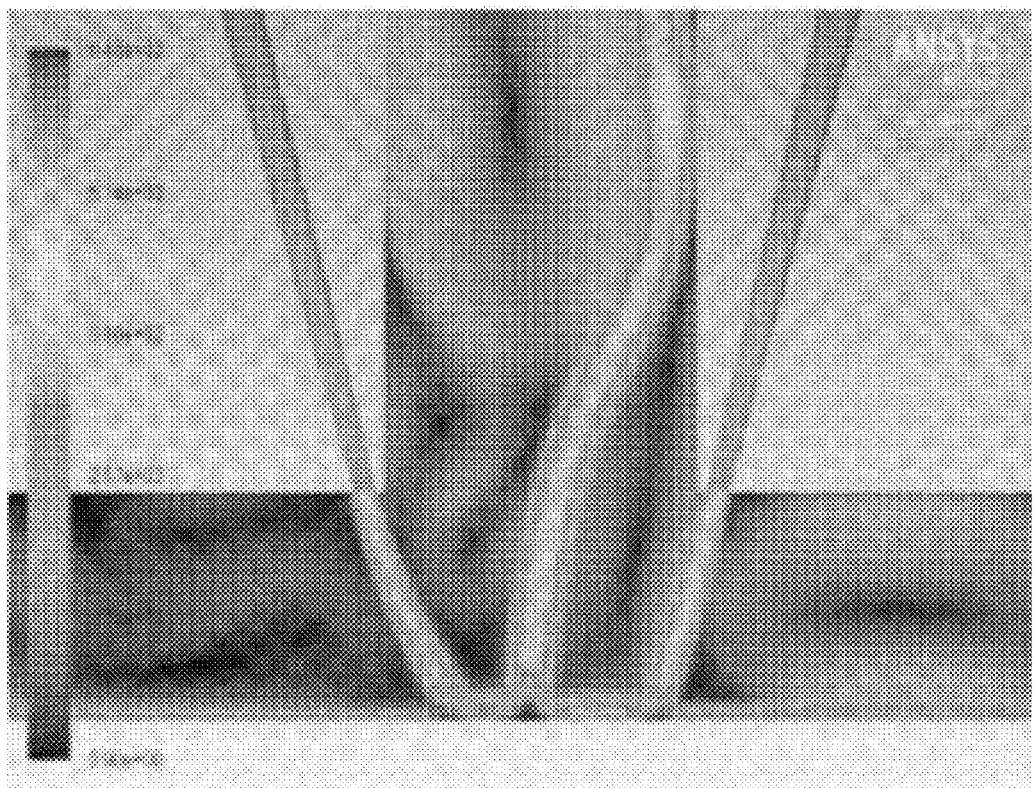
FIGS. 16A and 16B are computational fluid dynamics simulations of opposing slit jets, essentially the same setup as depicted figuratively in FIG. 8. Two views are shown, one at lower pressure and one at higher pressure. A central suction inlet draws the jets into a particle and vapor collector.
Figure 16B:
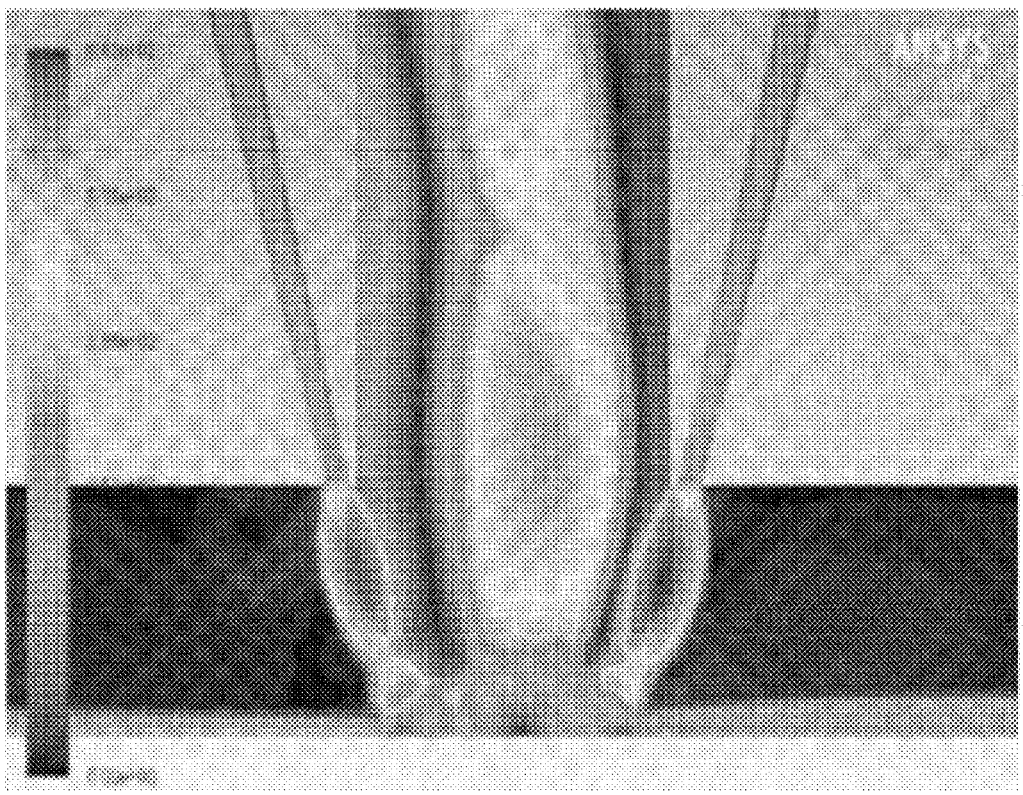

FIGS. 15A and 15B are Schlieren images of impinging jets in which free jet, and wall jet regions are visible. A comparison is shown between a slit jet of the inventive sampling head (FIG. 15A) and a conventional nozzle jet of equivalent aerodynamic diameter (FIG. 15B). Plate shock occurs with both jets, but the slit jet shows the presence of shock and expansion waves in the wall jet that are not detected for the axisymmetric jet. This indicates higher velocities and higher wall stresses on the interrogated surface. Slit jet shock trains result in localized recirculation within bubble-like shock fronts at the impacted surface. This novel behavior is amplified in the wall jet when the jet orifice is angled from vertical. Each shock front is a result of a flow transition to supersonic velocity, resulting in conditions beneficial for resuspension of particles as small as one micron in aerodynamic height. The viscous sub-boundary layer is 10-50 microns deep but is stripped away by the shock—thereby providing large aerodynamic forces required for particle resuspension and delivering particulate and vapor analytes from the surface into the suction intake.

At greater distances from impingement location, the wall jet flow in FIG. 15A is essentially in linear decay with extended reach and duration along a front extending to the right and left as depicted here. In contrast, the axial flow jet has a prominent plate jet shock, but is dissipated and decays exponentially to lower velocities very quickly in all directions.

Axisymmetric jets are characterized by a stagnation zone at the point of impact, but by angling slit jet bursts, the stagnation zone is weaker, and parasitic losses of internal energy that can be converted to kinetic energy of the wall jet are reduced. Where two opposing wall jets meet, a stagnation zone forms at the collision region, forcing the flow to form a collimated plum that carries particles and vapors towards the suction intake port.

While not bound by theory, the slit jet imposes linear flow in the wall jet region, and therefore the jet cannot expand in all directions (as from an impinging round jet). By conservation of momentum, a supersonic slit jet orifice produces a wall jet that contains all the momentum of the free jet and core and thus will achieve shock fronts in the boundary layer, leading to an increase in local wall shear stress. These flow structures are observed in the Schlieren images as a chain of shock fronts visible as rapid changes in density. The "shock train" causes boundary layer separation from the target surface and increases shear stress locally, yielding much higher particle removal What is surprising is that at all pressures considered (10-100 psig), wall shear stress (Pa) decays by jet expansion in an almost linear profile for an extended range. The shock in the boundary layer, this boundary layer separation is observed at the higher slit nozzle pressures of 40-60 psig. These operation conditions yield the wall shear stress in excess of 1000 Pa. However, the use of high-pressure jets is not necessary to achieve the removal of typical particles present in the fingerprint residues, evenly distributed shear stress of ~50 Pa yields removal of a significant fraction of the particles.

In contrast (FIG. 15B), wall jet shear falls quadratically with distance from the impingement point, making it very challenging for use in surface sampling applications. At the higher nozzle pressure, the loss of jet energy in shock structures in the free jet region adds parasitic losses and is not effective in converting the jet momentum to the desired high-velocity shear flow near the wall. Thus any additional pressure applied to the jet has little effect in developing a high-velocity wall jet and does not add to the particle removal potential.

In contrast, the slit jets below the choked conditions have a higher conversion efficiency of jet momentum to wall jet velocity. In planar jet impingement, the high velocity, high wall shear region is sustained over a longer distance on the plate. Decreasing H/D ratio (i.e., the ratio of standoff height H over hydraulic diameter D) is more effective in increasing wall jet velocity than increases in inlet pressure. The significance is clear in terms of the power requirement needed to operate a fully portable sampling device. The prospect of battery operated, handheld NCSs with low power consumption and extended battery life is now entirely feasible. At lower stand-off distances, the use of slit jets eliminates the need for compressed gas sources or larger compressor units to achieve wall shear stress required for resuspension of microparticle from most surfaces.

FIGS. 16A and 16B are computational fluid dynamics (CFD) simulations of opposing slit jets. The model uses essentially the same setup as depicted figuratively in FIG. 8. Two views are shown, one at lower pressure and one at higher pressure. A central suction inlet draws the jets into a particle and vapor collector. At lower pressure (about 20 psig), the suction return wanders as the stagnant layer and impingement points may shift. No plate shock is seen, but upward flow into the suction port is surprisingly organized and consistent with efficient particle recovery. At 80 psig (FIG. 16B) the free jet expansion region is seed shaped and terminates in a plate shock that serves as a sort of elbow to translate the flow into a horizontal wall jet. The free jet region is coherent and lacks the shock regions characteristic of axisymmetric jet nozzles. The stagnation region is relatively fixed when using two balanced opposing jets, but highly collimated flow continues up into the suction intake, suggesting very efficient mobilization, removal, and capture of particles on the surface.

For this work, the standoff distance is six inches. Slit jet critical dimension is limited from 3 mm to more preferably about 0.5 mm, and most preferably less than 1 mm, but the actual number chosen is dependent on the available gas flow rate and gas pressure. In general, higher standoff distances can be achieved for planar jet orifices by increasing jet velocity as jet $L_c$ increases by introducing a larger nozzle width or increasing pressure. These simulations are confirmed experimentally as shown in FIG. 18.

Figure 17A:
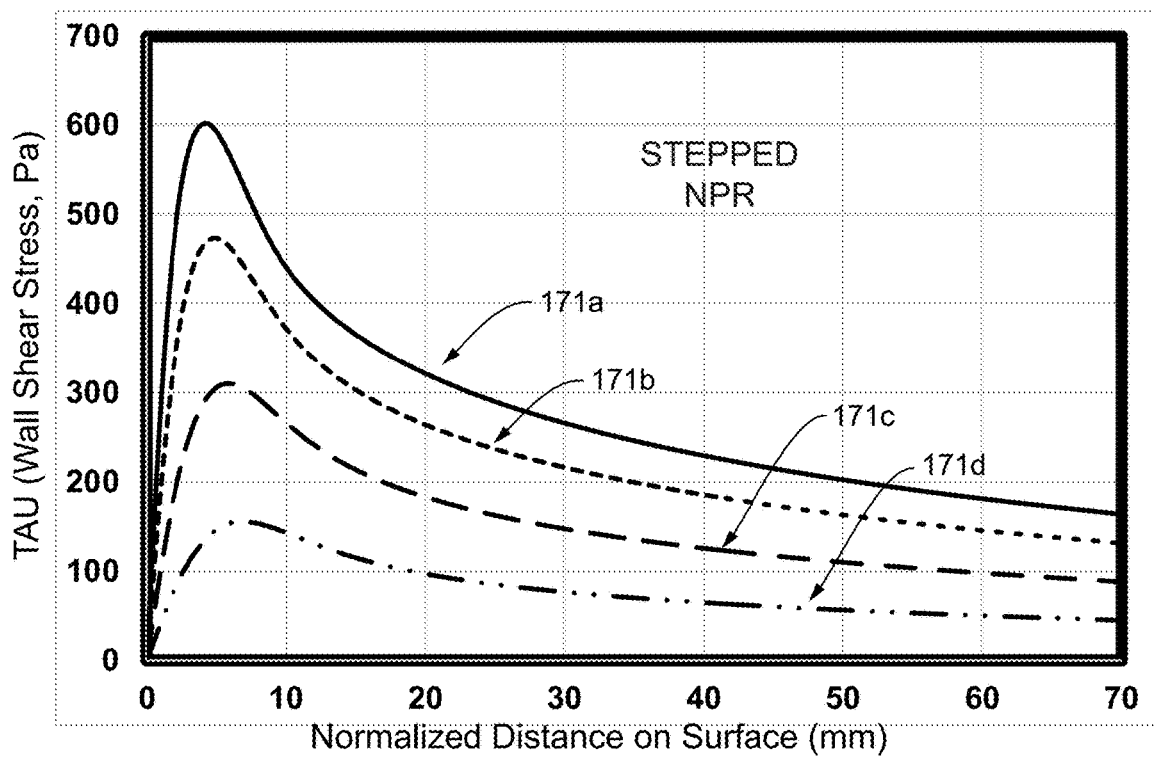
FIGS. 17A and 17B are plots of wall shear stress ($\tau$, Pa) at four different normalized pressure ratios. The top plot shows the data for a slit jet; the bottom plot shows qualitatively different data for a round nozzle jet. Surprisingly, with slit jets, wall pressure has a surprising "reach", here extending over 50 mm at substantial shear wall stress (~200 Pa) versus essentially zero with an axisymmetric jet configuration. Distance from impingement point is evaluated, showing a dramatically improved profile with the slit jet pair.
Figure 17B:
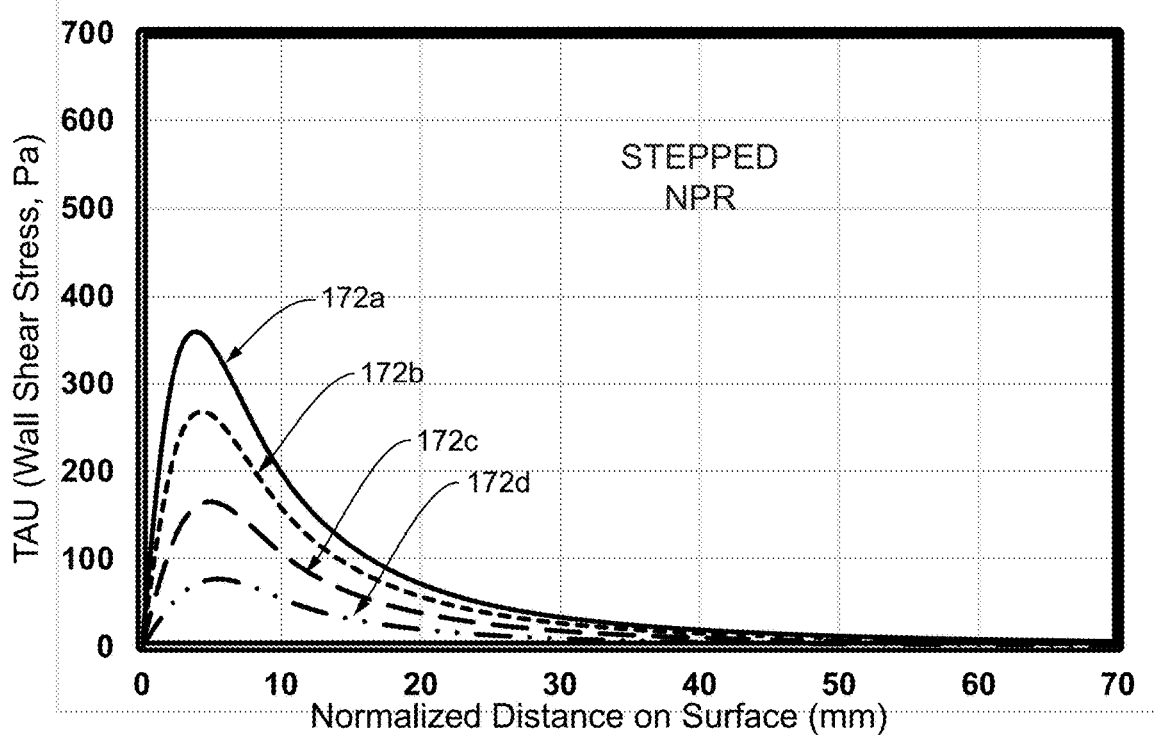

FIGS. 17A and 17B are CFD plots of wall shear stress (τ, Pa) at four different normalized pressure ratios (NPR). The top plot (FIG. 17A) shows the data (171a,171b,171c,171d) for a slit jet at a series of stepped NPRs; the bottom plot (FIG. 17B) shows qualitatively and quantitatively contrasts the data for the two jet configurations. Surprisingly, with slit jets, wall pressure has an unexpected "reach", here extending well over 50 mm at substantial shear wall stress (~200 Pa). In comparison, the wall jet shear of the round jet (FIG. 17B) is essentially zero at 40 mm and is much lower even at 1 cm from the impingement point. Distance from impingement point is plotted (172a,172b,172c,172d), showing a dramatically improved profile with the slit jet pair. Surprisingly, this extended wall jet behavior is observed even at lower input pressures.

Figure 18:
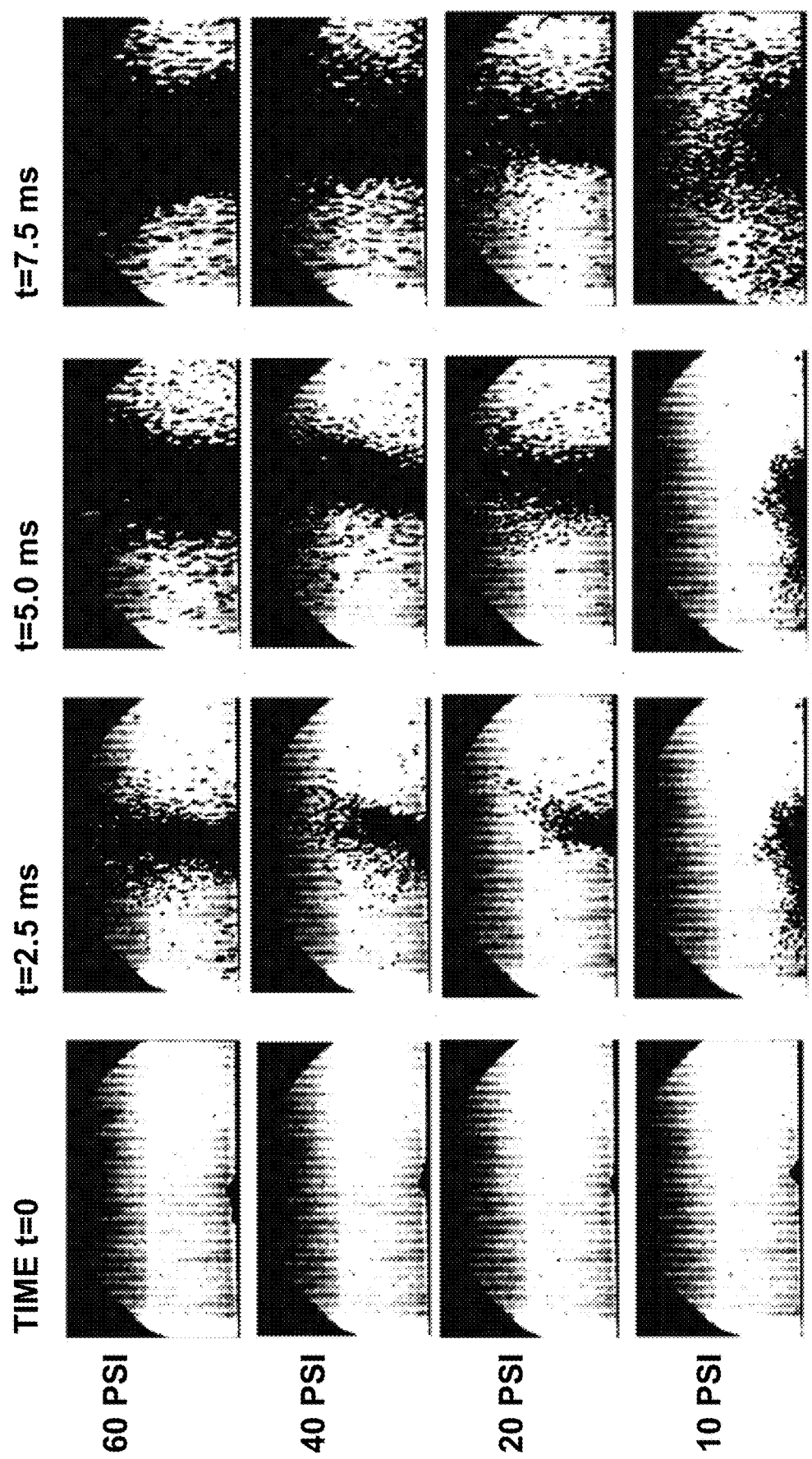
FIG. 18 is a montage of time-sequence photographs taken with a high-speed camera. The experimental results speak for themselves.

FIG. 18 is a montage of photographs taken with a high-speed camera. Defined particle populations have been deposited on an impact plate for purposes of visualization of the lift-off. The experimental result is copacetic with computer simulations. Particles are seen to rise in a vertical draft into the suction intake port after efficient resuspension from the impact surface. Although 20 um spherical silica particles were used to obtain the photographs, particles as small as 5 um behave in the same way.

Taken together, these experimental and simulation results show (i) an increase of particle removal forces in the under-expanded region of axisymmetric and planar jets (slit jet apertures) where the underexpanded region is a function of nozzle pressure and the H/D; (ii) a longer underexpanded region in the planar jet configuration for the same pressures, (iii) significantly higher forces acting on the particle (shown in velocities and wall shear) in the wall jet region for the planar "slit jet" configuration. From these design considerations, the planar jet configuration has shear values above the threshold value for particle removal at longer stand-off distance/or lower operating pressures. Moreover, and importantly, the planar jet produces higher shear forces much farther away from its impinging point—extending the "reach" factor for the non-contacting sample collector.

Figure 19A:
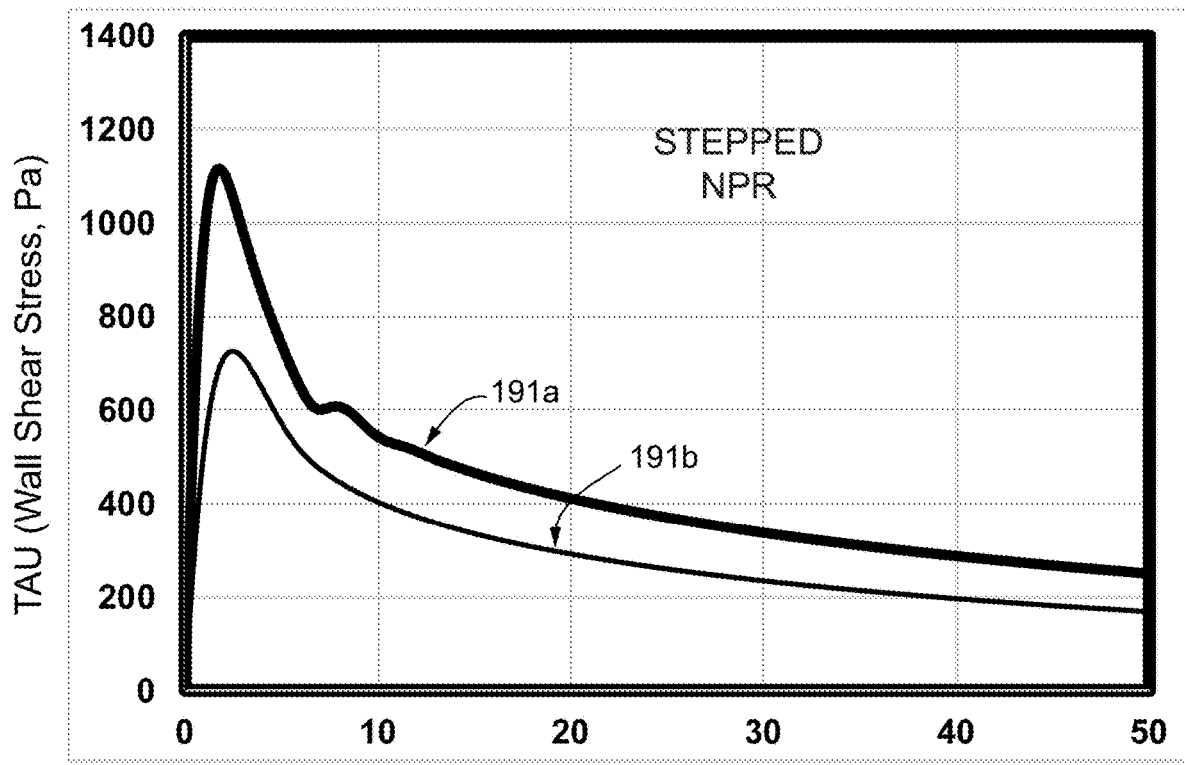
FIGS. 19A and 19B are plots of wall shear stress ($\tau$, Pa) at higher normalized pressure ratios to demonstrate that increased jet pressure does not remedy the deficit in reach of the wall jet for axisymmetric jets. This is true even though the peak wall shear is slightly higher for the axisymmetric jet very close to the impingement point. Outside that zone, jet force drops rapidly according to the r-squared law.
Figure 19B:
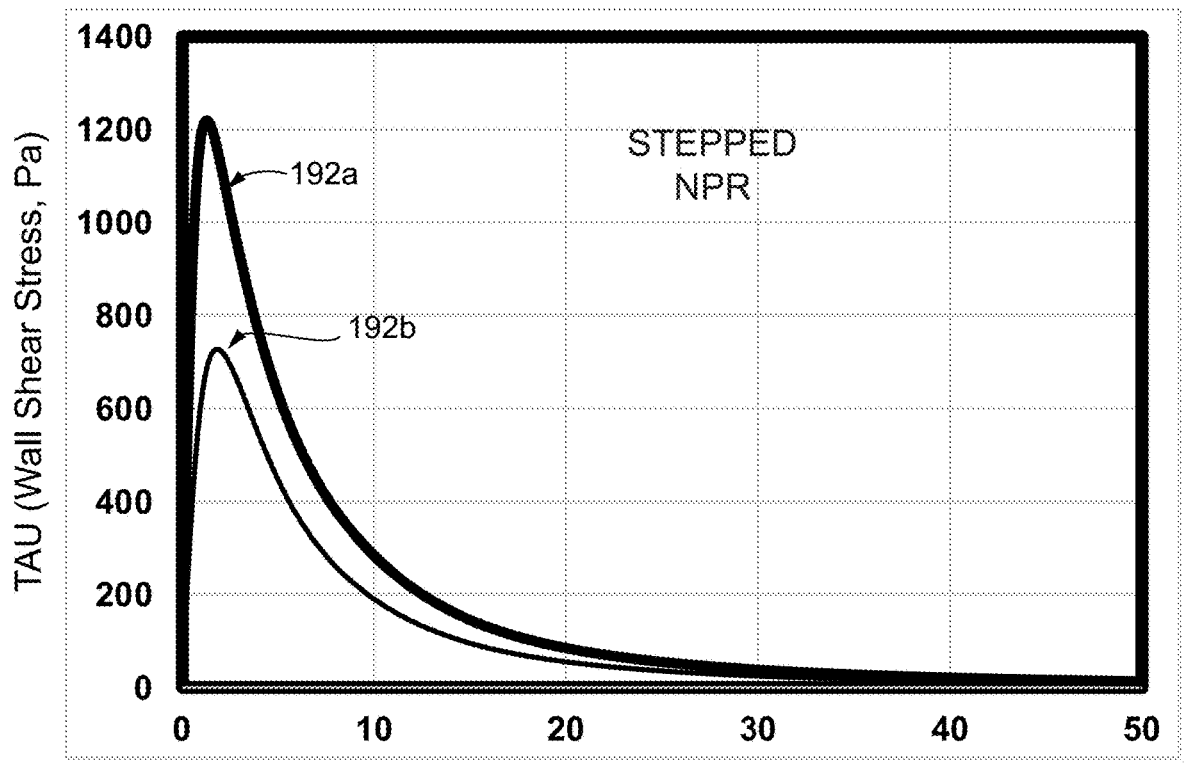

FIGS. 19A and 19B are plots of wall shear stress (τ, Pa) at higher normalized pressure ratios (NPR) to demonstrate that increased jet pressure does not remedy the deficit in reach of the wall jet for axisymmetric jets. Counterintuitively, increasing the jet pressure (192a,192b) fails to generate a wall jet that is effective in removing particles outside a small two centimeter zone. This is true even though the peak wall shear is slightly higher for the axisymmetric jet very close to the impingement point (FIG. 19B). Outside that zone, jet force drops rapidly according to the r-squared law.

In contrast, as shown in FIG. 19A, the lateral wall jets generated in the slit jet configuration continue with τ>100 Pa well past five centimeters (191a,191b). The level wall pressure is almost linear and suggests a highly coherent wall jet with substantial force and velocity in intimate contact with the surface; stripping off the boundary layer. This is surprising because it can be achieved at lower pressures than have conventionally been applied with axisymmetric jets.

While pairs of slit jets are currently practiced, arrays of slit jet orifices or rounded nozzles are also contemplated. Round jet arrays having an extended aspect ratio (>10) in linear segments may achieve a higher capture efficiency at greater standoff distances.

Any of the exemplary "non-contacting particle samplers" shown here can be mounted on a robotic arm, in which the robotic arm is enabled to move the sampler body in more than one degree of freedom (X, Y, Z and rotationally) according to the three-dimensional map of the target surface. The sensor may be a camera having circuitry enabled to provide a remote display of a video feed from the camera. In other instances, the sensor may be a particle sensor, and the apparatus may be operated in a feedback loop condition to optimize particle collection. Units used as handheld wands also find application.

In a robotic apparatus, at least one sensor is configured to supply range-finding data to a computational module with processor, wherein the processor is supplied with memory and an instruction set for calculating a map of a target surface, the map including a distance between each of the jet nozzles and the substrate at a designated map point below the suction intake portal. Also conceived is an actuation module in digital communication with the computational module, in which the actuation module configured to control the analog operation of the valved fluid connections. In alternate embodiments, each jet burst is targeted to an individual designated map point and is defined by an exit velocity, and is angulated such that a jet burst emitted therefrom is angled to intersect the designated map point for each the jet, thereby being deflected with a surface-reactive momentum. The computational module is configured to valvedly emit a first jet burst from a first jet nozzle such that a first-striking jet burst impacting its dedicated map point is angled in its surface-reactive momentum by a second striking jet burst from a second jet nozzle impacting a proximate designated map point from an opposing angle after a delay such that particles and vapors entrained in the first-striking jet burst are propelled upward toward the suction intake port rather than outward away according to the surface-reactive momentum of the first-striking jet plume. The computational module operates the actuation module to effect a first strike of a jet burst on a first side of a map point at a theta angle and a second strike of a jet burst on a second side of a proximate map point at a negative theta angle, such that as the jet bursts meet, the jet surface-reactive momentum converges and is redirected upward. Surface-reactive momentum is essentially deflection caused by the vector of the jet being redirected according to the tilt or any obstructions in the substrate surface. The vectors of the opposing jets result in uplift at the convergence point. Pulse duration, pulse frequency, and the timing of the jets may be finely calculated to allow for differences in surface contour between the two points on the surface at which the jets strike. Essentially, the jets converge, with a slight delay, forming a "pocket" in which the first and second air masses rise up and are directed to the suction port so that particles can be captured by aspiration. In some instances the coherence of the uplift obviates the need for higher suction pressure at the sampling inlet.

Time delay is used to coordinate jet bursts so as to effect a sweeping and lifting action on particles and vapors dislodged from a substrate surface. Any ambient crosswind can also be factored into calculations of relative jet velocity and flow rate when designing a jet pulse sequence. Similarly, vehicle motion, such as vehicles driving on a road, can also be factored in to the calculations. Because of drag characteristic of air masses in motion, care must be taken, however, not to exceed the capacity of the jet "pocket" to entrain the desired air samples. Most preferred are parallel slit apertures as currently practiced, but the slit apertures may be angulated slits and arrays of slits. The apparatus may also include one or more directional jet nozzles having active control of angulation.

In one embodiment, the computational module controls an actuation module to emit a continuous series of paired jet bursts, wherein the first striking jet burst and the second-striking jet burst are offset by a time delay. Jet pressure, pulse duration and standoff distance can be varied to achieve desired operating conditions of the sampler. In alternative embodiments, the computational module controls the actuation module to emit a continuous series of paired pulses, wherein the first striking jet burst and the second-striking jet burst are distinguished by relative velocity or duration. In yet other embodiments, the computational module controls the actuation module to emit a continuous series of paired pulses, wherein the first striking jet burst and the second-striking jet burst are differentiated by an angular compensation.

With respect to a mapping sensor, generally a laser rangefinder is used. Lasers can rapidly scan an area and produce a distance model of a complex contoured surface. Infrared laser rangefinders are preferred because of their partial resistance to dust. In other embodiments, a robotic arm can be used to adjust non-contacting sampling head position and angulation based on the mapped surface geometry, standoff distance, and the desired jet parameters for the best sample resuspension and capture scenario. In an embodiment for surveying surfaces, while the detector apparatus is in motion, the body includes sets of arrays of slit jets, each array acting in series to sweep a sample into the suction intake port. In one configuration, two slit jet apertures act essentially as a "Vee" shape, where the "Vee" points opposite the direction of overall motion of the detector, as for example a vehicle moving along a road surface. As soon as opposing slit jets have dislodged a sample, a third jet, for example, an arcuate jet, traps the material in the pocket, and by maintaining thrust from the two "Vee" jets, causes the momentum of the vehicle to "scoop" the material into the suction intake port. Conceptually, the "pocket" resembles a trapped eddy, and efforts to model the residence time of foreign particles and vapor mathematically suggest improved residence time as is needed to increase the efficiency of the suction operation. Multiple slit jets may be used simultaneously to cover larger surfaces side to side. Other sampling bodies are described and illustrated below.

FIG. 20 is a perspective view of non-contacting sampling apparatus 200 with sampling head section 225, blower body section 202, sampling slit jets 204*a*,204*b*, sample intake port 205, and impactor cartridge 206 in a two section sampler body joined at fluidic interface 202*a*.

This NCS was fabricated and integrated with an "aerodynamic particle concentrator" (air-to-air particle concentrator) and an impactor, but in alternative constructions may incorporate a real-time particle and/or chemical detector. Slit jets in proximity to a surface emit opposing supersonic wall jets that dislodge and mobilize particles and boundary layer gases from the surface to be sampled.

The apparatus can be described as follows. The sampler body includes a sampling head section and a blower body section, the blower body section with blower and the sampling head with i) a pair of slit jet nozzles operable with a jet feed flow having pressure and momentum, such that the slit jet orifices are disposed contralaterally on a "nose" (any exterior surface) of the sampling head, have an aspect ratio of length to width configured to emit generally planar jets, and are angulated to discharge opposing wall jets that collide on a target surface, without contact of the sampling head against the target surface; ii) a suction intake port between the slit jet orifices, such that the intake port is operable under suction, further such that the sampling head section and blower body section are fluidly connected by a detachable interface, the detachable interface having a fluid connection at a first manifold configured to supply a gas feed from the blower to the slit jet orifices in the sampling head and a second manifold configured to convey sampling return gas flow from the intake port of the sampling head to the blower. The fluid connections between the manifolds of the body sections define a gas flow loop that enables at least a part of the sampling return gas flow to be directed through the blower and back to the slit jet orifices.

The slit jet orifices are configured to emit each a jet and the jets are angulated to enable discharge of opposing wall shear jets that collide on a target surface, without contact of the sampling head against the target surface; and the wall jets have a velocity and momentum configured to mobilize and lift particles and vapors from a target surface and the jet feed flow and sample return flow are balanced so that vapors and particulate material mobilized from the target surface is redirected up and into the suction intake port during sampling. There is neither an excess of jet feed nor an insufficiency of suction flow so that the flow loop operates continuously with little loss of target material.

While "head section" or "head end" and "blower body section" or "blower body end" of a sampler apparatus are referenced in this text and shown in the illustrated examples, the choice of a unitary body having a head end and a blower end versus a two-segmented or three-segmented body having a sampling head and a blower is a choice between equivalents.

In operation of the apparatus shown, the bulk flow is 100-300 slpm and the minor flow about 3-50 slpm. The minor flow is diverted into ¼ inch SS tube to which the impactor cartridge is attached. Controlled suction is applied by an external pump attached at hose barb 207 to draw the minor flow through the impactor.

For portability and interchangeability of heads, a head section 225 and a blower body section 224 are rigidly joined at a detachable fluidic and mechanical interface 202*a*. Latch 223 is part of a feature that allows the fan and blower section 224 of the apparatus to use interchangeable heads 225. An alternative head may be supplied, for example, in which an aerodynamic concentrator (FIG. 22B, 208) is not included, and the sampling head instead relies on direct sampling of the bulk flow by other concentration means such as affinity binding pre-concentrator, for example. A head having a particle-to-vapor converter (see "trapped vortex" particle trap) may also be supplied. To substitute an alternate head, the latch 223 can be quickly released in a simple operation that allows one head to be detached and another to be clipped in place on the mechanical interface 202*a* in such a way that the jet feed and sampling return gas flows are patent. Thus, the drawing is representative of a head 225 configuration attached to a blower body section 224 but the aerodynamic concentrator and impactor 206 that are shown are not to be taken as limitations of the invention. Further, the reference to "head section" and "blower section" is not limiting, and a functionally equivalent body may be constructed of a unitary or clamshell body having a "head end" and a "blower end," for example.

A mounting clip 211 is used to mount the apparatus on a robotic arm (not shown), extension arm, or to an adaptor configured for making external connections, and may include pneumatic, hydraulic, digital and electrical connections from the sampling apparatus to a remote controller, pumps or electrical supply such as for powering the sampling head.

Figure 22B:
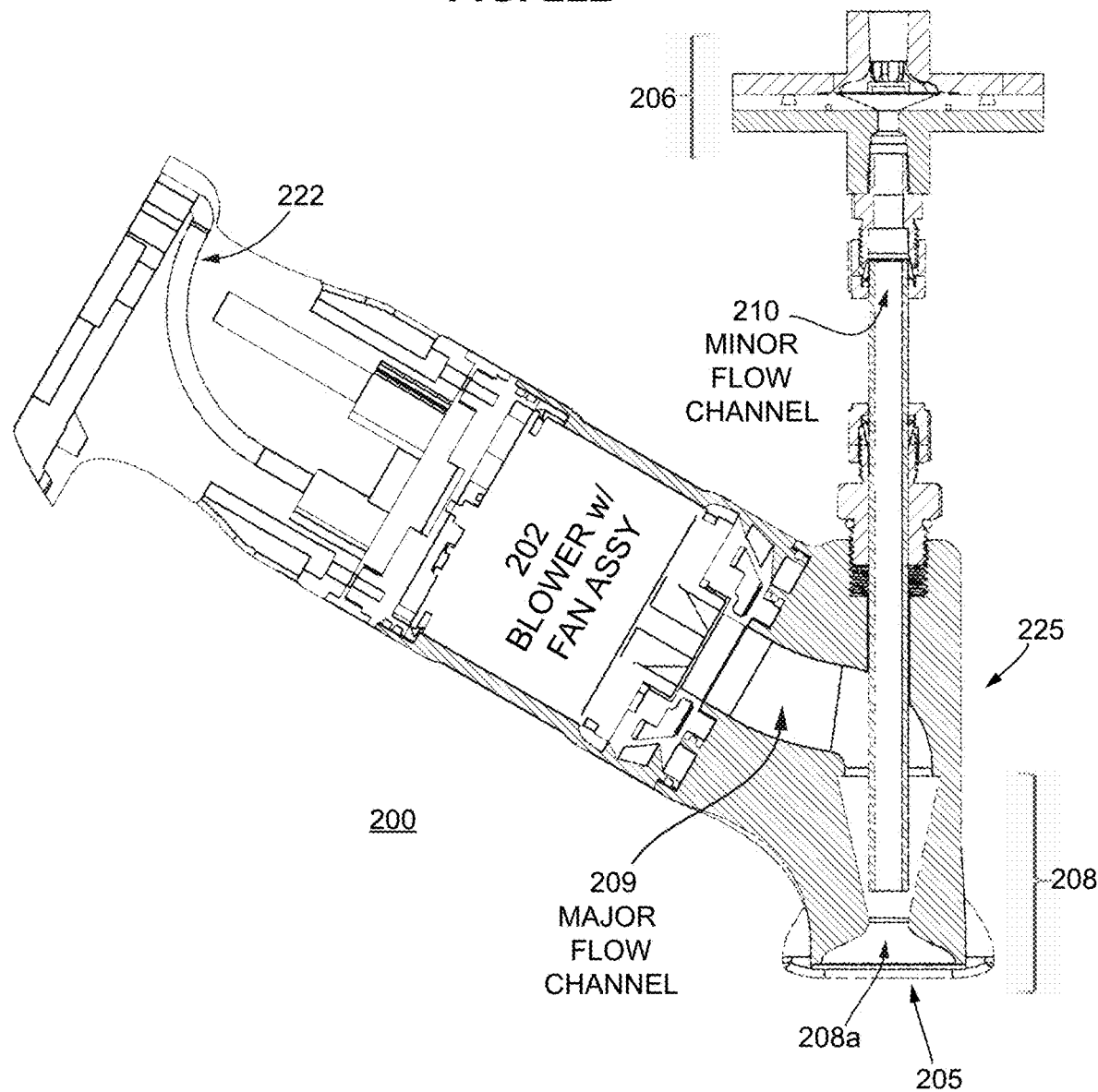

FIGS. 21A and 21B show the apparatus in elevation view and section plane. The section through the head 225 is taken along the minor flow axis of a sampler 200 of FIG. 20. The aerodynamic concentrator (FIG. 21B, 208) includes bulk flow channel 209 and minor flow channel 210. The intake port 205 and aerodynamic concentrator inlet 208a are shown in FIGS. 22A and 22B. Jets 204a,204b are pulsed or are continuous, and the jets are fed with high-velocity gas through internal tubulations 212a,212b.

FIG. 21C is a close-up section view of the sampling head with slit jets 204a, 204b. Their operation in sampling particles 212 from a surface 203 is shown with bold arrows. Pressurized air from blower 202 is directed through internal jet feed manifolds 212a, 212b and out of the slit jets onto the surface to be sampled, resulting in opposing supersonic wall jets. The slit jets are visible in the section of FIG. 21B (but not in the section of FIG. 22B) and are in parallel to each other. Jet flow is shown by bold arrows 214a,214b. Flow is angled so as interrogate the area underneath the sampler head by liberating particles 212 on surface 203 and mobilizing the particles for uptake into inlet 208a. Jet collision and suction into the sampling head create a positive lift on any particles on the surface. The particle stream is focused and separated from the bulk flow return and passed through a virtual impactor at the base of minor flow channel 210. "Bulk flow" (also termed "major flow") is returned to the blower via manifold 209.

The working gas is routed through the apparatus in a loop, at least in part, and a minor flow may optionally be split from the sampling return flow, but the choice of particle concentration means is not limited as shown here, and in any case, at least the bulk flow is returned to the blower.

The minor flow is directed to impactor cartridge 206 (FIG. 21A). The bulk flow may be exhausted or recycled in a loop. Use of the loop allows a single blower to be built into the body in combination with different heads. Use of a single pass system will minimize deposits within the blower 202 but is not shown here because of the advantages of the loop system. The minor flow channel can include real-time particle monitoring devices, such as by light scattering or other optical interrogation methods, chemical monitoring devices for measuring particle composition or gas enriched in chemical constituents mobilized from the sampled surface, and by other analytical devices and methods known in the art.

Figure 28:
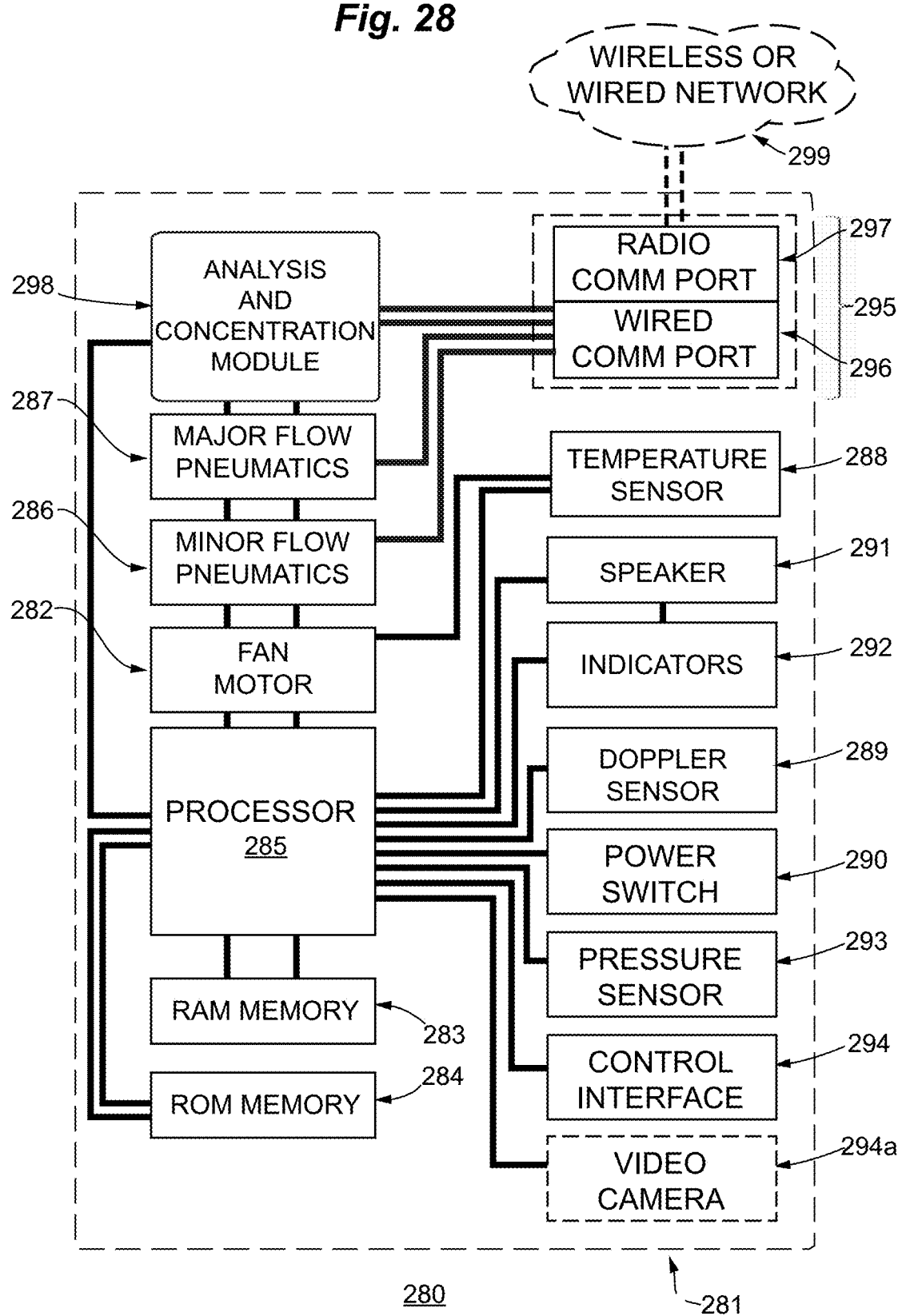
FIG. 28 is a block diagram of the electronic components of the apparatus of FIGS. 23-27B.

The dashed arrow 215 ("LOOP") indicates that a part of the stream of gas that is taken up in the total suction flow from intake port 205 and through the aerodynamic concentrator inlet 208a is directed at least in part back to the slit jets via jet feed manifolds 212a and 212b. Fan blades in the blower assembly 202 draw the bulk flow gas under suction from the aerodynamic concentrator and return the gas under pressure and at high flow rate back to the slit jets (under conditions as consistent with the need for volumetric velocity relative to the jet area and some pressure but not a very high pressure in the gas feed).

The volumetric flow rate is balanced in loop flow so that excess jet flow volume is not introduced into the system. In fact, the small amount of flow (lost in the impingement of angled jet on a target surface) is compensated by the aspiration of the air parallel to the slit jets. By minimizing excess pressurized air, particle losses to dispersion to the environment are minimized.

FIG. 22A shows a bottom plan view and a section plane along the blower axis. The section in FIG. 22B is drawn through the aerodynamic concentrator 208, bulk flow channel 209 and minor flow channel 210. Inlet 208*a* into the aerodynamic concentrator includes a mixture of gas from the jets and gas surrounding the sampling head, including any particles and boundary layer on a sampled surface. The particles are directed to an impactor 206 as shown here.

Guide rails 221 follow the surface to be sampled and prevent contact of the lips of the suction intake port with the surface. The guide rails are provided to assist in sampling by setting the appropriate sampling distance and may be removed if not needed. The guide rails also may be used to ensure the proper standoff positioning of the sampler. Guide rails 221 may also be adapted to include an optical sensor with laser LED and photocell(s) for example, or an acoustic sensor and pick up, to convert reflected light or sound intensity into distance above the sampling surface. Other range sensors may be used as discussed earlier in the context of "smart jets." The apparatus may also include a camera (FIG. 28, 294*a*) and circuitry enabled to display a video feed from the camera on the user interface or on a remote display.

Mounting clip or adaptor 211 was discussed earlier, but in section appears here with a curved channel 222 for receiving a power cable to the fan motor and circuit board from a battery or from an AC rectifier.

FIG. 23 and FIG. 24 are perspective views of another non-contacting sampling apparatus 230. The apparatus may be grippable and handheld by head section 231 and includes a blower body section 232 with fan blade assembly 232*a* for cycling gas through a pair of slit jets, where the jet streams collide over the surface to be sampled. In the intake port 235, gas and any particulate is drawn into an aerodynamic concentrator assembly within section 231 of the sampling head. FIG. 24 shows two parallel slit jets 234*a*,234*b* and a central inlet 238 to the particle concentrator. From the particle concentrator, a minor flow of gas enriched in a particle fraction is passed by tubulation 237 into a downstream detector (not shown). Alternatively, the detector or detectors can also be mounted within head section 231. Because the minor flow is at a ratio of 1:1000 to 1:3, a much smaller canned motor is sometimes used to provide suction for minor flow channel 237. By incorporating lithium batteries in a cassette, a fully portable unit weighing less than 1-5 kg may be obtained. Alternatively, the unit may be powered with AC power received through a power cord, and suction can be supplied from an accessory pump attached by a hose to hose barb 261.

Between minor flow channel 237 and suction connector 261 is an analysis module 260. As discussed in more detail in the Glossary and in FIG. 28 (Analysis and concentration module, 298), some analytical functions may be integrated into the sampling head assembly. A sampling head system may include a) a sample collector with wall jet nozzles, b) a sample concentrator having i) an aerodynamic concentrator for concentrating a stream of particles and ii) an affinity trap for reversibly capturing particles and for selectively vaporizing analytes of interest from the particles, and c) a detector enabled to detect one or more species of target analytes. While not shown, the analysis module may include a data and command interface for transmitting and receiving data and commands from the sampling head processor or from a remote control station. A variety of analytical technologies are available to enable real-time target analyte monitoring, such as for explosives residues, contraband or illicit substances, and may be operated in continuous mode, semi-continuous mode, or batch mode, such as by adapting the analysis module 260 as a cartridge that is slipped on minor flow channel 237, and a new cartridge replacement is inserted when it is removed for analysis. Alternatively, analysis and regeneration of the cartridge can proceed in real time during continuous sample collection by one of the technologies described in the Glossary, while not limited thereto. The analytic module is discussed in more detail in the context of a full schematic drawn in FIG. 28.

Figure 25:
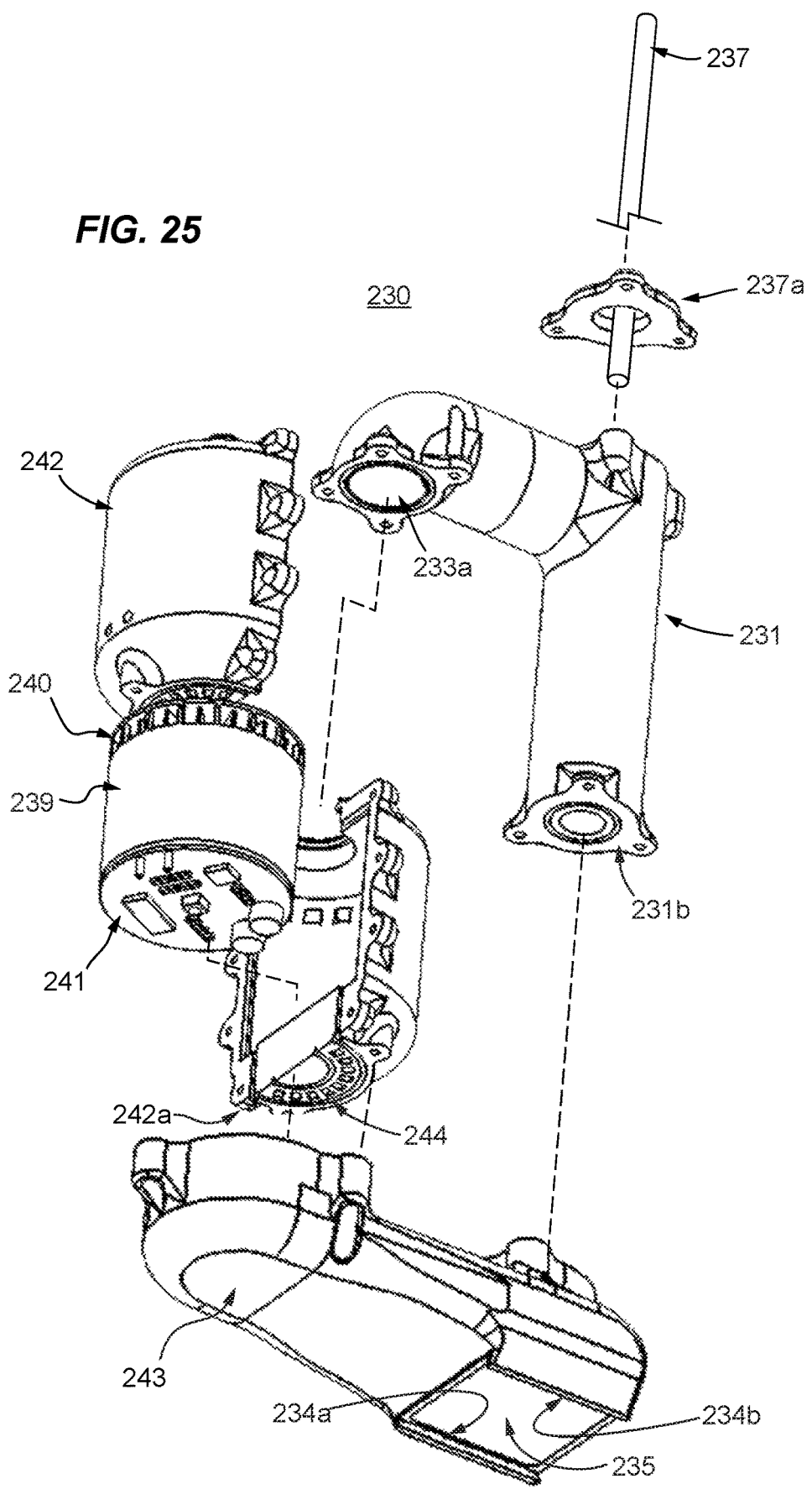
FIG. 25 is an exploded view of the sampler of FIGS. 21A-24.

FIG. 25 is an exploded view of the sampling apparatus of FIGS. 21A-24. The blower assembly 242 consists of a motor 239, a fan blade 240 assembly, and a printed circuit board 241 with processor and supporting electronic components for adjusting gas flow rates and optionally for sensing distance between the sampling head and the surface to be sampled.

It will be seen that the head and blower sections are more readily defined functionally (as enclosing a pneumatic loop with jets and blower) than by the shape or assembly of individual body sections. In an alternative construction, the sampler body could be formed from a right and a left body half, for example. Thus the examples given, while fully operative according to the teachings of the invention, are not limiting the particular choice of body section and fluidic interfaces or junctions shown. Where seals are formed between body sections, a gasket, while not shown, may be included as needed to enclose the working gas.

Figure 26A:
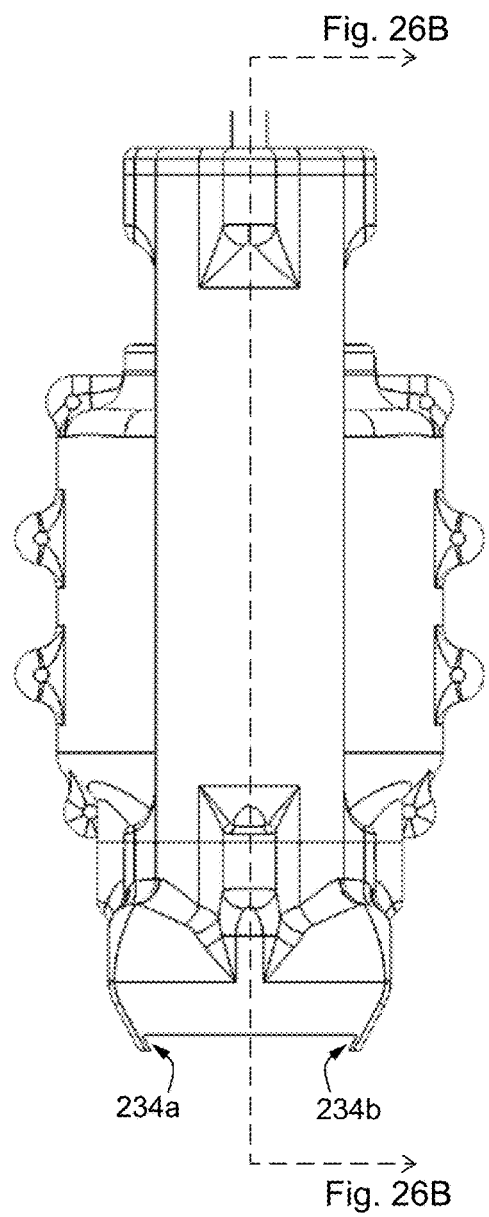
FIG. 26A is an endwise view of the sampler of FIG. 25 and shows the section plane that is drawn in FIG. 26B.
Figure 27A:
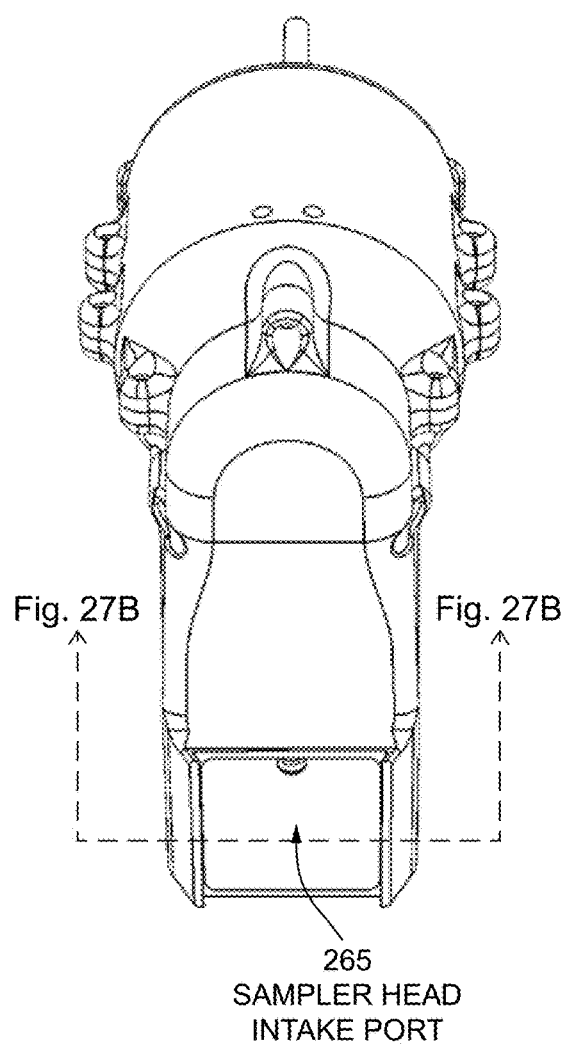
FIG. 27A is an end view of the sampler with second plane drawn here through the long axis of the aerodynamic concentrator. The section view is drawn in FIG. 27B.
Figure 26B:
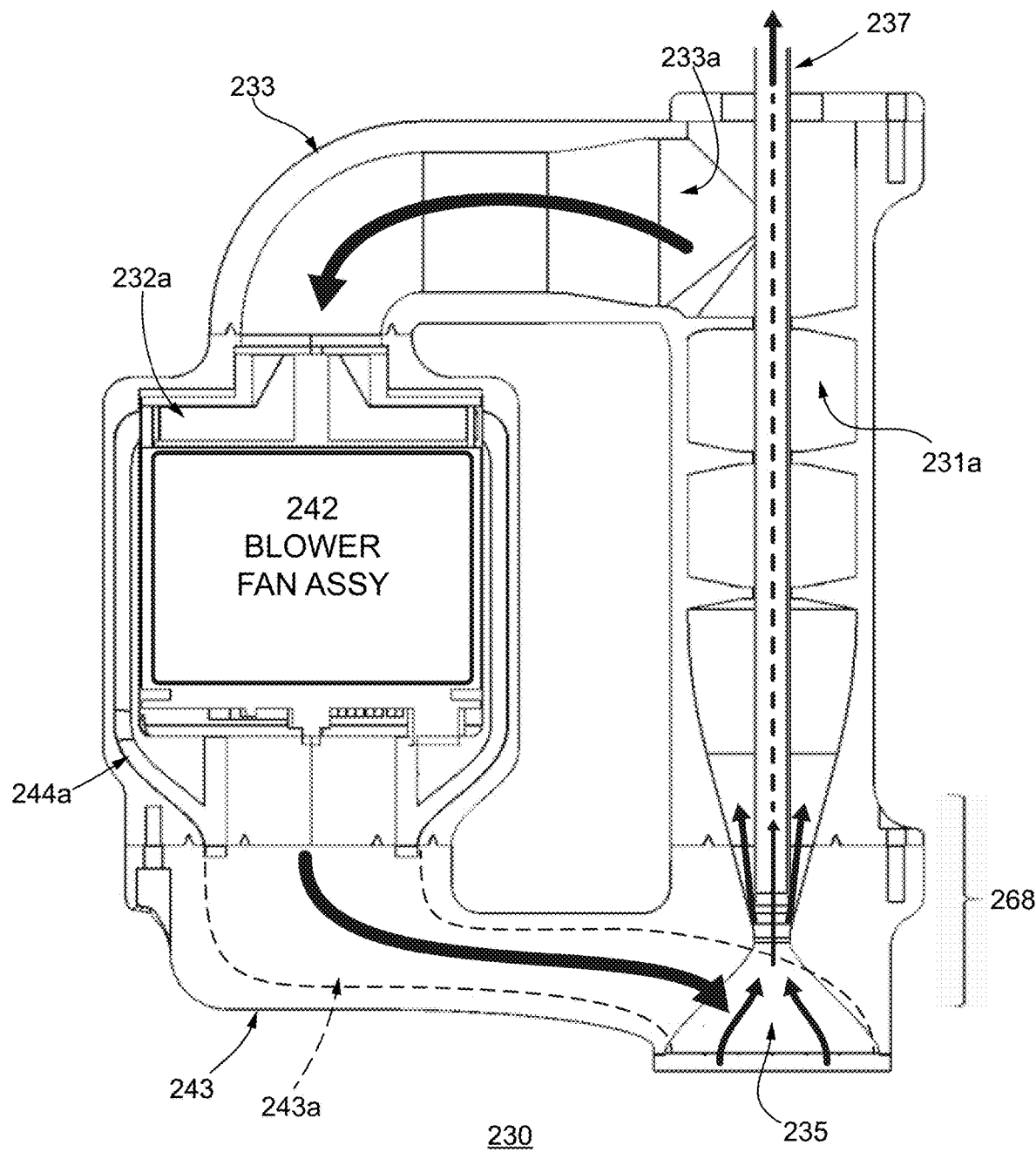
FIG. 26B describes the operation of the apparatus in section view.
Figure 27B:
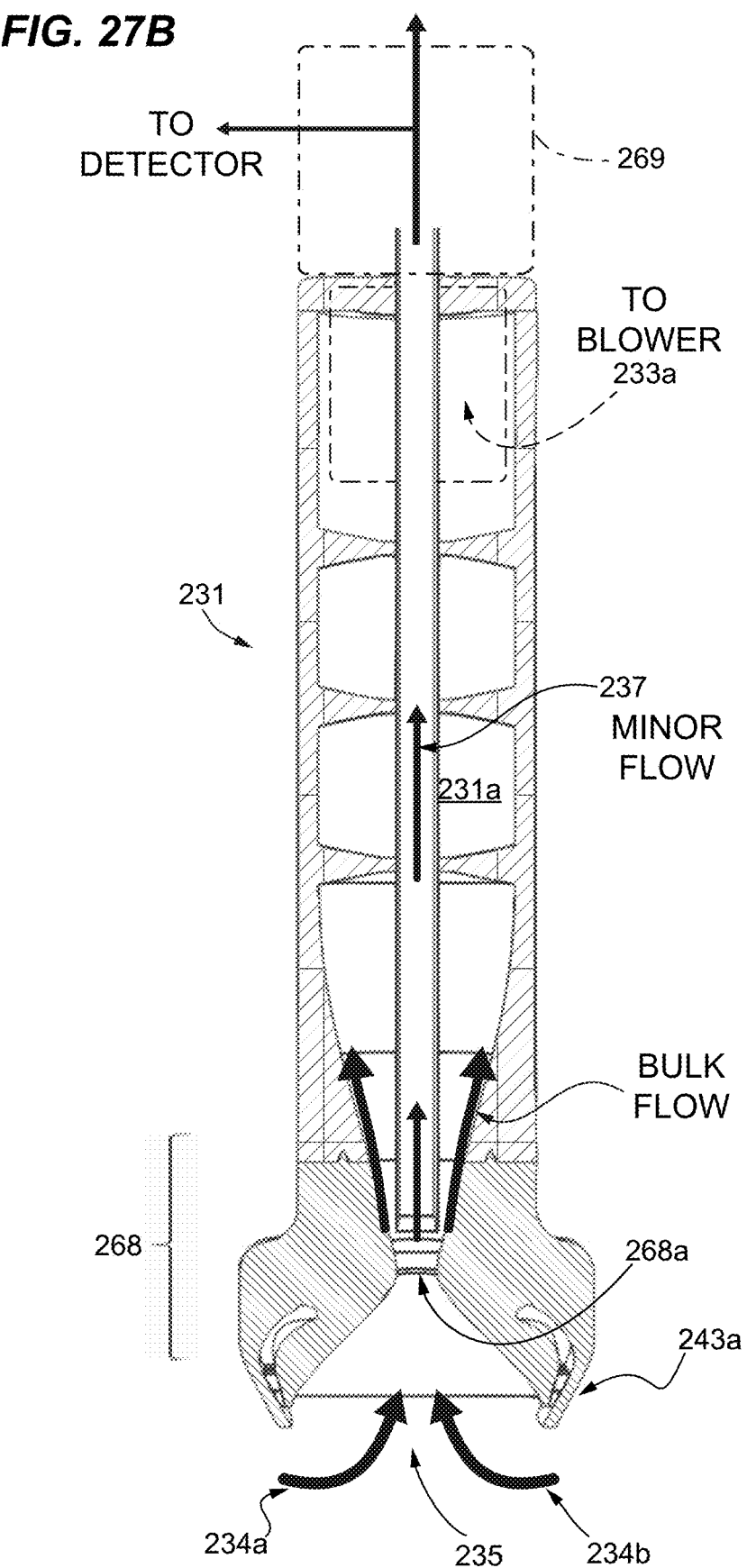

FIG. 26A is an endwise view of the sampler of FIG. 25 and shows the section plane that is drawn in FIG. 26B. FIG. 26B describes the operation (bold arrows) of the apparatus in section view. The gas feed to the slit jets 234*a*, 234*b* exits the blower through fenestrae 244 in the base of the blower housing and is transported through head section 243 of the housing in a first manifold termed the internal jet feed manifold 243*a*. Pressurized gas is then shaped into a planar jet by slit jets 234*a*,234*b* (shown in FIG. 27B). Internally, particle concentration is achieved in an aerodynamic concentrator 268. Within the sampling head intake port 235, gas under suction is split by the aerodynamic concentrator (entrance at 268*a*) into a minor flow in minor flow channel 237 and a bulk flow in bulk flow channel 233*a*. Tubulation 237 that serves as a virtual impactor and minor flow channel is centered and mounted in section 231 by cap 237*a* and by internal braces (shown in FIG. 27B). From the particle concentrator, the bulk flow is cycled within the hollow core 231*a* of section 231 into return manifold 233 (through internal manifold 233*a*), through the fan blades (232*a*), and back to the slit jets 234*a*,234*b* through duct 244*a* outside the motor and through body section 243 at windows 244 on the bottom of the blower housing 232. The bold arrows of the figure indicate gas flow along a path that defines a loop through the blower/fan assembly. Excess gas drawn in at the intake with the jets may be vented so that jet volume flow rate and pressure is tightly controlled.

Fenestrae 244 are part of a fluidic interface 242*a* between blower body section 243 and head section 244, through which compressed gas is supplied to the jets. Return flow from the sampling head is routed through a second manifold 231*a*,233 in the head section 231 is routed through the fluidic interface 231*b*. Note that the first and second manifolds are joined at the blower into a fluidic loop that defines a gas flow loop in which gas jet discharge is taken up in the suction intake port and at least a part of the sampling return flow is cycled back to the blower.

FIG. 27A is an end view of the sampler with second plane drawn here through the long axis of the aerodynamic concentrator. The end view shows the sample head intake port 235, bounded on two sides by slit jet ports (FIG. 26A, 234*a*,234*b*).

The section view is drawn in FIG. 27B. In section view, the aerodynamic concentrator 268 is shown inside section 231 of the sampling head. Gas under suction is separated into a minor flow (a particle-rich stream characterized by the higher inertial moment of the particles) and a "bulk flow" (a particle-depleted stream characterized as bulk gas or "major flow"). The minor flow is captured in minor flow channel 237 and the bulk flow is diverted into bulk flow channel 231*a*. These two streams are differentiated by bold arrows in which the minor flow is relatively smaller. The bulk flow channel makes a bend at the top of head section 231 and is carried back to the blower through internal channel 233*a*.

The minor flow may be pre-concentrated further, such as by "trapped vortex" technology described in U.S. Pat. No. 9,744,490 to Novosselov and Ariessohn. A pre-concentrator is shown schematically by a box 269 surrounded by a dashed line. The pre-concentrator may be built into the sampling head or may be connected downstream on tubulation 237. Added pre-concentration is frequently needed for detection using flow-limited instruments such as a mass spectrometer, which require sample delivery at a much slower flow rate. The pre-concentrator may include a heater to convert particles to vapors and advantageously serves to condition vapors for real-time detection. A detector may be incorporated into the sampling head and receive a separate flow from the pre-concentrator as shown schematically. The remaining minor flow is vented or captured for disposal.

FIG. 28 is a block diagram of the electronic components of the sampling apparatus of FIGS. 23-27B. These components, with the exception of peripheral sensors and indicators, are mounted on a printed circuit board 281 mounted under the power supply and regulator for the blower fan motor 282. The board also includes a processor 285 with supporting circuitry, including RAM memory 283 and ROM memory 284 for storing programming and non-volatile data. Motor control and optionally power is also supplied to a minor flow suction pump 286. The sampling head may also be supplied with a user interface 294 having control surfaces and control indicia or readouts. The user interface may also include an optional video camera 294*a* and display (not shown). The display may be mounted on the sampler body, on an extension arm near a handhold, or may be a remote display. Also provided are a power ON/OFF and a speed control switch 290. A speaker (or buzzer) 291 and indicators 292 are provided to guide the user and to communicate safety conditions and operating conditions needed to optimize performance.

Performance is improved by supplying sensor data. Temperature sensor 288 monitors the blower motor assembly 282 and power regulator to prevent overheating. Pressure or velocity sensor 289 supplies velocity data from the slit jets at the point of jet expansion. Pressure sensor 293 monitors pressure in the minor flow channel and can detect increasing backpressure associated with blockage of the impactor mesh. A by-pass may be throttled where a mesh or cartridge is used so that backpressure is not excessive.

Also included in this block diagram of a fully integrated, automated system is an "analysis and concentration module" (298). This module has a number of functions. It may operate under control of the processor, or may include its own independent controller and may have firmware, cache memory, and a dedicated or programmable instruction set. It receives data from the processor and coordinates functions of the fan motor and the pneumatics of the minor 286 and bulk 287 flow hardware, which may include embedded sensors. Included are control of pressures, flow velocities, sampling subroutines, sampling rates and intervals, and all hardware and steps of sample processing and analysis for selected analytes by any of the known analytical technologies. An extended review and description of relevant technologies, all of which are incorporated in full by reference to the literature, is provided in the Glossary.

While shown here in a fully integrated form, the analytical module functions may be distributed to different parts of the sampler head or may be in a robotic arm or extension arm. Automated systems, semi-automated and manual systems, including fully continuous, semi-continuous and batch processing of samples may be controlled, at least in part, by an analytic systems controller that operates in conjunction with a sample concentrator or concentrators. The analytical module will report to the processor and may also be directed to or initiate reporting to a remote control station.

Analytical data may be used to adjust sampling head operating parameters. For example, particle counts may impact other analytical methods, either by being too large and requiring less sample or by being scarce and in need of further concentration. Thus the particle count can provide feedback to the sampling routine. The feedback loop may be provided by the processor, as part of the analytic module sub-routines, or by a remote control station accessible via a wired or wireless connection. For portable use, a wireless network 299 may be accessed so that data can be processed and operating conditions adjusted according to sampling results.

A wired or wireless module 295 for direct monitoring of sampler performance or for real-time detection of particle numbers or particle composition may also be provided in the sampling head. The wired comm port 296 is a high-speed databus capable of providing data to a remote user and also may be used for supplying commands to the processor that can adjust performance parameters on the fly. Similarly, a radio comm port 297 may carry bidirectional data and also may communicate commands to the sampling head. In some instances, the sampling head may supply commands to an external suction pump or to a remote detector, so all comm ports are bidirectional and fully duplex. In other instances a local computer device may exchange digital data and messages with the sampling head, but as shown here, the radio comm port is configured to be in direct wireless contact with a cloud-based wireless network 299 and associated cloud computing platforms.

FIG. 29 is a representative chart of a first process for operating a slit jet array of the invention. The apparatus is supplied with a high flow volume velocity source of pressurized gas (relative to the jet cross-sectional area) and a suction pressure source. In a first step, a user is provided with a non-contacting sampling head and apparatus of the invention. The sampling head has slit jets enabled to emit paired planar jet bursts that are directed as opposing supersonic wall jets onto a surface under the sampling intake. Manually actuating the apparatus results in flow of the pressurized gas through the jet orifices, generally in unison with or after a short delay in which a suction pressure regime is first established in the suction intake port. The jets are characteristically planar jets having a high aspect ratio and are angled or steered so that impingement of the jets on a solid surface generates opposing supersonic wall jets that meet from opposite directions between the jet orifices and under the suction intake. Particles, including those having small aerodynamic dimensions, are mobilized and may be lifted off in the turbulent zone where the wall jets collide. Vapors and the boundary layer itself are carried with the rising return jets into the suction intake. This uplift efficiently collects target analytes and directs them into the suction intake port for further processing. Air-to-air particle concentration modules and downstream analytical tools are known in the art for analyzing particles and vapors and may be used in combination with the NCS heads of the invention. In a preferred mode, the sampling head is used with a real time detector in contact with the particle stream, but alternatively samples of particles and associated vapors trapped on a solid substrate, mesh or filter are manually transferred to one or more analytical workstations and results are collected. A non-contacting sampling head may be moved along a surface so as to survey a large sampling area. The process is continued for effect.

For smaller units, the needed velocities and pressures are in a range (typically less than 30 psig) such that a blower mounted in the apparatus can operate as a gas source for portable, handheld wand for illicit materials surveillance. The smaller units may be operable in near proximity and up to a standoff distance of 10 cm or more, depending on the size of the head and the jet flow velocity. Wearable units may be linked into radio networks to survey particle exposures epidemiologically and to map particle densities as a function of location. For automated screening checkpoints, by scaling up to larger sampling heads, greater standoff distances are obtained, an advance in the art. Standoff distances of 30 cm or more are possible at realizable pressures and velocities.

In a preferred embodiment, the method for aerodynamic liberation and capture of particles from a solid surface and vapors from any gaseous boundary layer may include a) first providing a NCS apparatus having a sampling head bounded by a housing, the head comprising a central suction intake port and pairs of slit jet orifices or arrays of slit jet orifices such that each pair of slit jet orifices is generally parallel and is separated by the suction intake port; b) then coupling the suction intake port to a suction pressure source and coupling the slit jet orifices or arrays to a jet pressure source such that each slit jet orifice is shaped to exceed choke flow at a designed pressure drop, each the pair having a first slit jet orifice configured to discharge a first planar jet and a second slit jet orifice configured to discharge a second planar jet toward a target surface, such that the slit jet orifices or arrays have an aspect ratio of length to width configured to emit jet generally planar jet bursts, and further such that the first planar jet and second planar jet are configured to converge at a virtual line behind a target surface as supersonic jets in collision; and c) actuating the suction intake port by applying a suction pressure sufficient to draw the planar jet flow into the suction intake port; d) actuating release of planar jets through each of the slit jet orifices, such that the jets are configured to impinge on a solid surface at a standoff distance; and, e) concentrating or collecting any target analyte or analytes that are mobilized from the surface and drawn into the suction intake port.

Round jet nozzle arrays may also be used in a looped gas flow configuration as described earlier. Both the jet orifice arrays and the paired slit jets may be used with pulsatile jet bursts or with continuous jet flow as long as suction pressure is sufficient to collect the material remobilized in the shock front(s) and jet velocity is sufficient to provide shear sufficient to overcome adhesion forces on particles.

Explosives, illicit substances, contraband, and forensic evidence from a variety of surfaces such as fabrics, gloves, tires, luggage, footprints, hands and fingers, skin generally, fomites such as wallets, firearms, boxes, shipping pallets, vehicles, and so forth, while not limited thereto, may be detected using the colliding wall jets of the sampling head and associated detection apparatus. The process is continued for effect and may be a stepwise process of iterative sample collection followed by analysis; as would be assigned to a skilled operator or team working in tandem to detect hazardous or illicit substances for example. Power packs are supplied so that the sampling heads can be operated for several hours at a time before exchanging the power packs.

FIG. 30 is a representative chart of a second process for operating a slit jet array of the invention. In an automated method, a user is provided with a non-contacting sampling head and looped-flow blower apparatus of the invention. The apparatus is supplied with a high flow volume velocity source of pressurized gas (relative to the jet cross-sectional area) and a suction pressure source. The sampler may be mounted on a sampling extension arm (such as for surveying under vehicles) or a robotic arm and can be remotely operated using wired or wireless control interfaces. The head includes a central suction intake port and pairs of slit jet orifices or arrays of slit jet orifices such that each pair of slit jet orifices is generally parallel and the suction intake port is between the jets. The sampling head is enabled to emit paired planar jets that result in opposing supersonic wall jets on a surface under the sampling intake. The jets are characteristically planar jets having a high aspect ratio and are angled or steered so that impingement of the jets on a solid surface generates opposing wall jets that meet from opposite directions under the suction intake. A front is formed where the jets are deflected from the target surface into the suction intake. Particles, including those having small aerodynamic dimensions, are mobilized and may be lifted off the surface substrate in the turbulent zone where the wall jets collide. The process is continued for effect as the sampling head is continuously scanned across a surface of interest.

More generally, the method includes steps for:

a) providing a sampler body having a sampling head end and a blower section end, the blower section with blower and the sampling head with: i) a pair of slit jet nozzles operable with a jet feed flow having pressure and momentum, wherein the slit jet orifices are disposed contralaterally on a first surface of the sampling head, have an aspect ratio of length to width configured to emit generally planar jets, and are angulated to discharge opposing wall shear jets that collide on a target surface, without contact of the sampling head against the target surface; and ii) a suction intake port between the slit jet orifices, wherein the intake port is operable under suction, further wherein the sampling head and blower section are fluidly connected by a first manifold configured to supply a gas feed from the blower to the slit jet orifices in the sampling head and a second manifold configured to convey sampling return gas flow from the intake port of the sampling head to the blower, further wherein the jet feed flow and at least a part of the sampling return gas flow are pneumatically connected in a gas flow loop through the blower;

b) operating the suction intake port under a suction pressure while operating the slit jet orifices with a jet feed flow, wherein the slit jet orifices are configured to emit each a jet toward a target surface and the jets are angulated to generate opposing wall jets that collide on a target surface at a standoff distance from a target surface;

c) sampling particles and vapors from a target surface under conditions in which the wall jet shear is greater than the particle drag force and any resuspended particles and vapors from a target surface are redirected up and into the suction intake port;

d) concentrating or collecting any particulate and vapor analyte or analytes in at least a part of the sampling return flow; and, e) returning at least a part of the sampling return flow through the blower and back to the slit jet orifices in a pneumatic loop.

The standoff distance can be adjusted according to the momentum of the jet feed flow, wherein the stand-off distance is optimized to achieve the required shear stress threshold to remove vapor or particulate matter on a target surface. Guide rails may be used to indicate the desirable standoff distance for the smaller units.

In actual practice, the method involves scanning the sampling head across a target surface in a continuous sampling mode with ongoing suction and a choice of continuous or pulsatile jet flow.

The jet orifices may be round jets in an array around the suction intake port or may be a pair of opposing slit jets on opposite sides of the suction intake port.

As currently practiced, the sample stream will be split by an air-to-air particle concentrator before analysis, so that a particle-enriched minor flow can be delivered to a detector in a more concentrated form, thereby improving sensitivity. Analytes in the bulk gas of the return flow may also be concentrated using a stepwise adsorption and release technology, many of which are known in the art, and can be automated to cycle continuously at discrete intervals of sampling and to analyze. Alternatively, particles may be trapped in particle-to-vapor conversion device (such as a thermal desorber or a "trapped vortex" pre-concentrator) so that volatiles may be vaporized as a bolus from the particle concentrate or the bulk gas (released from an adsorbent as a bolus), and the bolus is then conveyed to a sensitive detector for analysis. The detection process may be destructive or may include provision for archiving samples for further forensic analysis at a remote laboratory.

If positioned in the sampling head, body, or in the robotic arm or extension arm, the analytical detection units are typically miniaturized and may be in direct contact with the sample streams. Analytical detection units and any pre-concentrator are selected according to the kind and nature of the particles and vapors to be detected. Particle counts may also be measured. While continuously or intermittently sampling, the NCS head may be moved along a surface so as to survey a large sampling area in such a way that the process is automated or semi-automated. Standoff distances of more than 12 inches are achieved at realizable jet pressures and velocities, an advance in the art. Generally, a continuous power supply is provided so that the sampling workstations can all be operated without downtime to change out power packs. For low stand-off distances 0-10 cm, the sample can use smaller blower which can provide sufficient momentum for removing particle and vapors from the substrates.

It may be desirable to periodically clean sand, ash and fibers from the suction intake port, and piezoelectric actuators may facilitate this process. A preferred system requires little maintenance and operates with a relative absence of moving parts such that the gas phase is the vehicle for both selectively separating and conveying vapors stripped from the particles to an analytical module. These and other analytical techniques are known in the art and may, for example, involve aerodynamic concentrators or vortex samplers.

The device may be operated continuously or semi-continuously, unlike other impactors or other collection media (filters, adsorbent substrates, etc.) which must be periodically regenerated during use. Particle-associated volatiles may be supplied for analysis by continuous in-line volatilization, unlike prior art applications having intermittent flash vaporization or off-line vaporization of replaceable cartridges and pledgets.

When used with suitable detectors, the sampling heads of the invention, of which several exemplary sampling heads are illustrated and described here, find use in active surveillance, such as for detecting explosives in aerosols, chemical residues or "trace analytes" of illicit substances such as gunshot residue or toxins, drugs, including those on persons, vehicles or luggage. Continuous, semi-continuous, or batch mode operations are enabled for manual and automated systems according to the requirements of the downstream analytical workstations and according to the needed threshold for detection. "Trace analytes" may take the form of a particulate composed of a) a target constituent or constituents, b) a free vapor composed of a target constituent or constituents, or c) inert particulates with adsorbed vapor or chemical compound of interest. Thus, the sampling head is configured according to the sampling needs. The invention relates particularly to such apparatus, systems, and methods as are useful in non-contacting sampling and detection of trace analytes on irregular, curved, and complex surfaces.

EXAMPLE I

An NCS body having axisymmetric slit jets arranged around a central suction cavity was fabricated. When operated so that planar slit jets are impacted on a solid surface, the model demonstrated a very high wall jet velocity and shock fronts using Schlieren photography (see FIG. 4). The scaling factors are determined from parameters such as HID and $P_{jet\ injector}/P_0$. Particle tracking technics were used to determine the flow structure location the linear jet. These visualization experiments validate the approach of using jet timing to attack the sampling quality of uneven and tilted surfaces. Particle capture from a surface was demonstrated by high-speed photography.

By opposing two wall jets, efficient particle capture was demonstrated for slit jets having aspect ratios greater than 10, more preferably greater than 50.

From these design considerations, the threshold shear stress for particle removal can surprisingly be achieved by a planar jet at longer stand-off distance/or lower operating pressures as experimentally shown and exceeding expectations. Serendipitously, the planar jet pairs also produce high forces much farther away from the impingement point, thereby extending the "reach" factor for the sampling process. Standoff distances of 30 cm were tested and the sampling apparatus was found to be effective.

Figure 20:
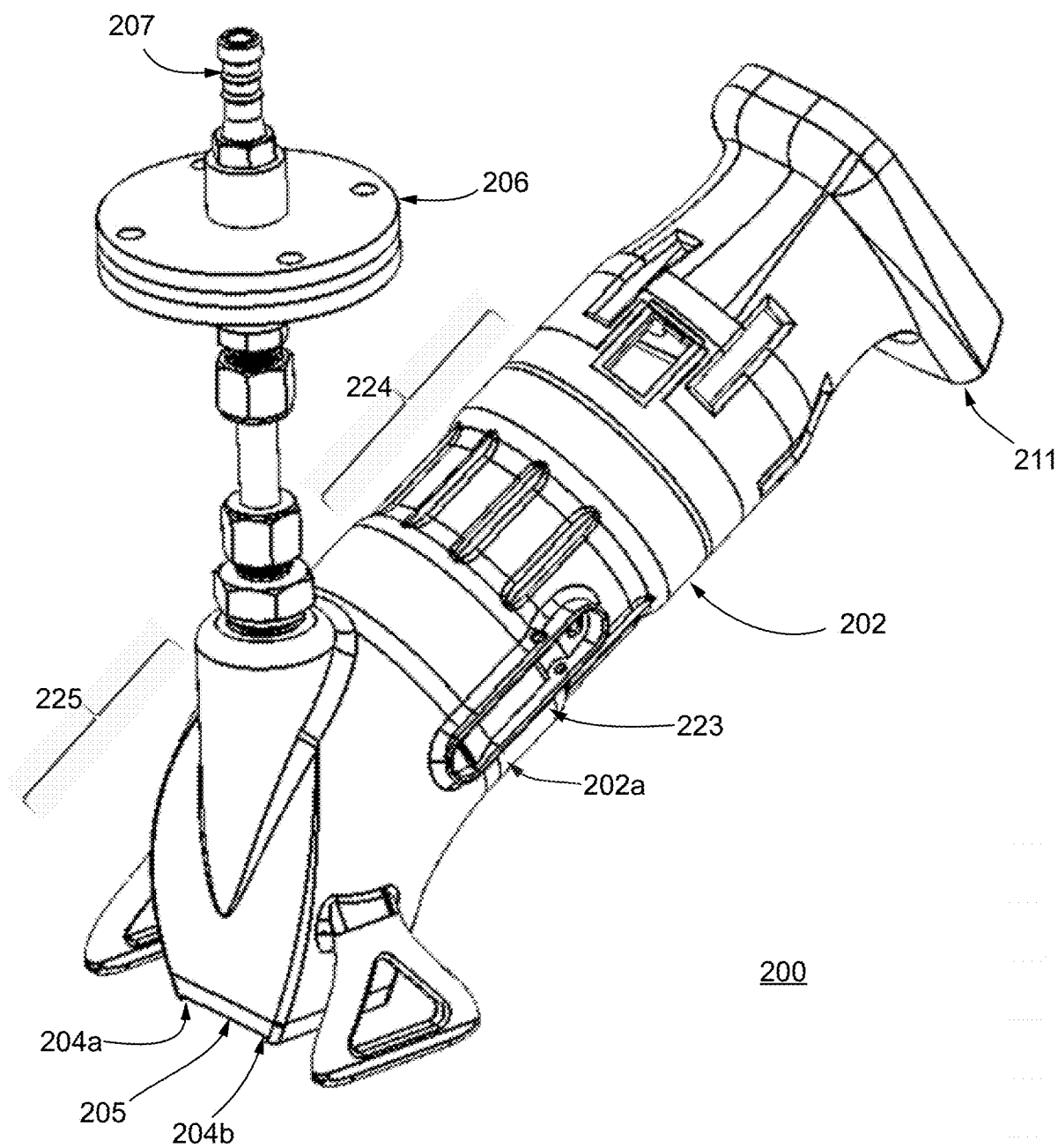
FIG. 20 is a perspective view of non-contacting particle sampler apparatus with blower and suction intake port for sample delivery to an in-line impactor.

These devices were optionally mounted on a robotic arm. A mounting clip 211 for attachment of the sampling head to a robotic arm or extension arm is shown in FIGS. 20 and 22A, for example. The mounting clip may be provided with connectors for wired bidirectional data transmission, or the sampling head may be in wireless communication with a remote workstation. Fluids and gases may also be supplied through an adaptor having hoses that connect to sampling head, but by using loop flow powered by a single on-board blower that is integrated into the sampling body, the apparatus typically requires only connections for power and data. Data may be transmitted via a radio set or may be streamed over a wired connection.

EXAMPLE II

Portable devices made with planar jet arrays in a non-contacting sampling head were found to be operable, achieving superior results with less energy and without the use of compressed gas reservoirs, by a combination of lower pressure and higher velocity jet flow from slit-jet or arrayed cylindrical jet orifices as taught earlier. By a process of miniaturization, self-contained devices having dimensions and weight suitable as handheld sampling tools are realized. A portable handheld NCS is shown in FIG. 23. The models shown here were built using 3D printing and with care in designing for higher velocity in the jet nozzles (with low pressure drop), support further device miniaturization. Small form factor blowers, fans or pumps can be used to supply sufficient momentum for particle mobilization when standoff distance is optimized to achieve the required wall jet shear.

With these devices, sampling downstream analysis and detection of particle constituents can be conducted in real time with continuous wall jets supplied by lightweight and compact blowers.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

The embodiments of the figures and description were chosen and described in order to best explain the principles of the invention and its practical applications, to thereby enable others skilled in the art to best utilize the invention and various embodiments with various modifications as are suited to the particular use contemplated. However, it is intended that the scope of the invention be defined by the following claims, claim amendments, and their equivalents.

I claim:

1. A non-contact sampling apparatus for aerodynamic liberation and capture of particles and vapors at a standoff distance from a target surface, which comprises:
 a) a sampler body having a sampling head section and a blower body section, the blower body section with blower and the sampling head with:
  i) a pair of slit jet orifices operable with a jet feed flow having pressure and momentum, wherein the slit jet orifices are disposed contralaterally on a nose of the sampling head;
  ii) a suction intake port disposed between the slit jet orifices, wherein the intake port is operable under suction;
 b) wherein the sampling head section and blower body section are configured to be mechanically joined at a fixed or a detachable fluidic interface, the sampling head section and blower body section having each therein a segment of a first and second manifold, wherein as joined:
  i) the segments of the first manifold are fluidly joined at the fixed or detachable fluidic interface and the first manifold is configured to supply a jet feed flow from the blower to the slit jet orifices in the sampling head;
  ii) the segments of the second manifold are fluidly joined at the fixed or detachable fluidic interface and the second manifold is configured to convey at least a part of a sampling return gas flow from the intake port of the sampling head to the blower;
  iii) the first manifold with jet feed flow and the second manifold with at least a part of the sampling return gas flow define a gas flow loop characterized in that gas discharged from the blower (the jet feed flow) is directed to the slit jet orifices; gas discharged from the slit jet orifices (the jet discharge flow) is redirected into the suction intake port (the sampling return flow); and the sampling return flow at least in part is cycled back to the blower;
 c) wherein the slit jet orifices are configured to emit each an essentially planar jet and the jets are angulated to collide as opposing wall jets on a target surface; and,
 d) further wherein the opposing wall jets have a momentum configured to mobilize and lift particles and vapors from a target surface, the jet feed flow and sample return flow are balanced to collect the jet discharge flow and any vapors or particulate material mobilized from a target surface into the sampling return flow during sampling, without contact of the sampling head against the target surface.

2. The apparatus of claim 1, wherein the apparatus is grippable by a body section and is operable when handheld by an operator.

3. The apparatus of claim 1, wherein the apparatus comprises a fastener, belt or strap and is operable when worn by an operator.

4. The apparatus of claim 1, wherein the sampler body comprises an electronic circuit having a processor and non-volatile memory for storing program instructions which when executed by the processor, cause the apparatus to at least in part automatically sample particles from a target surface.

5. The apparatus of claim 1, wherein the blower is configured to supply a continuous flow of a pressurized gas to the jet orifices during operation and the sampler head is configured to supply a suction pressure at the sample inlet port.

6. The apparatus of claim 1, further comprising a high-speed valve on the jet feed flow, wherein the valve is configured to generate a train of jet bursts at the slit jet orifices.

7. The apparatus of claim 1, wherein the apparatus comprises a mounting clip, and is operable when mounted on an extension arm, a wand, or a robotic arm.

8. The apparatus of claim 7, wherein the mounting clip is adapted to receive an external power connection, a battery, or a wired data connection.

9. The apparatus of claim 1, comprising a user interface, wherein the user interface is accessible by local user controls and indicators, by a wired link to a remote user interface, by a radio command and data link to a remote user interface, or a combination of any two or more local and remote user interfaces.

10. The non-contact sampler apparatus of claim 9, wherein the apparatus comprises a camera and circuitry enabled to display a video feed from the camera on a local or a remote user display.

11. The apparatus of claim 1, comprising a suction pressure source configured to generate a suction pressure at the suction intake port.

12. The apparatus of claim 11, comprising an aerodynamic concentrator adapted to split the sampling return flow into a bulk flow and a minor flow; and, wherein the bulk flow is returned to the blower and the minor flow is directed under suction to a minor flow channel.

13. The apparatus of claim 12, wherein the minor flow channel is configured for operably receiving a pre-concentrator, an impactor, an impactor bypass, a virtual impactor, a thermal desorber, a trapped vortex concentrator, a sampling cartridge, a filter, an affinity capture column, or an analytical module.

14. A method for aerodynamic resuspension and capture of particles from a target surface, the method comprising:
 a) providing a sampler body having a sampling head end and a blower section end, the blower section with blower and the sampling head with:
  i) a pair of slit jet nozzles operable with a jet feed flow having pressure and momentum, wherein the slit jet nozzles are disposed contralaterally on a first surface of the sampling head, have an aspect ratio of length to width configured to emit generally planar jets, and are angulated to discharge opposing wall shear jets that collide on a target surface, without contact of the sampling head against the target surface;
  ii) a suction intake port between the slit jet nozzles, wherein the intake port is operable under suction, further wherein the sampling head and blower section are fluidly connected by a first manifold configured to supply a gas feed from the blower to the slit jet nozzles in the sampling head and a second manifold configured to convey sampling return gas flow from the intake port of the sampling head to the blower, further wherein the jet feed flow and at least a part of the sampling return gas flow are pneumatically connected in a gas flow loop through the blower;
 b) operating the suction intake port under a suction pressure while operating the slit jet nozzles with a jet feed flow, wherein the slit jet nozzles are configured to emit each a jet toward a target surface and the jets are angulated to generate opposing wall jets that collide on a target surface at a standoff distance from a target surface;

c) sampling particles and vapors from a target surface under conditions in which the wall jet shear is greater than the particle drag force and any resuspended particles and vapors from a target surface are redirected up and into the suction intake port;

d) concentrating or collecting any particulate and vapor analyte or analytes in at least a part of the sampling return flow; and, e) returning at least a part of the sampling return flow through the blower and back to the slit jet nozzles in a fluidic loop.

15. The method of claim 14, comprising adjusting the standoff distance according to the momentum of the jet feed flow, wherein the stand-off distance is optimized to achieve the required shear stress threshold to remove vapor or particulate matter on a target surface.

16. The method of claim 15, comprising scanning the sampling head across a target surface in a continuous sampling mode.

17. A non-contact sampling apparatus for aerodynamic liberation and capture of particles and vapors at a standoff distance from a target surface, which comprises:

a) a sampler body having a sampling head end and a blower section end, the blower section with blower and the sampling head with:

i) at least two jet nozzles operable with a jet feed flow having pressure and momentum, wherein the jet nozzles are disposed on a first surface of the sampling head and are angulated to emit jets that collide on a target surface as opposing wall jets;

ii) a suction intake port between the jet nozzles, wherein the intake port is operable under suction, further wherein the sampling head and blower section are fluidly connected by a first manifold configured to supply a gas feed from the blower to the jet nozzles in the sampling head and a second manifold configured to convey sampling return gas flow from the intake port of the sampling head to the blower, further wherein the jet feed flow and at least a part of the sampling return gas flow are pneumatically connected in a gas flow loop through the blower;

b) further wherein the wall jets have a velocity and momentum configured to mobilize and lift particles and vapors from a target surface, and the jet feed flow and sample return flow are balanced so that any vapor or particulate material mobilized from a target surface is redirected up and into the suction intake port during sampling.

18. The apparatus of claim 17, wherein a mode of operation is selected from a configuration in which a) the jet nozzles are operated with continuous flow and the suction intake port is operated continuously during sampling; or b) the jet nozzles are operated with pulsatile flow and the suction intake port is operated continuously during sampling.

19. The apparatus of claim 17, wherein the jet nozzles are contralateral opposing slit jet nozzles on either side of the suction intake port, or round nozzles arrayed around the suction intake port.

20. The apparatus of claim 17, wherein the sampling return gas flow is split in an air-to-air concentrator or a particle-to-vapor concentrator, and at least a bulk flow fraction of the sampling return gas flow is conveyed to the blower.

21. The apparatus of claim 17, wherein the sampling body is a unitary body or a sectioned body, and further wherein the sectioned body is a two-piece body with exchangeable sampling heads, a three-piece body, or a body having two halves as in a clamshell body.

* * * * *